(12) United States Patent
Iwamoto

(10) Patent No.: US 11,114,687 B2
(45) Date of Patent: Sep. 7, 2021

(54) BATTERY

(71) Applicant: PANASONIC INTELLECTUAL PROPERTY MANAGEMENT CO., LTD., Osaka (JP)

(72) Inventor: Kazuya Iwamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/868,167

(22) Filed: May 6, 2020

(65) Prior Publication Data
US 2020/0266482 A1 Aug. 20, 2020

Related U.S. Application Data

(62) Division of application No. 15/956,718, filed on Apr. 18, 2018, now Pat. No. 10,686,213.

(30) Foreign Application Priority Data

May 18, 2017 (JP) .............................. JP2017-098681

(51) Int. Cl.
*H01M 50/463* (2021.01)
*H01M 50/46* (2021.01)
(Continued)

(52) U.S. Cl.
CPC ..... *H01M 10/0525* (2013.01); *H01M 4/0404* (2013.01); *H01M 4/134* (2013.01);
(Continued)

(58) Field of Classification Search
None
See application file for complete search history.

(56) References Cited

U.S. PATENT DOCUMENTS

| 5,593,462 A | 7/1997 | Gueguen et al. |
| 2014/0154553 A1 | 6/2014 | Day et al. |

(Continued)

FOREIGN PATENT DOCUMENTS

| JP | 2000-149994 | 5/2000 |
| JP | 2003-109666 | 4/2003 |

(Continued)

OTHER PUBLICATIONS

The Extended European Search Report dated Oct. 22, 2018 for the related European Patent Application No. 18171158.1.

*Primary Examiner* — Yoshitoshi Takeuchi
(74) *Attorney, Agent, or Firm* — Greenblum & Bernstein, P.L.C.

(57) ABSTRACT

A battery includes a first electrode layer; and a second electrode layer disposed on the first electrode layer and serving as a counter electrode for the first electrode layer, wherein the first electrode layer includes a first current collector, a first active material layer, and a first solid electrolyte layer, the first active material layer is disposed to be in contact with the first current collector and to occupy a smaller area than the first current collector, the first solid electrolyte layer is disposed to be in contact with the first current collector and the first active material layer and to occupy the same area as the first current collector, the first active material layer faces the second electrode layer with the first solid electrolyte layer therebetween, and the first electrode layer includes a peripheral portion including a first rounded portion.

9 Claims, 39 Drawing Sheets

(51) Int. Cl.
*H01M 10/058* (2010.01)
*H01M 10/0562* (2010.01)
*H01M 10/0565* (2010.01)
*H01M 10/0525* (2010.01)
*H01M 4/134* (2010.01)
*H01M 4/70* (2006.01)
*H01M 4/66* (2006.01)
*H01M 4/139* (2010.01)
*H01M 10/0585* (2010.01)
*H01M 4/04* (2006.01)
*H01M 4/02* (2006.01)

(52) U.S. Cl.
CPC ........... *H01M 4/139* (2013.01); *H01M 4/661* (2013.01); *H01M 4/70* (2013.01); *H01M 10/058* (2013.01); *H01M 10/0562* (2013.01); *H01M 10/0565* (2013.01); *H01M 10/0585* (2013.01); *H01M 50/46* (2021.01); *H01M 2004/027* (2013.01); *H01M 2004/028* (2013.01); *H01M 2300/0065* (2013.01)

(56) References Cited

U.S. PATENT DOCUMENTS

| | | | |
|---|---|---|---|
| 2016/0028048 A1* | 1/2016 | Lee | H01M 50/502 |
| | | | 429/178 |
| 2016/0056495 A1 | 2/2016 | Minagata | |
| 2018/0083310 A1* | 3/2018 | Iwasaki | H01M 4/485 |

FOREIGN PATENT DOCUMENTS

| | | |
|---|---|---|
| JP | 2010-056067 | 3/2010 |
| JP | 2013-229315 | 11/2013 |

* cited by examiner

BATTERY

CROSS-REFERENCE TO RELATED APPLICATIONS

This application is a Division of U.S. patent application Ser. No. 15/956,718, filed Apr. 18, 2018, which claims the benefit of Japanese Application No. 2017-098681, filed May 18, 2017. The disclosure of each of the above-identified applications, including the specification, drawings, and claims, is incorporated herein by reference in its entirety.

BACKGROUND

1. Technical Field

The present disclosure relates to a battery.

2. Description of the Related Art

Japanese Unexamined Patent Application Publication No. 2010-056067 discloses a battery in which a current collector, a positive electrode, a solid electrolyte, and a negative electrode have substantially the same disc shape.

Japanese Unexamined Patent Application Publication No. 2013-229315 discloses a coin battery in which a solid electrolyte layer covers the edge portion of a positive electrode current collector and the edge portion of a positive electrode active material layer.

Japanese Unexamined Patent Application Publication No. 2000-149994 discloses a battery in which a positive electrode, a negative electrode, and an electrolyte layer have round corner portions.

SUMMARY

In the related art, a reduction in the probability of coming off of active material is desirably achieved.

In one general aspect, the techniques disclosed here feature a battery including: a first electrode layer, and a second electrode layer disposed on the first electrode layer and serving as a counter electrode for the first electrode layer, wherein the first electrode layer includes a first current collector, a first active material layer, and a first solid electrolyte layer, the first active material layer is disposed to be in contact with the first current collector and to occupy a smaller area than the first current collector, the first solid electrolyte layer is disposed to be in contact with the first current collector and the first active material layer and to occupy the same area as the first current collector, the first active material layer faces the second electrode layer with the first solid electrolyte layer therebetween, and the first electrode layer includes a peripheral portion including a first rounded portion.

The present disclosure enables a reduction in the probability of coming off of active material.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
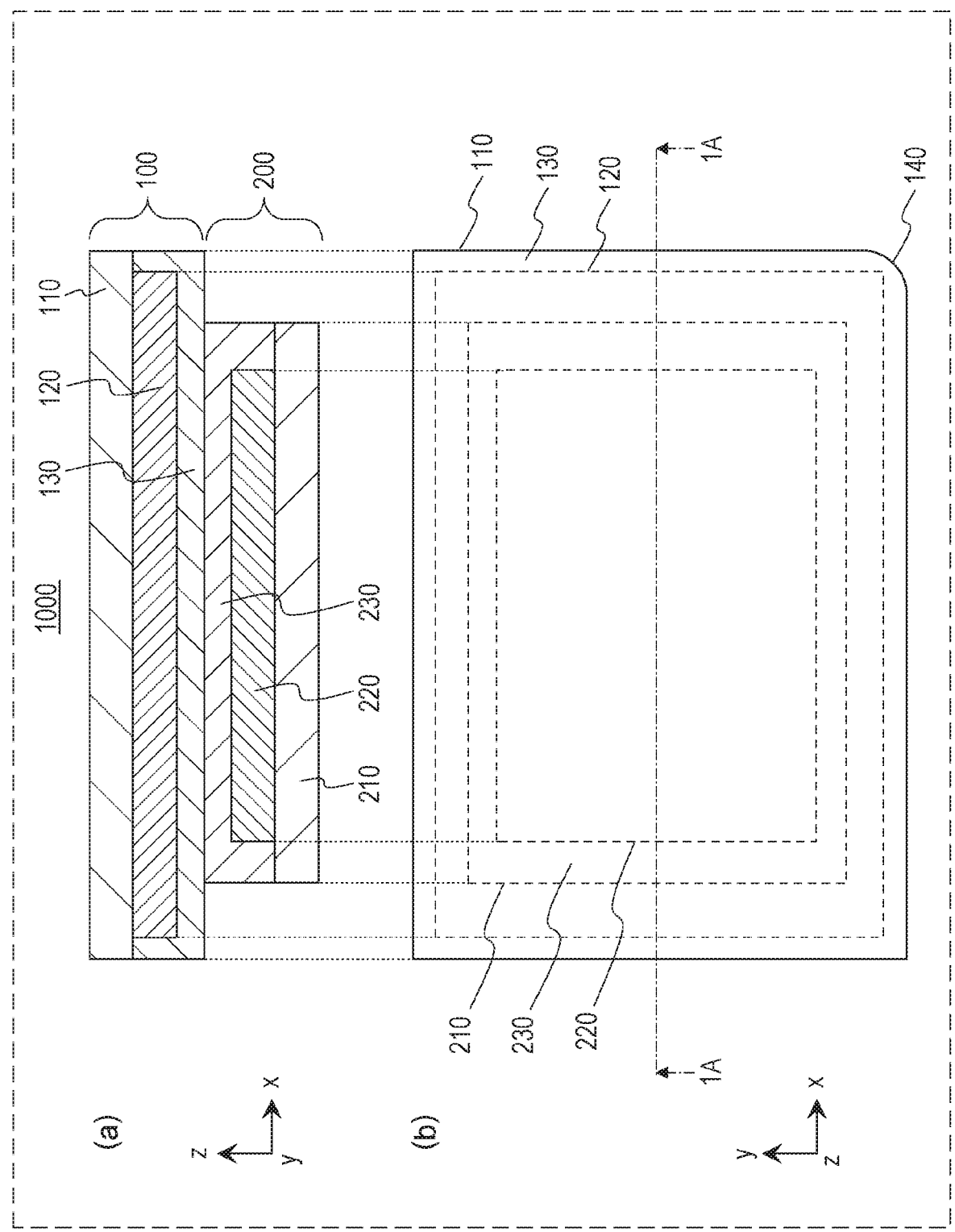
FIG. 1 illustrates the schematic configuration of a battery 1000 according to Embodiment 1.

Hereinafter, embodiments according to the present disclosure will be described with referring to the drawings.

Embodiment 1

FIG. 1 illustrates the schematic configuration of a battery 1000 according to Embodiment 1.

FIG. 1(a) is an x-z view (sectional view taken along line 1A-1A) illustrating the schematic configuration of the battery 1000 according to Embodiment 1.

FIG. 1(b) is an x-y view (top perspective view) illustrating the schematic configuration of the battery 1000 according to Embodiment 1.

The battery 1000 according to Embodiment 1 includes a first electrode layer 100 and a second electrode layer 200.

The second electrode layer 200 is disposed on the first electrode layer 100. The second electrode layer 200 serves as a counter electrode for the first electrode layer 100.

The first electrode layer 100 includes a first current collector 110, a first active material layer 120, and a first solid electrolyte layer 130.

The first active material layer 120 is disposed to be in contact with the first current collector 110, and to occupy a smaller area than the first current collector 110.

The first solid electrolyte layer 130 is disposed to be in contact with the first current collector 110 and the first active material layer 120, and to occupy the same area as the first current collector 110.

The first active material layer 120 faces the second electrode layer 200 with the first solid electrolyte layer 130 therebetween.

The first electrode layer 100 includes a peripheral portion including a first rounded portion 140.

Such a configuration enables a reduction in the probability of coming off of the active material. Specifically, use of the first electrode layer 100, which includes a peripheral portion including the first rounded portion 140, enables a reduction in concentration of stress in the peripheral portion including the first rounded portion 140 in the multilayer body including the first current collector 110 and the first solid electrolyte layer 130 (for example, dispersion of an impact force). This enables, in the peripheral portion including the first rounded portion 140, a reduction in the probability of separation of the first solid electrolyte layer 130 from the first current collector 110 (or falling of the solid electrolyte from the first current collector 110). Thus, the first solid electrolyte layer 130, which is less likely to separate from the first current collector 110, is disposed to cover the first active material layer 120. As a result, for example, even when a corner of the battery being manufactured or used collides and impacts, the first solid electrolyte layer 130 enables a reduction in the damage caused on the first active material layer 120. In other words, the first solid electrolyte layer 130 enables a reduction in the probability of coming off of the active material from the first active material layer 120. This prevents short circuits within the battery that may be caused by movements of, within the battery, the active material coming off from the first active material layer 120. This enables enhanced reliability of the battery.

In the above-described configuration, the first solid electrolyte layer 130, which is less likely to separate from the first current collector 110, is disposed to cover the first active material layer 120. In this case, even when the first active material layer 120 is disposed to extend close to the peripheral portion of the first current collector 110, the active material is prevented from coming off from the first active material layer 120. Thus, the first active material layer 120 can be disposed to occupy an area as large as possible, provided that the area is smaller than that of the first current collector 110. This enables an increase in the energy density of the battery.

In the present disclosure, the phrase "the solid electrolyte layer is disposed to occupy the same area as the current collector" means that the solid electrolyte layer is disposed to occupy substantially the same area as the current collector except for the error unavoidably occurring during the manufacture (for example, the solid electrolyte layer is disposed to have substantially the same shape as the current collector except for the error unavoidably occurring during the manufacture).

Incidentally, as illustrated in FIG. 1, the second electrode layer 200 may include a second current collector 210, a second active material layer 220, and a second solid electrolyte layer 230.

The second active material layer 220 is disposed to be in contact with the second current collector 210.

The second solid electrolyte layer 230 is disposed to be in contact with the second active material layer 220.

The second active material layer 220 faces the first active material layer 120 with the first solid electrolyte layer 130 and the second solid electrolyte layer 230 therebetween.

Such a configuration enables a reduction in the probability of contact between the first current collector 110 and the second current collector 210. Specifically, a portion between the first current collector 110 and the second current collector 210, which face each other with the portion therebetween, is fixed with the first solid electrolyte layer 130 and the second solid electrolyte layer 230. For example, even when the first current collector 110 and the second current collector 210 are constituted by thin films, the presence of the first solid electrolyte layer 130 and the second solid electrolyte layer 230 enables the spacing between the first current collector 110 and the second current collector 210 to be maintained to have at least a predetermined distance (for example, equal to or longer than the total thickness of the first solid electrolyte layer 130 and the second solid electrolyte layer 230). This prevents the first current collector 110 and the second current collector 210 from coming into close proximity to each other. This prevents, for example, even when a plurality of battery cells are stacked, deformation of the first current collector 110 and the second current collector 210. Thus, for example, even when a plurality of battery cells are stacked, short circuits are prevented between the first current collector 110 and the second current collector 210. In addition, in another example that is an all-solid-state battery not having any separator between the first electrode layer 100 and the second electrode layer 200, the risk of short circuits caused by direct contact between the first current collector 110 and the second current collector 210 is reduced.

In addition, the above-described configuration eliminates the necessity of an additional member for insulation between the first electrode layer 100 and the second electrode layer 200 (for example, an insulation spacer). This enables further simplification of and a reduction in the costs for battery manufacturing steps.

Incidentally, the first solid electrolyte layer 130 and the second solid electrolyte layer 230 may be bonded together.

In such a configuration, the solid electrolyte layer provided by bonding together the first solid electrolyte layer 130 and the second solid electrolyte layer 230 enables a reduction in the probability of short circuits due to pinholes that may be formed, for example, during manufacture, in the first solid electrolyte layer 130 and the second solid electrolyte layer 230. More specifically, in a region where the first active material layer 120 and the second active material layer 220 face each other, a bonding interface is provided that is formed by bonding together the first solid electrolyte layer 130 and the second solid electrolyte layer 230. In this case, the first solid electrolyte layer 130 and the second solid electrolyte layer 230 are each formed by a different manufacturing step, so that the positions of pinholes generated in the first solid electrolyte layer 130 do not coincide with the positions of pinholes generated in the second solid electrolyte layer 230. Thus, the second solid electrolyte layer 230 blocks, at the bonding interface, the pinholes generated in the first solid electrolyte layer 130. The first solid electrolyte layer 130 blocks, at the bonding interface, the pinholes generated in the second solid electrolyte layer 230. This enables a reduction in the probability of short circuits due to pinholes that may be generated during manufacture in the solid electrolyte layers.

Incidentally, as illustrated in FIG. 1, a partial region of a main surface (for example, a half or larger region of the main surface) of the first solid electrolyte layer 130 and the whole region of a main surface of the second solid electrolyte layer 230 may be bonded together. Alternatively, a partial region of a main surface (for example, a half or larger region of the main surface) of the first solid electrolyte layer 130 and a partial region of a main surface (for example, a half or larger region of the main surface) of the second solid electrolyte layer 230 may be bonded together. Alternatively, the whole region of a main surface of the first solid electrolyte layer 130 and the whole region of a main surface of the second solid electrolyte layer 230 may be bonded together.

The first active material layer 120 contains an electrode material (for example, an active material).

The second active material layer 220 contains a counter electrode material (for example, an active material). The counter electrode material constitutes the counter electrode for the above-described electrode material.

The first solid electrolyte layer 130 and the second solid electrolyte layer 230 are solid electrolyte layers containing solid electrolytes.

Incidentally, the first active material layer 120 may be a negative electrode active material layer. In this case, the electrode material is a negative electrode active material. The first current collector 110 is a negative electrode current collector. The first solid electrolyte layer 130 is a negative-electrode-side solid electrolyte layer. The second active material layer 220 is a positive electrode active material layer. The counter electrode material is a positive electrode active material. The second current collector 210 is a positive electrode current collector. The second solid electrolyte layer 230 is a positive-electrode-side solid electrolyte layer.

Alternatively, the first active material layer 120 may be a positive electrode active material layer. In this case, the electrode material is a positive electrode active material. The first current collector 110 is a positive electrode current collector. The first solid electrolyte layer 130 is a positive-electrode-side solid electrolyte layer. The second active material layer 220 is a negative electrode active material layer. The counter electrode material is a negative electrode active material. The second current collector 210 is a negative electrode current collector. The second solid electrolyte layer 230 is a negative-electrode-side solid electrolyte layer.

The positive electrode current collector may be selected from publicly known positive electrode current collectors. The positive electrode current collector may be, for example, a metal foil. Examples of the material of the positive electrode current collector include aluminum, copper, stainless steel, nickel, platinum, gold, and alloys containing the foregoing.

The positive electrode active material layer contains a positive electrode active material.

The positive electrode active material may be selected from publicly known positive electrode active materials. When the battery 1000 according to Embodiment 1 is constituted as a lithium ion secondary battery (storage battery), the positive electrode active material may be a compound that has a capability of occluding and releasing Li. For example, the positive electrode active material may be a compound containing lithium. Examples of the positive electrode active material include $LiCoO_2$, $LiNiO_2$, $LiMn_2O_4$, $LiCoPO_4$, $LiMnPO_4$, $LiFePO_4$, $LiNiPO_4$, and compounds obtained by substituting the transition metal of such a compound by one or two hetero elements (for example, $LiNi_{1/3}Co_{1/3}Mn_{1/3}O_2$, $LiNi_{0.8}Co_{0.15}Al_{0.05}O_2$, and $LiNi_{0.5}Mn_{1.5}O_2$).

Incidentally, the positive electrode active material layer may be a positive electrode mixture layer containing a positive electrode active material and another material. Specifically, the positive electrode active material layer may contain a mixture of a positive electrode active material and a solid electrolyte. Alternatively, the positive electrode active material layer may contain, in addition to a positive electrode active material and a solid electrolyte, a conductive additive or a binder, for example.

The positive electrode active material layer may be constituted by a plurality of layers. For example, the positive electrode active material layer may include, on its side in contact with the positive electrode current collector, a first layer. In this case, the positive electrode active material layer may include, on its side in contact with the positive-electrode-side solid electrolyte layer, a second layer. In this case, the first layer and the second layer may be different from each other in terms of constitutions (shape, thickness, and contained material).

The positive-electrode-side solid electrolyte layer contains a positive-electrode-side solid electrolyte.

The positive-electrode-side solid electrolyte may be selected from publicly known solid electrolytes. When the battery 1000 according to Embodiment 1 is constituted as a lithium ion secondary battery (storage battery), the solid electrolyte may be a compound containing lithium. Examples of the solid electrolyte include $Li_3Zr_2Si_2PO_{12}$, $Li_7La_3Zr_2O_{12}$, $Li_5La_3Ta_2O_{12}$, $Li_{1+x}Al_xTi_{2-x}(PO_4)_3$, $Li_{1.5}Ti_{1.7}Al_{0.8}P_{2.8}Si_{0.2}O_{12}$, $La_{2/3-x}Li_{3x}TiO_3$, $Li_2S$—$SiS_2$-based glass and glass ceramics, $Li_2S$—$B_2S_3$-based glass and glass ceramics, $Li_2S$—$P_2S_5$-based glass and glass ceramics, $Li_{3.25}Ge_{0.25}P_{0.75}S_4$, and $Li_{10}GeP_2S_{12}$. Other examples of the solid electrolyte include solid electrolytes obtained by adding an additive such as LiI or $Li_xMO_y$ (M: P, Si, Ge, B, Al, Ga, or In; x, y: natural numbers) to the above-described examples. Examples of the solid electrolyte include inorganic solid electrolytes (sulfide solid electrolytes or oxide solid electrolytes) and polymer solid electrolytes (for example, electrolytes obtained by dissolving a lithium salt in polyethylene oxide).

The positive-electrode-side solid electrolyte layer may be formed of a polymer electrolyte or a mixture of an inorganic solid electrolyte and a binder. In the positive-electrode-side solid electrolyte layer and the positive electrode active material layer, the solid electrolytes may be formed of the same material and the binders may be formed of the same material.

The negative electrode current collector may be selected from publicly known negative electrode current collectors. The negative electrode current collector may be, for example, a metal foil. Examples of the material of the negative electrode current collector include aluminum, copper, stainless steel, nickel, platinum, gold, and alloys containing the foregoing.

The negative electrode active material layer contains a negative electrode active material.

The negative electrode active material may be selected from publicly known negative electrode active materials. When the battery 1000 according to Embodiment 1 is constituted as a lithium ion secondary battery (storage battery), the negative electrode active material may be a compound that has a capability of occluding and releasing Li. For example, the negative electrode active material may be a metal compound or a carbonaceous material. Examples of the negative electrode active material include metal indium, metal lithium, carbonaceous materials (for example, graphite or hard carbon), $Li_4Ti_5O_{12}$, Si, SiO, Sn, and SnO.

Incidentally, the negative electrode active material layer may be a negative electrode mixture layer containing a negative electrode active material and another material. Specifically, the negative electrode active material layer may contain a mixture of a negative electrode active material and a solid electrolyte. Alternatively, the negative electrode active material layer may contain, in addition to a negative electrode active material and a solid electrolyte, a conductive additive or a binder, for example. Incidentally, when the negative electrode active material layer is constituted by a foil formed of a metal that alloys with lithium, addition of the solid electrolyte and the like is not necessary.

The negative-electrode-side solid electrolyte layer contains a negative-electrode-side solid electrolyte.

The negative electrode active material layer may be constituted by a plurality of layers. For example, the negative electrode active material layer may include, on its side in contact with the negative electrode current collector, a first layer. In this case, the negative electrode active material layer may include, on its side in contact with the negative-electrode-side solid electrolyte layer, a second layer. In this case, the first layer and the second layer may be different from each other in terms of constitutions (shape, thickness, and contained material).

The negative-electrode-side solid electrolyte may be selected from publicly known solid electrolytes. Examples of the material of the negative-electrode-side solid electrolyte include the above-described examples of the material of the positive-electrode-side solid electrolyte.

The negative-electrode-side solid electrolyte layer may be formed of a polymer electrolyte or a mixture of an inorganic solid electrolyte and a binder. In the negative-electrode-side solid electrolyte layer and the negative electrode active material layer, the solid electrolytes may be formed of the same material and the binders may be formed of the same material.

Examples of the conductive additives include carbonaceous materials (for example, acetylene black, Ketjenblack, or carbon nanotubes), and metal powders.

The binders may be selected from publicly known polymer compounds. Examples of the binders include polyvinylidene fluoride (PVDF), polyvinylidene fluoride-hexafluoropropylene (PVDF-HFP), rubber-based resins, and elastomers.

Incidentally, the positive-electrode-side solid electrolyte layer and the negative-electrode-side solid electrolyte layer may both contain a solid electrolyte of the same material, or may each contain a solid electrolyte of a different material.

The positive-electrode-side solid electrolyte layer and the negative-electrode-side solid electrolyte layer may both contain a solid electrolyte at the same content (concentration), or may each contain a solid electrolyte at a different content (concentration).

The positive-electrode-side solid electrolyte layer and the negative-electrode-side solid electrolyte layer may have the same thickness or different thicknesses.

As illustrated in FIG. 1, the entirety of the negative electrode current collector may be positioned parallel to the positive electrode current collector. Specifically, the distance between the positive electrode current collector and the negative electrode current collector may be constant over the whole film region. Alternatively, a portion of the negative electrode current collector may be positioned parallel to the positive electrode current collector.

Incidentally, as illustrated in FIG. 1, the first electrode layer 100 may have a shape (in other words, the first current collector 110 and the first solid electrolyte layer 130 may have a shape) including a corner portion.

In this case, the corner portion of the first electrode layer 100 may include a first rounded portion 140.

Such a configuration enables a further reduction in the probability of coming off of the active material. Specifically, in the corner portion including the first rounded portion 140 in the multilayer body including the first current collector 110 and the first solid electrolyte layer 130, a reduction in concentration of stress (for example, dispersion of an impact force) is achieved. This enables, in the corner portion including the first rounded portion 140, a reduction in the probability of separation of the first solid electrolyte layer 130 from the first current collector 110 (or falling of the solid electrolyte from the first current collector 110). Thus, the first solid electrolyte layer 130, which is less likely to separate from the first current collector 110, is disposed to cover the first active material layer 120. As a result, for example, even when a corner of the battery being manufactured or used collides and impacts, the first solid electrolyte layer 130 enables a reduction in the damage caused on the first active material layer 120. In other words, the first solid electrolyte layer 130 enables a reduction in the probability of coming off of the active material from the first active material layer 120. This prevents short circuits within the battery that may be caused by movements of, within the battery, the active material coming off from the first active material layer 120. This enables further enhanced reliability of the battery.

In the above-described configuration, the first solid electrolyte layer 130, which is less likely to separate from the first current collector 110, is disposed to cover the first active material layer 120. In this case, even when the first active material layer 120 is disposed to extend close to the corner portion of the first current collector 110, the active material is prevented from coming off from the first active material layer 120. Thus, the first active material layer 120 can be disposed to occupy an area as large as possible, provided that the area is smaller than that of the first current collector 110. This enables a further increase in the energy density of the battery.

In the present disclosure, the phrase "the shape of a predetermined layer" includes the meaning of "the shape of, in the main surface direction (x-y plane direction), a predetermined layer".

Figure 2:
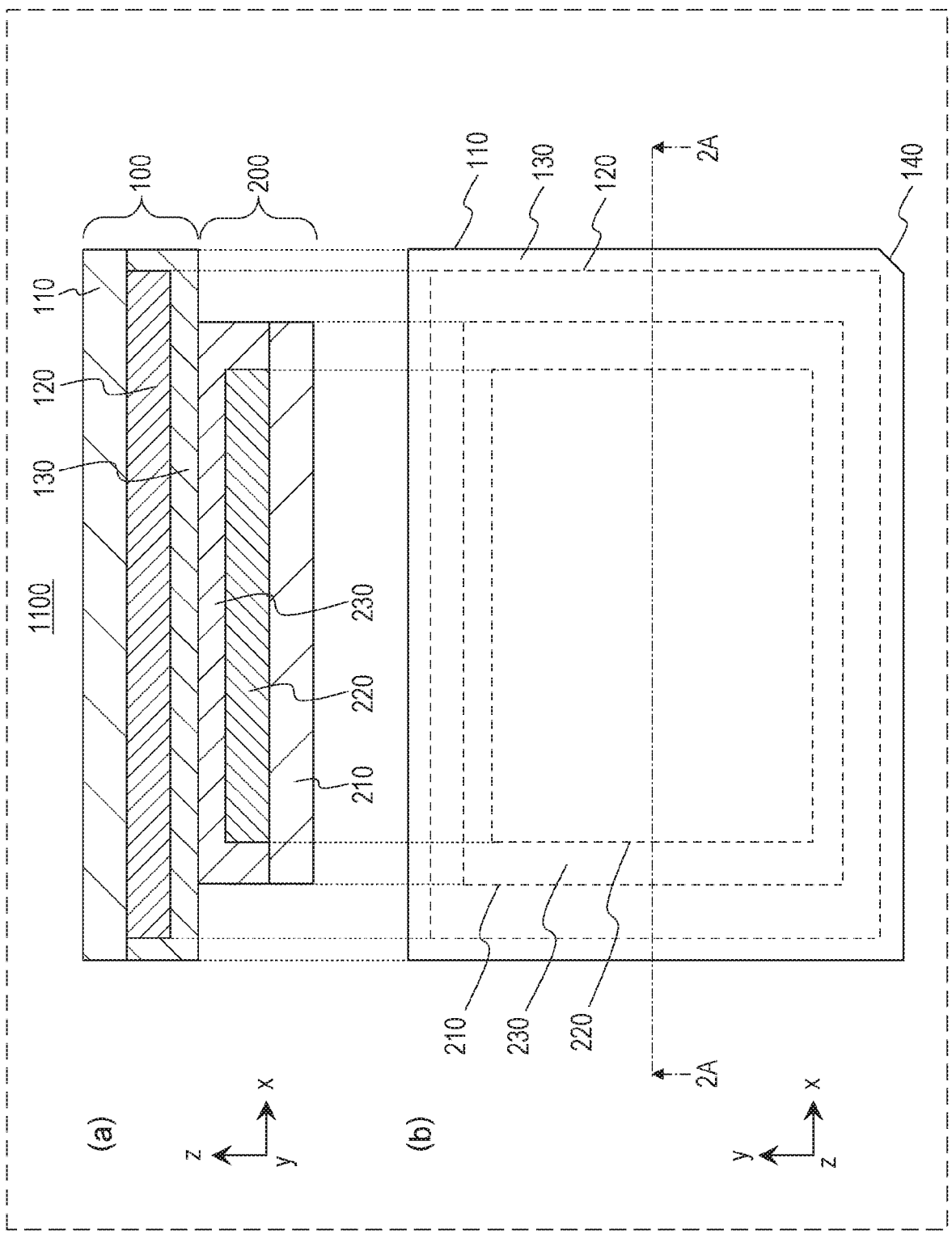
FIG. 2 illustrates the schematic configuration of a battery 1100 according to Embodiment 1.

FIG. 2 illustrates the schematic configuration of a battery 1100 according to Embodiment 1.

FIG. 2(a) is an x-z view (sectional view taken along line 2A-2A) illustrating the schematic configuration of the battery 1100 according to Embodiment 1.

FIG. 2(b) is an x-y view (top perspective view) illustrating the schematic configuration of the battery 1100 according to Embodiment 1.

In the battery 1100 according to Embodiment 1, the first rounded portion 140 is provided by cutting a corner portion of the first electrode layer 100 to form a straight line.

As described above, in the present disclosure, the term "rounded portion" (for example, the first rounded portion 140, a second rounded portion 240, and a rounded portion of an active material layer) includes the meaning of "a portion provided by cutting to form a curve" (namely, a round portion) as illustrated in FIG. 1, and the meaning of "a portion provided by cutting to form a straight line" (namely, a portion having an angle of 90° or larger) as illustrated in FIG. 2.

Figure 3:
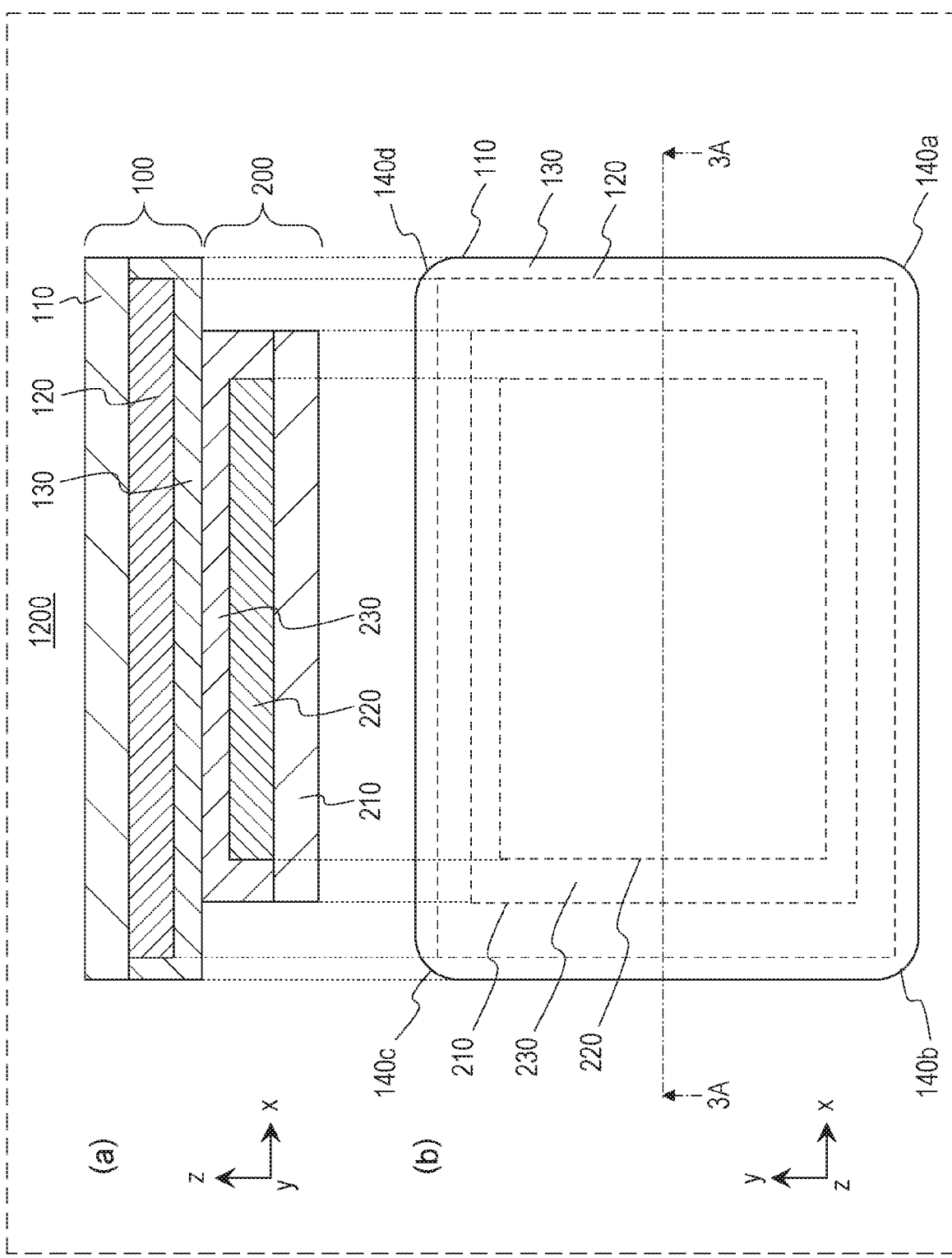
FIG. 3 illustrates the schematic configuration of a battery 1200 according to Embodiment 1.

FIG. 3 illustrates the schematic configuration of a battery 1200 according to Embodiment 1.

FIG. 3(a) is an x-z view (sectional view taken along line 3A-3A) illustrating the schematic configuration of the battery 1200 according to Embodiment 1.

FIG. 3(b) is an x-y view (top perspective view) illustrating the schematic configuration of the battery 1200 according to Embodiment 1.

The battery 1200 according to Embodiment 1 includes, in addition to the above-described features of the battery 1000 according to Embodiment 1, the following feature.

Specifically, in the battery 1200 according to Embodiment 1, the first electrode layer 100 has a polygon shape including a plurality of corner portions (for example, a triangular shape, a quadrangular shape or a rectangular shape).

In this case, each of the plurality of corner portions of the first electrode layer 100 is formed to include the first rounded portion 140. For example, in the example illustrated in FIG. 3, the first electrode layer 100 having a rectangular shape has four corner portions and all of these corner portions are formed to include a first rounded portion 140a, a first rounded portion 140b, a first rounded portion 140c, and a first rounded portion 140d.

Such a configuration enables a further reduction in the probability of coming off of the active material. Specifically, in each corner portion of the multilayer body including the first current collector 110 and the first solid electrolyte layer 130, a reduction in concentration of stress (for example, dispersion of an impact force) is achieved. This enables, in each corner portion including the first rounded portion 140, a reduction in the probability of separation of the first solid electrolyte layer 130 from the first current collector 110 (or falling of the solid electrolyte from the first current collector 110). Thus, the first solid electrolyte layer 130, which is less likely to separate from the first current collector 110, is disposed to cover the first active material layer 120. As a result, for example, even when a corner of the battery being manufactured or used collides and impacts, the first solid electrolyte layer 130 enables a reduction in the damage caused on the first active material layer 120. In other words, the first solid electrolyte layer 130 enables a reduction in the probability of coming off of the active material from the first active material layer 120. This prevents short circuits within the battery that may be caused by movements of, within the battery, the active material coming off from the first active material layer 120. This enables further enhanced reliability of the battery.

In the above-described configuration, the first solid electrolyte layer 130, which is less likely to separate from the first current collector 110, is disposed to cover the first active material layer 120. In this case, even when the first active material layer 120 is disposed to extend close to all the corner portions of the first current collector 110, the active material is prevented from coming off from the first active material layer 120. Thus, the first active material layer 120 can be disposed to occupy an area as large as possible, provided that the area is smaller than that of the first current collector 110. This enables a further increase in the energy density of the battery.

In the case where a plurality of batteries according to Embodiment 1 are arranged, the above-described configuration in which such first electrode layers 100 have a polygon shape enables a denser arrangement of the batteries. Specifically, compared with a configuration employing first electrode layers 100 having a circular shape (for example, coin batteries), the configuration employing first electrode layers 100 having a polygon shape (for example, prismatic batteries) enables small spacing between batteries arranged in a planar direction. This enables a further increase in the energy density of a battery module (or a battery pack) constituted by arranging a plurality of batteries.

Figure 4:
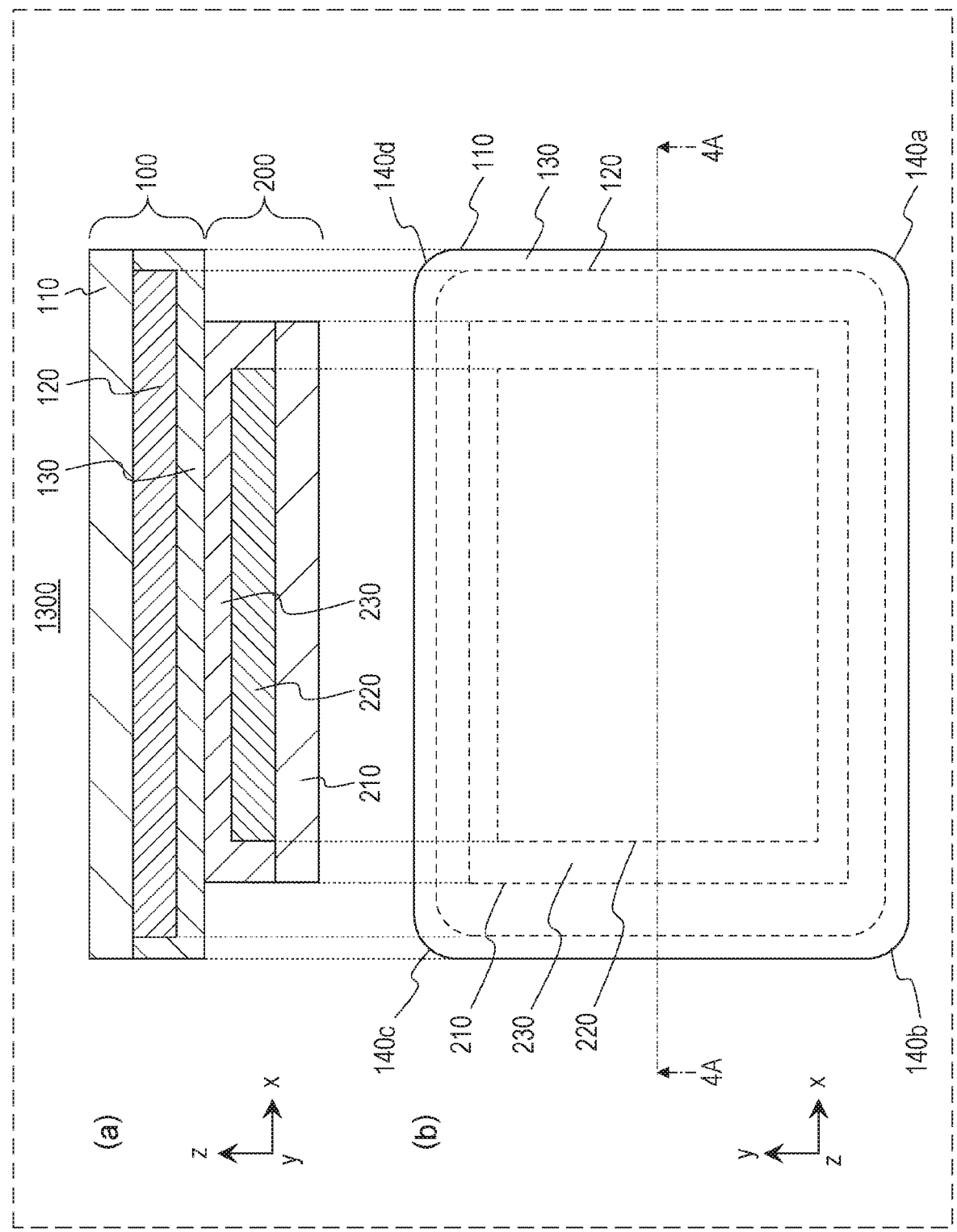
FIG. 4 illustrates the schematic configuration of a battery 1300 according to Embodiment 1.

FIG. 4 illustrates the schematic configuration of a battery 1300 according to Embodiment 1.

FIG. 4(a) is an x-z view (sectional view taken along line 4A-4A) illustrating the schematic configuration of the battery 1300 according to Embodiment 1.

FIG. 4(b) is an x-y view (top perspective view) illustrating the schematic configuration of the battery 1300 according to Embodiment 1.

The battery 1300 according to Embodiment 1 includes, in addition to the above-described features of the battery 1200 according to Embodiment 1, the following feature.

Specifically, in the battery 1300 according to Embodiment 1, among the corner portions of the first active material layer 120, corner portions adjacent to the first rounded portions 140 are formed to include a rounded portion. For example, in the example illustrated in FIG. 4, among the corner portions of the first active material layer 120, corner portions adjacent to the first rounded portion 140a, the first rounded portion 140b, the first rounded portion 140c, and the first rounded portion 140d are each formed to include a rounded portion.

Such a configuration enables a further reduction in the probability of coming off of the active material. Specifically, in the corner portions of the first active material layer 120, a reduction in concentration of stress (for example, dispersion of an impact force) is achieved. This enables, in each corner portion including the first rounded portion 140, a reduction in the probability of separation of the first active material layer 120 from the first current collector 110 (or falling of the first active material layer 120 from the first current collector 110).

Incidentally, the shape of such a rounded portion of the first active material layer 120 may be selected from the above-described shapes for the first rounded portion 140.

FIGS. 5A to 5E are x-y views (top perspective views) illustrating other examples of the shapes of the first current collector 110 and the first active material layer 120.

Figure 5A:
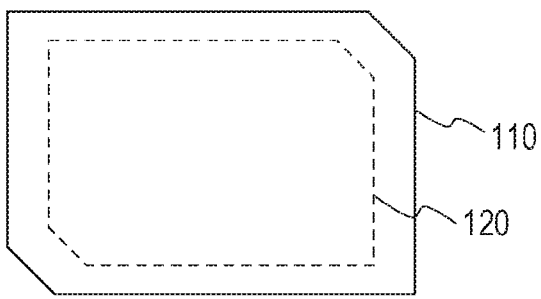
FIGS. 5A to 5E are x-y views (top perspective views) of other example shapes of a first current collector 110 and a first active material layer 120.

As illustrated in FIG. 5A, among the corner portions of the first current collector 110, two diagonally opposite corner portions may each be formed to include the first rounded portion 140. In this case, the first active material layer 120 may have the same shape as the first current collector 110.

Figure 5B:
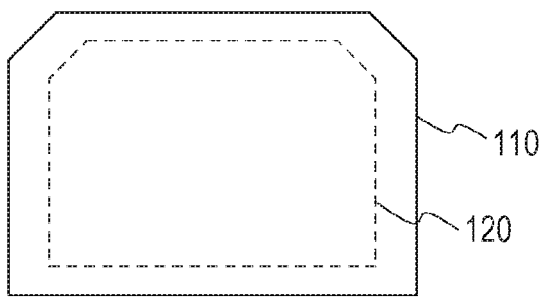

Alternatively, as illustrated in FIG. 5B, among the corner portions of the first current collector 110, two adjacent corner portions may each be formed to include the first rounded portion 140. In this case, the first active material layer 120 may have the same shape as the first current collector 110.

Figure 5C:
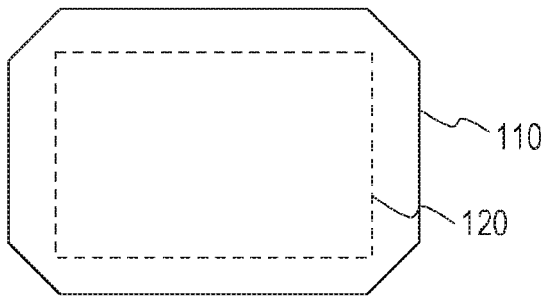
Figure 5D:
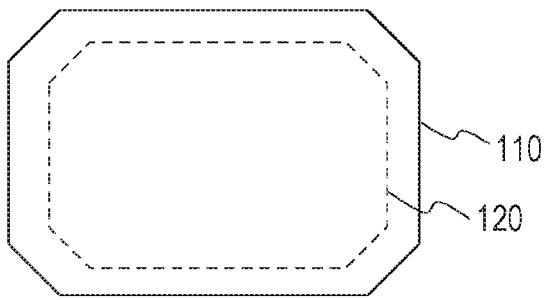
Figure 5E:
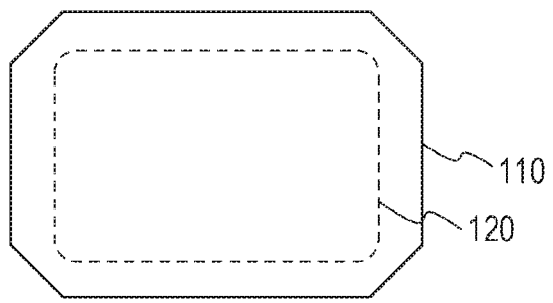

Alternatively, as illustrated in FIGS. 5C to 5E, among the corner portions of the first current collector 110, all the corner portions may be cut to have straight line shapes, to thereby include four first rounded portions 140. In this case, as illustrated in FIG. 5C, the first active material layer 120 may not have any rounded portion. Alternatively, as illustrated in FIG. 5D, the first active material layer 120 may have the same shape as the first current collector 110. Alternatively, as illustrated in FIG. 5E, all the corner portions of the first active material layer 120 may be cut to have curved shapes, to thereby include four rounded portions.

Figure 6:
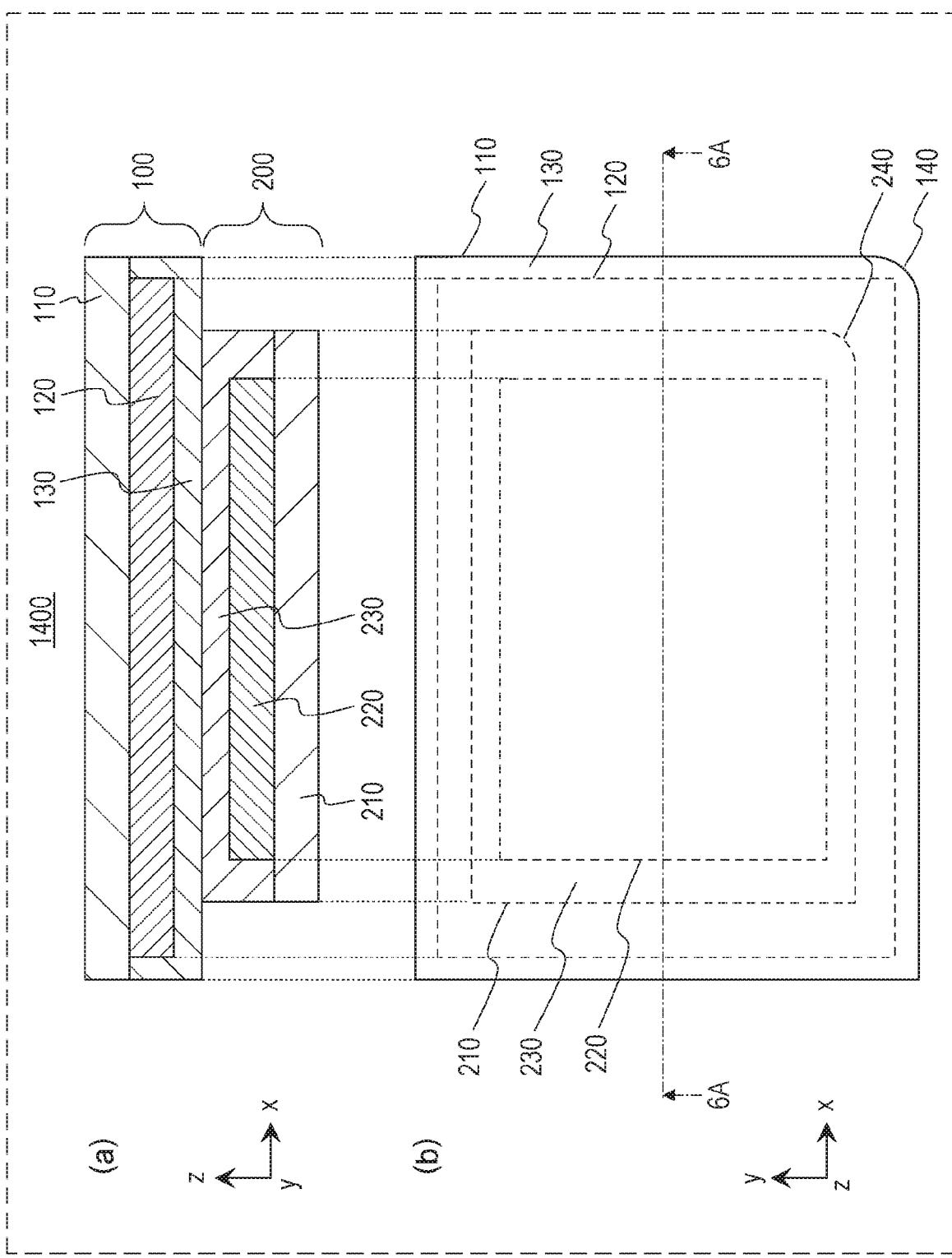
FIG. 6 illustrates the schematic configuration of a battery 1400 according to Embodiment 1.

FIG. 6 illustrates the schematic configuration of a battery 1400 according to Embodiment 1.

FIG. 6(*a*) is an x-z view (sectional view taken along line 6A-6A) illustrating the schematic configuration of the battery 1400 according to Embodiment 1.

FIG. 6(*b*) is an x-y view (top perspective view) illustrating the schematic configuration of the battery 1400 according to Embodiment 1.

The battery 1400 according to Embodiment 1 includes, in addition to the above-described features of the battery 1000 according to Embodiment 1, the following feature.

Specifically, in the battery 1400 according to Embodiment 1, the second electrode layer 200 includes a second current collector 210, a second active material layer 220, and a second solid electrolyte layer 230.

The second active material layer 220 is disposed to be in contact with the second current collector 210, and to occupy a smaller area than the second current collector 210.

The second solid electrolyte layer 230 is disposed to be in contact with the second current collector 210 and the second active material layer 220, and to occupy the same area as the second current collector 210.

The second active material layer 220 faces the first active material layer 120 with the first solid electrolyte layer 130 and the second solid electrolyte layer 230 therebetween.

The first solid electrolyte layer 130 and the second solid electrolyte layer 230 are bonded together.

The peripheral portion of the second electrode layer 200 is formed to include a second rounded portion 240.

Such a configuration enables a further reduction in the probability of coming off of the active material. Specifically, use of the second electrode layer 200, which includes the peripheral portion including the second rounded portion 240, enables a reduction in concentration of stress (for example, dispersion of an impact force) in the peripheral portion including the second rounded portion 240 in the multilayer body including the second current collector 210 and the second solid electrolyte layer 230. This enables, in the peripheral portion including the second rounded portion 240, a reduction in the probability of separation of the second solid electrolyte layer 230 from the second current collector 210 (or falling of the solid electrolyte from the second current collector 210). Thus, the second solid electrolyte layer 230, which is less likely to separate from the second current collector 210, is disposed to cover the second active material layer 220. As a result, for example, even when a corner of the battery being manufactured or used collides and impacts, the second solid electrolyte layer 230 enables a reduction in the damage caused on the second active material layer 220. In other words, the second solid electrolyte layer 230 enables a reduction in the probability of coming off of the active material from the second active material layer 220. This prevents short circuits within the battery that may be caused by movements of, within the battery, the active material coming off from the second active material layer 220. This enables further enhanced reliability of the battery.

In the above-described configuration, the second solid electrolyte layer 230, which is less likely to separate from the second current collector 210, is disposed to cover the second active material layer 220. In this case, even when the second active material layer 220 is disposed to extend close to the peripheral portion of the second current collector 210, the active material is prevented from coming off from the second active material layer 220. Thus, the second active material layer 220 can be disposed to occupy an area as large as possible, provided that the area is smaller than that of the second current collector 210. This enables a further increase in the energy density of the battery.

Incidentally, as illustrated in FIG. 6, the shape of the second electrode layer 200 (in other words, the shapes of the second current collector 210 and the second solid electrolyte layer 230) may include corner portions.

In this case, a corner portion of the second electrode layer 200 may be formed to include the second rounded portion 240.

Such a configuration enables a further reduction in the probability of coming off of the active material. Specifically, in the corner portion including the second rounded portion 240 in the multilayer body including the second current collector 210 and the second solid electrolyte layer 230, a reduction in concentration of stress (for example, dispersion of an impact force) is achieved. This enables, in the corner portion including the second rounded portion 240, a reduction in the probability of separation of the second solid electrolyte layer 230 from the second current collector 210 (or falling of the solid electrolyte from the second current collector 210). Thus, the second solid electrolyte layer 230, which is less likely to separate from the second current collector 210, is disposed to cover the second active material layer 220. As a result, for example, even when a corner of the battery being manufactured or used collides and impacts, the second solid electrolyte layer 230 enables a reduction in the damage caused on the second active material layer 220. In other words, the second solid electrolyte layer 230 enables a reduction in the probability of coming off of the active material from the second active material layer 220. This prevents short circuits within the battery that may be caused by movements of, within the battery, the active material coming off from the second active material layer 220. This enables further enhanced reliability of the battery.

In the above-described configuration, the second solid electrolyte layer 230, which is less likely to separate from the second current collector 210, is disposed to cover the second active material layer 220. In this case, even when the second active material layer 220 is disposed to extend close to the corner portion of the second current collector 210, the active material is prevented from coming off from the second active material layer 220. Thus, the second active material layer 220 can be disposed to occupy an area as large as possible, provided that the area is smaller than that of the second current collector 210. This enables a further increase in the energy density of the battery.

Incidentally, the shape of the second rounded portion 240 may be selected from the above-described shapes for the first rounded portion 140.

Figure 7:
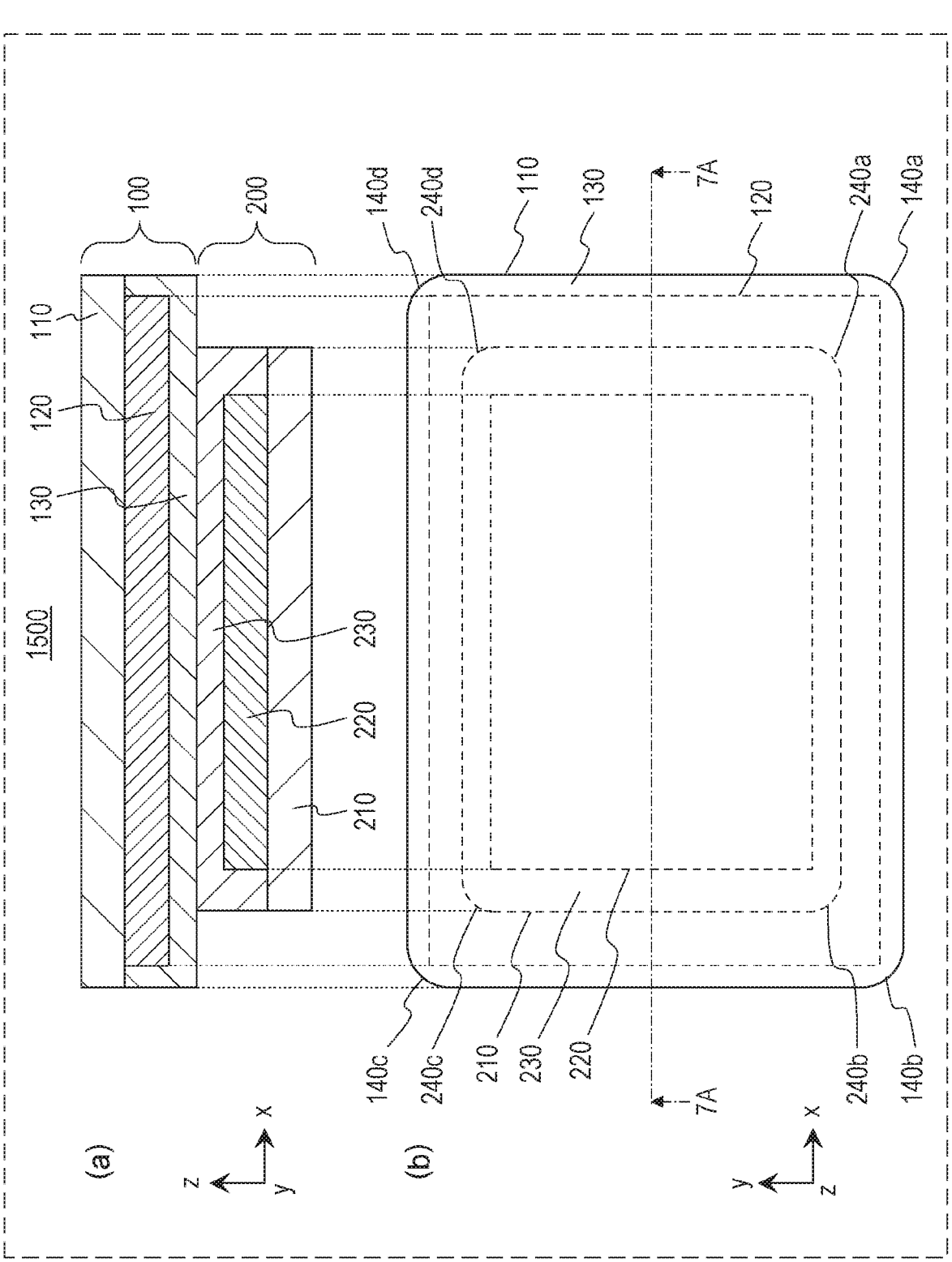
FIG. 7 illustrates the schematic configuration of a battery 1500 according to Embodiment 1.

FIG. 7 illustrates the schematic configuration of a battery 1500 according to Embodiment 1.

FIG. 7(*a*) is an x-z view (sectional view taken along line 7A-7A) illustrating the schematic configuration of the battery 1500 according to Embodiment 1.

FIG. 7(*b*) is an x-y view (top perspective view) illustrating the schematic configuration of the battery 1500 according to Embodiment 1.

The battery 1500 according to Embodiment 1 includes, in addition to the above-described features of the battery 1200 according to Embodiment 1, the following feature.

Specifically, in the battery 1500 according to Embodiment 1, the second electrode layer 200 has a polygon shape including a plurality of corner portions (for example, a triangular shape, a quadrangular shape or a rectangular shape).

In this case, all of the corner portions of the second electrode layer 200 are formed to include second rounded portions 240. For example, in the example illustrated in FIG. 7, all of the four corner portions of the second electrode layer 200, which has a rectangular shape, are formed to include a second rounded portion 240*a*, a second rounded portion 240*b*, a second rounded portion 240*c*, and a second rounded portion 240*d*.

Such a configuration enables a further reduction in the probability of coming off of the active material. Specifically, in all the corner portions of the multilayer body including the second current collector 210 and the second solid electrolyte layer 230, a reduction in concentration of stress (for example, dispersion of an impact force) is achieved. This enables a reduction in the probability of, in all the corner portions including the second rounded portions 240, separation of the second solid electrolyte layer 230 from the second current collector 210 (or falling of the solid electrolyte from the second current collector 210). Thus, the second solid electrolyte layer 230, which is less likely to separate from the second current collector 210, is disposed to cover the second active material layer 220. As a result, for example, even when a corner of the battery being manufactured or used collides and impacts, the second solid electrolyte layer 230 enables a reduction in the damage caused on the second active material layer 220. In other words, the second solid electrolyte layer 230 enables a reduction in the probability of coming off of the active material from the second active material layer 220. This prevents short circuits within the battery that may be caused by movements of, within the battery, the active material coming off from the second active material layer 220. This enables further enhanced reliability of the battery.

In the above-described configuration, the second solid electrolyte layer 230, which is less likely to separate from the second current collector 210, is disposed to cover the second active material layer 220. In this case, even when the second active material layer 220 is disposed to extend close to all the corner portions of the second current collector 210, the active material is prevented from coming off from the second active material layer 220. Thus, the second active material layer 220 can be disposed to occupy an area as large as possible, provided that the area is smaller than that of the second current collector 210. This enables a further increase in the energy density of the battery.

In the case where a plurality of batteries according to Embodiment 1 are arranged, the above-described configuration in which such second electrode layers 200 have a polygon shape enables a denser arrangement of the batteries. Specifically, compared with a configuration employing second electrode layers 200 having a circular shape (for example, coin batteries), the configuration employing second electrode layers 200 having a polygon shape (for example, prismatic batteries) enables small spacing between batteries arranged in a planar direction. This enables a further increase in the energy density of a battery module (or a battery pack) constituted by arranging a plurality of batteries.

Figure 8:
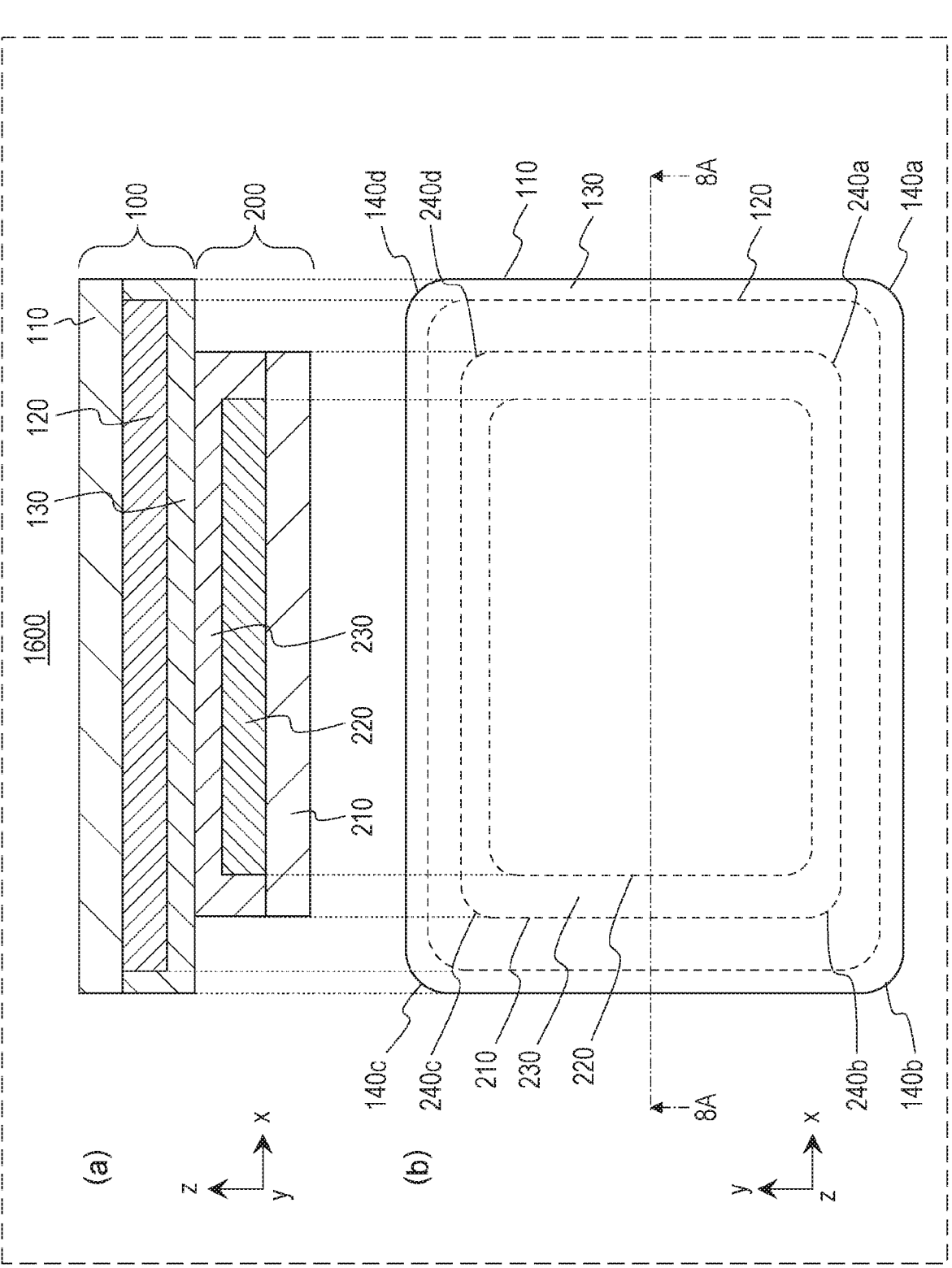
FIG. 8 illustrates the schematic configuration of a battery 1600 according to Embodiment 1.

FIG. 8 illustrates the schematic configuration of a battery 1600 according to Embodiment 1.

FIG. 8(*a*) is an x-z view (sectional view taken along line 8A-8A) illustrating the schematic configuration of the battery 1600 according to Embodiment 1.

FIG. 8(*b*) is an x-y view (top perspective view) illustrating the schematic configuration of the battery 1600 according to Embodiment 1.

The battery 1600 according to Embodiment 1 includes, in addition to the above-described features of the battery 1500 according to Embodiment 1, the following feature.

Specifically, in the battery 1600 according to Embodiment 1, among the corner portions of the second active material layer 220, the corner portions adjacent to the second rounded portions 240 are formed to include rounded portions. For example, in the example illustrated in FIG. 8, among the corner portions of the second active material layer 220, corner portions adjacent to the second rounded portion 240*a*, the second rounded portion 240*b*, the second rounded portion 240*c*, and the second rounded portion 240*d* are formed to include rounded portions.

Such a configuration enables a further reduction in the probability of coming off of the active material. Specifically, in the corner portions of the second active material layer 220, a reduction in concentration of stress (for example, dispersion of an impact force) is achieved. This enables, in the corner portions including the second rounded portions 240, a reduction in the probability of separation of the second active material layer 220 from the second current collector 210 (or falling of the second active material layer 220 from the second current collector 210).

Incidentally, in the battery 1600 according to Embodiment 1, among the corner portions of the first active material layer 120, corner portions adjacent to the first rounded portions 140 may be formed to include rounded portions. For example, in the example illustrated in FIG. 8, among the corner portions of the first active material layer 120, corner portions adjacent to the first rounded portion 140*a*, the first rounded portion 140*b*, the first rounded portion 140*c*, and the first rounded portion 140*d* are formed to include rounded portions.

Incidentally, the shape of the rounded portions of the second active material layer 220 may be selected from the above-described shapes for the first rounded portion 140.

Other examples of the shapes of the second current collector 210 and the second active material layer 220 include the shapes illustrated in FIGS. 5A to 5E as other examples of the shapes of the first current collector 110 and the first active material layer 120.

Figure 9:
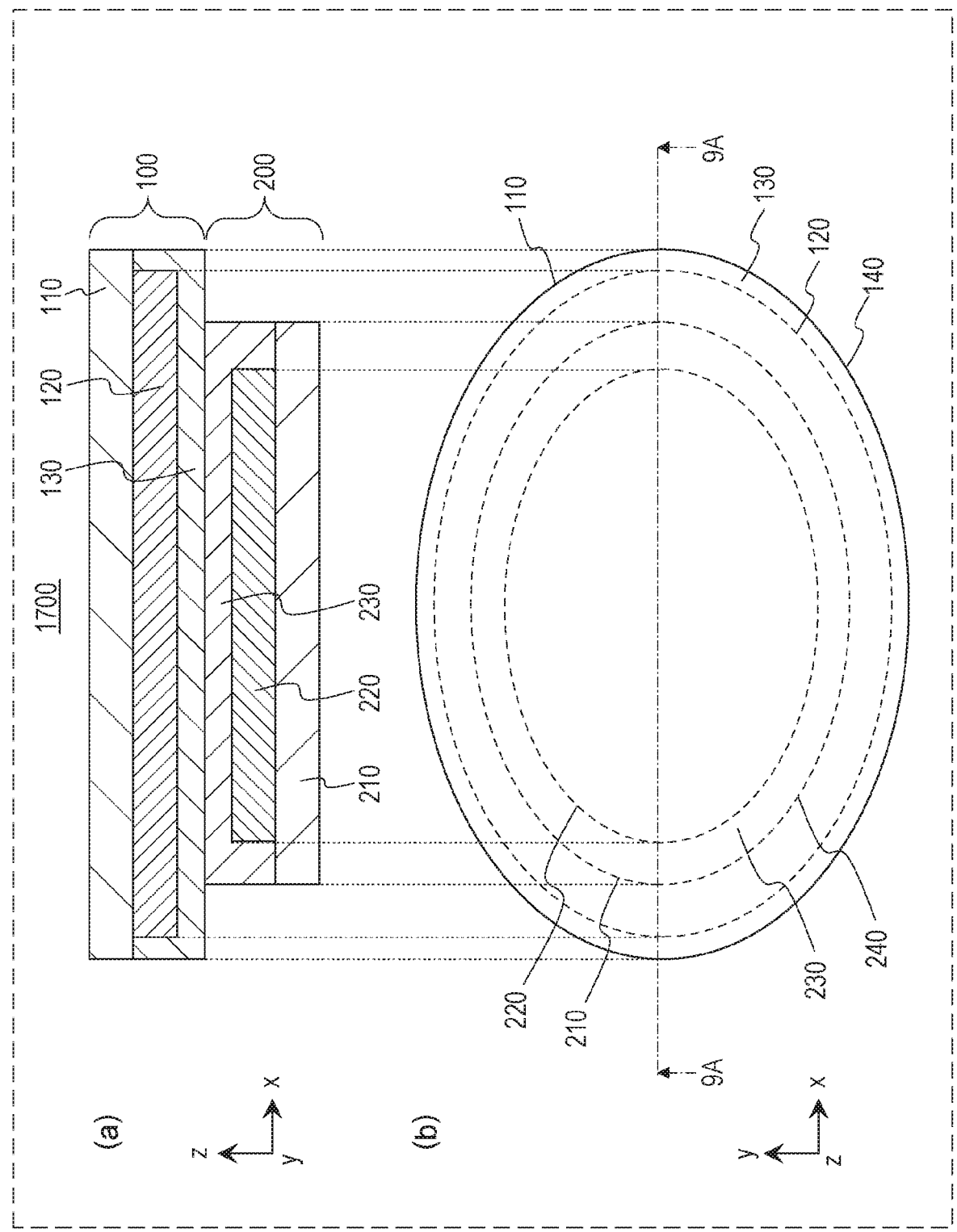
FIG. 9 illustrates the schematic configuration of a battery 1700 according to Embodiment 1.

FIG. 9 illustrates the schematic configuration of a battery 1700 according to Embodiment 1.

FIG. 9(*a*) is an x-z view (sectional view taken along line 9A-9A) illustrating the schematic configuration of the battery 1700 according to Embodiment 1.

FIG. 9(*b*) is an x-y view (top perspective view) illustrating the schematic configuration of the battery 1700 according to Embodiment 1.

The battery 1700 according to Embodiment 1 includes, in addition to the above-described features of the battery 1600 according to Embodiment 1, the following feature.

Specifically, in the battery 1700 according to Embodiment 1, the first electrode layer 100 has a circular shape (for example, an elliptic shape, a perfect circle shape, or a coin shape). In this case, the first rounded portion 140 refers to the edge portion (peripheral portion) of the circular first electrode layer 100.

Such a configuration enables a further reduction in the probability of coming off of the active material. Specifically, use of the circular first electrode layer 100 enables, over the whole peripheral portion of the multilayer body including the first current collector 110 and the first solid electrolyte layer 130, a reduction in concentration of stress (for example, dispersion of an impact force). This enables, over the whole peripheral portion, a reduction in the probability of separation of the first solid electrolyte layer 130 from the first current collector 110 (or falling of the solid electrolyte from the first current collector 110). Thus, the first solid electrolyte layer 130, which is less likely to separate from the first current collector 110, is disposed to cover the first active material layer 120. As a result, for example, even when a corner of the battery being manufactured or used collides and impacts, the first solid electrolyte layer 130 enables a reduction in the damage caused on the first active material layer 120. In other words, the first solid electrolyte layer 130 enables a reduction in the probability of coming off of the active material from the first active material layer 120. This prevents short circuits within the battery that may be caused by movements of, within the battery, the active material coming off from the first active material layer 120. This enables further enhanced reliability of the battery.

In the above-described configuration, the first solid electrolyte layer 130, which is less likely to separate from the first current collector 110, is disposed to cover the first active material layer 120. In this case, even when the first active material layer 120 is disposed to extend close to the whole peripheral portion of the first current collector 110, the active material is prevented from coming off from the first active material layer 120. Thus, the first active material layer 120 can be disposed to occupy an area as large as possible, provided that the area is smaller than that of the first current collector 110. This enables a further increase in the energy density of the battery.

Incidentally, in the battery 1700 according to Embodiment 1, the second electrode layer 200 may have a circular shape (for example, an elliptic shape, a perfect circle shape, or a coin shape). In this case, the second rounded portion 240 refers to the edge portion (peripheral portion) of the circular second electrode layer 200.

Such a configuration enables a further reduction in the probability of coming off of the active material. Specifically, use of the circular second electrode layer 200 enables, over the whole peripheral portion of the multilayer body including the second current collector 210 and the second solid electrolyte layer 230, a reduction in concentration of stress (for example, dispersion of an impact force). This enables, over the whole peripheral portion, a reduction in the probability of separation of the second solid electrolyte layer 230 from the second current collector 210 (or falling of the solid electrolyte from the second current collector 210). Thus, the second solid electrolyte layer 230, which is less likely to separate from the second current collector 210, is disposed to cover the second active material layer 220. As a result, for example, even when a corner of the battery being manufactured or used collides and impacts, the second solid electrolyte layer 230 enables a reduction in the damage caused on the second active material layer 220. In other words, the second solid electrolyte layer 230 enables a reduction in the probability of coming off of the active material from the second active material layer 220. This prevents short circuits within the battery that may be caused by movements of, within the battery, the active material coming off from the second active material layer 220. This enables further enhanced reliability of the battery.

In the above-described configuration, the second solid electrolyte layer 230, which is less likely to separate from the second current collector 210, is disposed to cover the second active material layer 220. In this case, even when the second active material layer 220 is disposed to extend close to the whole peripheral portion of the second current collector 210, the active material is prevented from coming off from the second active material layer 220. Thus, the second active material layer 220 can be disposed to occupy an area as large as possible, provided that the area is smaller than that of the second current collector 210. This enables a further increase in the energy density of the battery.

Incidentally, as illustrated in FIG. 9, in the battery 1700 according to Embodiment 1, one or both of the first active material layer 120 and the second active material layer 220 may have a circular shape (for example, an elliptic shape, a perfect circle shape, or a coin shape).

Such a configuration enables a further reduction in the probability of coming off of the active material. Specifically, over the whole peripheral portion of the first active material layer 120 and the second active material layer 220, a reduction in concentration of stress (for example, dispersion of an impact force) is achieved. This enables, over the whole peripheral portion, a reduction in the probability of separation of the first active material layer 120 from the first current collector 110 (or falling of the first active material layer 120 from the first current collector 110), and a reduction in the probability of separation of the second active material layer 220 from the second current collector 210 (or falling of the second active material layer 220 from the second current collector 210).

Incidentally, in Embodiment 1, the first active material layer 120 may be disposed to occupy a larger area than the second active material layer 220.

In this case, the second active material layer 220 may be disposed within the area of the first active material layer 120.

Such a configuration enables suppression of precipitation of metal (for example, lithium) on the first electrode layer 100. This prevents short circuits between the first electrode layer 100 and the second electrode layer 200 due to precipitation of metal. For example, in the case of a lithium ion battery employing a carbonaceous material or metal lithium for the negative electrode, the negative-electrode-side potential during charge decreases to around a potential at which lithium ions precipitate as metal. Thus, for example, when the battery is charged or rapidly charged in a low-temperature environment, the negative electrode active material may not exhibit a sufficiently high occlusion rate for lithium ions. In this case, lithium ions may precipitate as metal lithium. This precipitation of metal lithium particularly tends to occur at an edge portion, where current concentrates. Thus, the battery is constituted such that, in a perspective view of the battery viewed on a main surface side of the battery, the main surface of the first active material layer 120 has a shape contained within the main surface of the second active material layer 220. This enables suppression of precipitation of metal lithium when the first active material layer 120 is a negative electrode active material layer.

Embodiment 2

Hereinafter, Embodiment 2 will be described. Some descriptions overlapping those described in Embodiment 1 above will be appropriately omitted.

Figure 10:
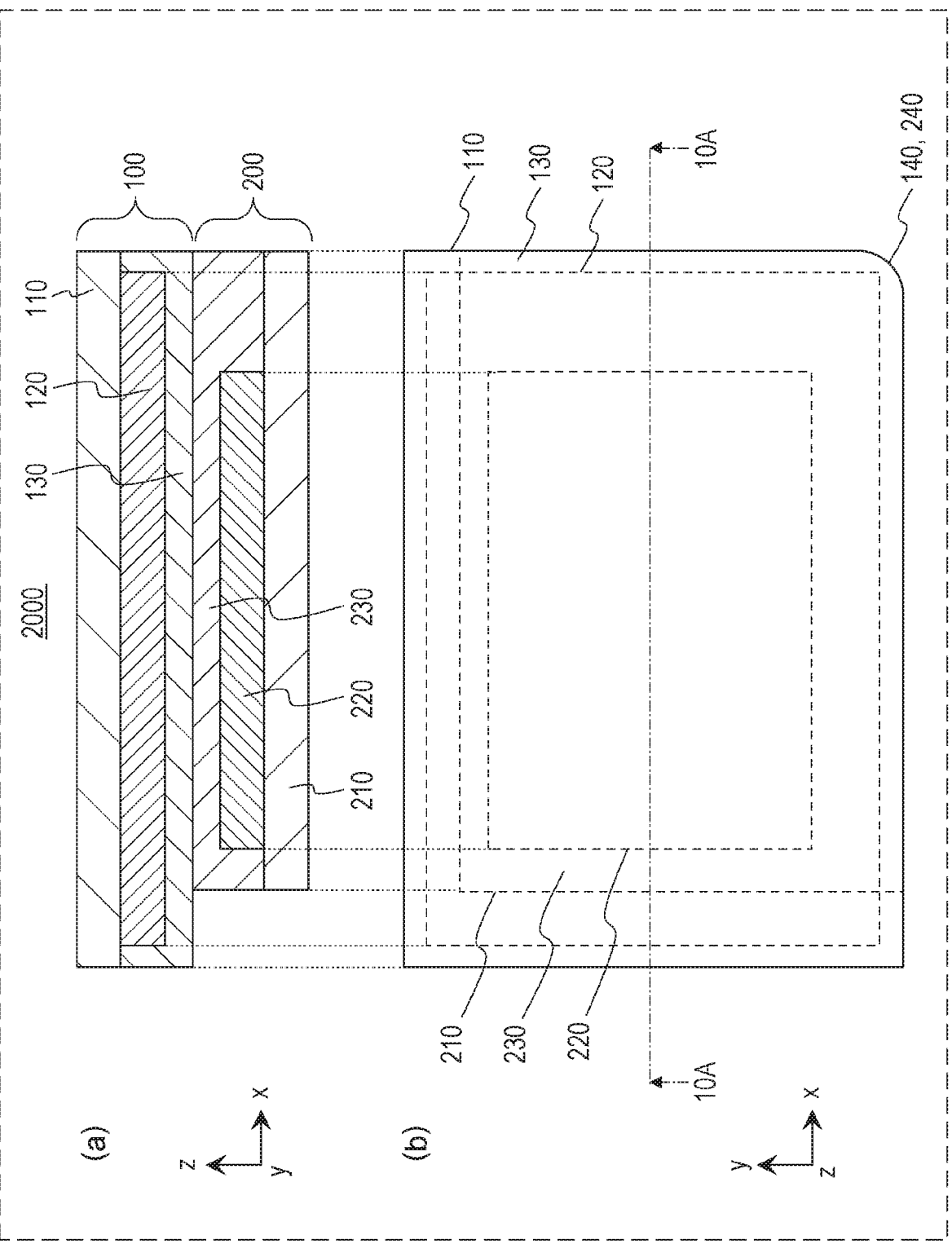
FIG. 10 illustrates the schematic configuration of a battery 2000 according to Embodiment 2.

FIG. 10 illustrates the schematic configuration of a battery 2000 according to Embodiment 2.

FIG. 10(a) is an x-z view (sectional view taken along line 10A-10A) illustrating the schematic configuration of the battery 2000 according to Embodiment 2.

FIG. 10(b) is an x-y view (top perspective view) illustrating the schematic configuration of the battery 2000 according to Embodiment 2.

The battery 2000 according to Embodiment 2 includes, in addition to the above-described features of the battery 1400 according to Embodiment 1, the following feature.

Specifically, in the battery 2000 according to Embodiment 2, the first rounded portion 140 and the second rounded portion 240 have the same shape.

In this case, the first electrode layer 100 and the second electrode layer 200 are disposed on each other, and the edge portion of the first rounded portion 140 and the edge portion of the second rounded portion 240 are located to coincide with each other.

Such a configuration enables stronger bonding between the first solid electrolyte layer 130 and the second solid electrolyte layer 230. Specifically, the first electrode layer 100 and the second electrode layer 200 are disposed on each other, and the edge portion of the first rounded portion 140 and the edge portion of the second rounded portion 240 are located to coincide with each other. In this case, no stepped structure is formed in the position of the edge portion of the first rounded portion 140 and the edge portion of the second rounded portion 240. This enables, in the position of the edge portion of the first rounded portion 140 and the edge portion of the second rounded portion 240, a reduction in the probability of separation of the second solid electrolyte layer 230 from the first solid electrolyte layer 130. This enables further suppression of coming off of a battery member (for example, coming off of the active material) due to separation of the second solid electrolyte layer 230 from the first solid electrolyte layer 130.

Incidentally, in the present disclosure, the phrase "the shape of the rounded portion" includes the meaning of "the shape, in the main surface direction (x-y plane direction), of a predetermined layer including the rounded portion".

In the present disclosure, the phrase "two rounded portions have the same shape" includes the meaning of "two predetermined layers including two rounded portions have the same shape in the main surface direction (x-y plane direction)".

Incidentally, in the present disclosure, as illustrated in FIG. 10, the phrase "the edge portion of the first rounded portion 140 and the edge portion of the second rounded portion 240 are located to coincide with each other" includes the meaning of, for example, "the curved cut portion forming the first rounded portion 140 and the curved cut portion forming the second rounded portion 240 are disposed to overlap such that no stepped structure is formed".

In the present disclosure, the phrase "the edge portion of the first rounded portion 140 and the edge portion of the second rounded portion 240 are located to coincide with each other" also includes the meaning of, for example, "the straight cut portion and the 90° or larger corner portion that form the first rounded portion 140 and the straight cut portion and the 90° or larger corner portion that form the second rounded portion 240 are disposed to overlap such that no stepped structure is formed".

In the present disclosure, the phrase "two predetermined edge portions are located to coincide with each other" includes the meaning of, for example, "two predetermined edge portions are located to coincide with each other except for unavoidable 'deviation' due to manufacture error". In this case, the phrase "two predetermined edge portions are disposed to overlap such that no stepped structure is formed" includes the meaning of "two predetermined edge portions are disposed to overlap such that no stepped structure is formed except for stepped structures caused by unavoidable 'deviation' due to manufacture error".

Figure 11:
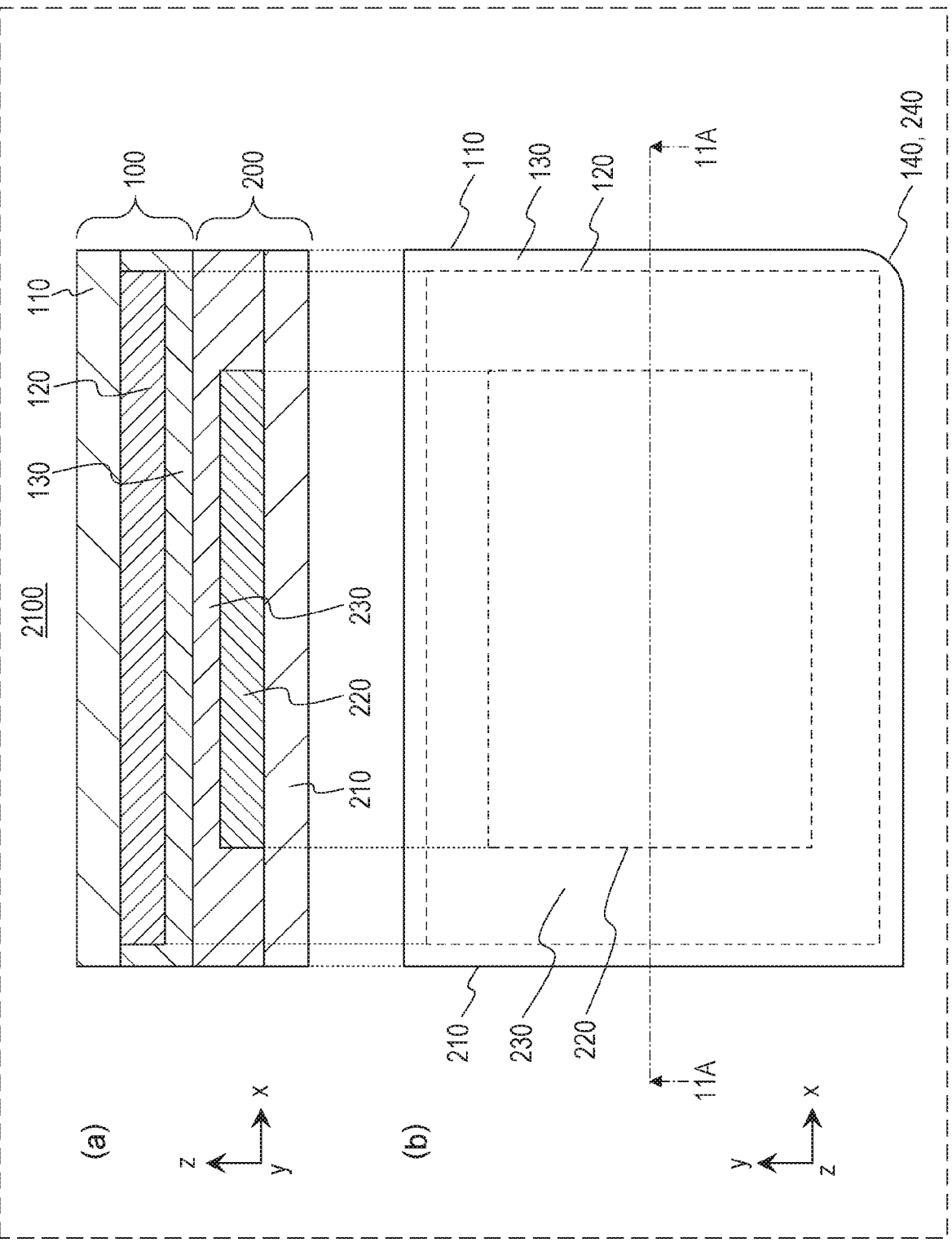
FIG. 11 illustrates the schematic configuration of a battery 2100 according to Embodiment 2.

FIG. 11 illustrates the schematic configuration of a battery 2100 according to Embodiment 2.

FIG. 11(a) is an x-z view (sectional view taken along line 11A-11A) illustrating the schematic configuration of the battery 2100 according to Embodiment 2.

FIG. 11(b) is an x-y view (top perspective view) illustrating the schematic configuration of the battery 2100 according to Embodiment 2.

The battery 2100 according to Embodiment 2 includes, in addition to the above-described features of the battery 2000 according to Embodiment 2, the following feature.

Specifically, in the battery 2100 according to Embodiment 2, the first electrode layer 100 and the second electrode layer 200 have the same shape.

In this case, the first electrode layer 100 and the second electrode layer 200 are disposed on each other, and the edge portion of the first electrode layer 100 and the edge portion of the second electrode layer 200 are located to coincide with each other.

Such a configuration enables stronger bonding between the first solid electrolyte layer 130 and the second solid electrolyte layer 230. Specifically, the first electrode layer 100 and the second electrode layer 200 are disposed on each other, and the edge portion of the first electrode layer 100 and the edge portion of the second electrode layer 200 are located to coincide with each other. In this case, no stepped structure is formed in the position of the edge portion of the first electrode layer 100 and the edge portion of the second electrode layer 200. This enables, in the position of the edge portion of the first electrode layer 100 and the edge portion of the second electrode layer 200, a reduction in the probability of separation of the second solid electrolyte layer 230 from the first solid electrolyte layer 130. This enables further suppression of coming off of a battery member (for example, coming off of the active material) due to separation of the second solid electrolyte layer 230 from the first solid electrolyte layer 130.

Incidentally, in the present disclosure, as illustrated in FIG. 11, the phrase "the edge portion of the first electrode layer 100 and the edge portion of the second electrode layer 200 are located to coincide with each other" includes the meaning of, for example, "the straight edge portions, the corner portions, and the rounded portion of the first electrode layer 100, and the straight edge portions, the corner portions, and the rounded portion of the second electrode layer 200 are disposed to overlap such that no stepped structure is formed".

Figure 12:
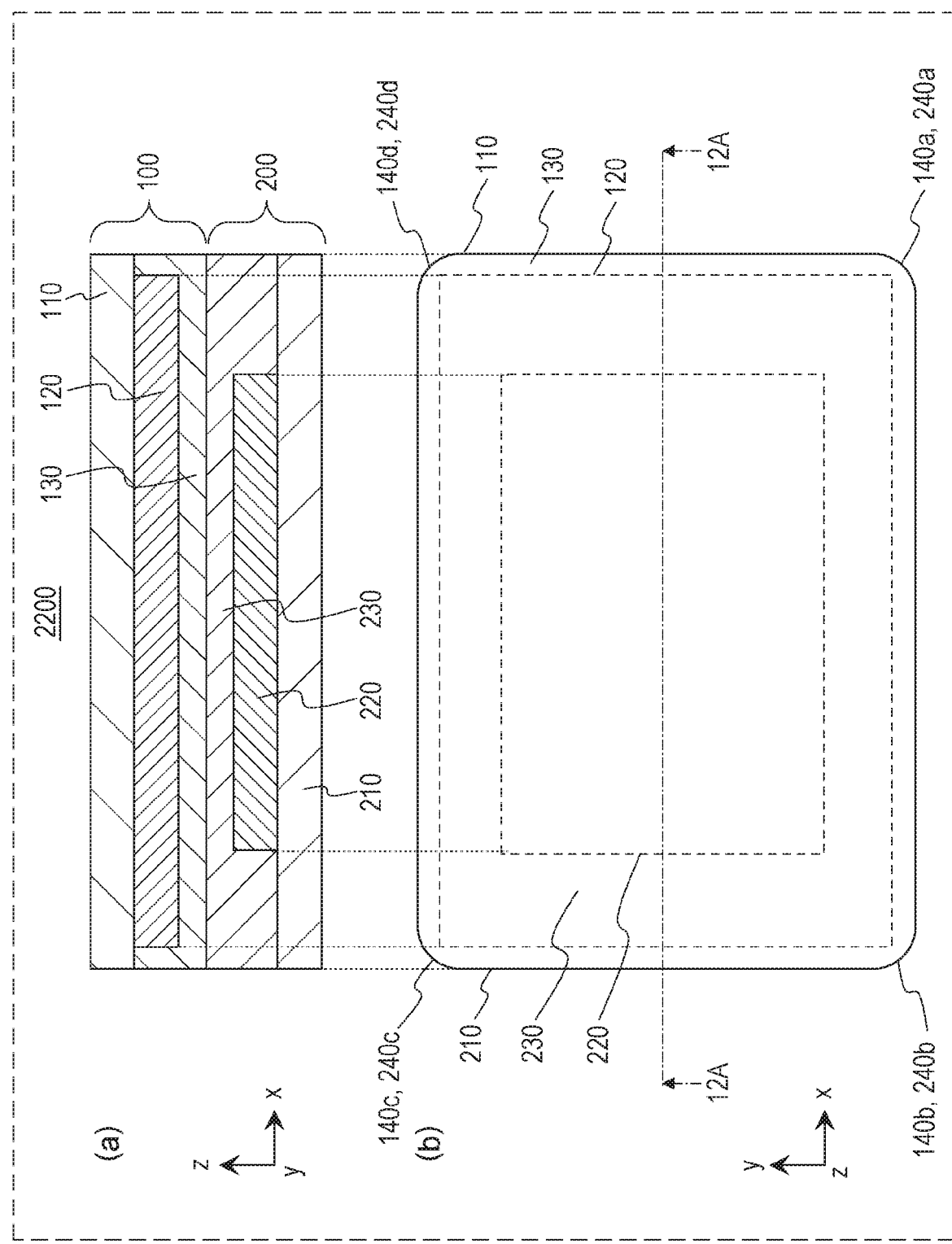
FIG. 12 illustrates the schematic configuration of a battery 2200 according to Embodiment 2.

FIG. 12 illustrates the schematic configuration of a battery 2200 according to Embodiment 2.

FIG. 12(a) is an x-z view (sectional view taken along line 12A-12A) illustrating the schematic configuration of the battery 2200 according to Embodiment 2.

FIG. 12(b) is an x-y view (top perspective view) illustrating the schematic configuration of the battery 2200 according to Embodiment 2.

The battery 2200 according to Embodiment 2 includes, in addition to the above-described features of the battery 2100 according to Embodiment 2, the following feature.

Specifically, in the battery 2200 according to Embodiment 2, all the corner portions of the first electrode layer 100 are formed to include the first rounded portions 140 (140a, 140b, 140c, and 140d).

In addition, all the corner portions of the second electrode layer 200 are formed to include the second rounded portions 240 (240a, 240b, 240c, and 240d).

Incidentally, in the present disclosure, as illustrated in FIG. 12, the phrase "the edge portion of the first electrode layer 100 and the edge portion of the second electrode layer 200 are located to coincide with each other" includes the meaning of, for example, "the straight edge portions and all the rounded portions of the first electrode layer 100 and the straight edge portions and all the rounded portions of the second electrode layer 200 are disposed to overlap such that no stepped structure is formed".

Figure 13:
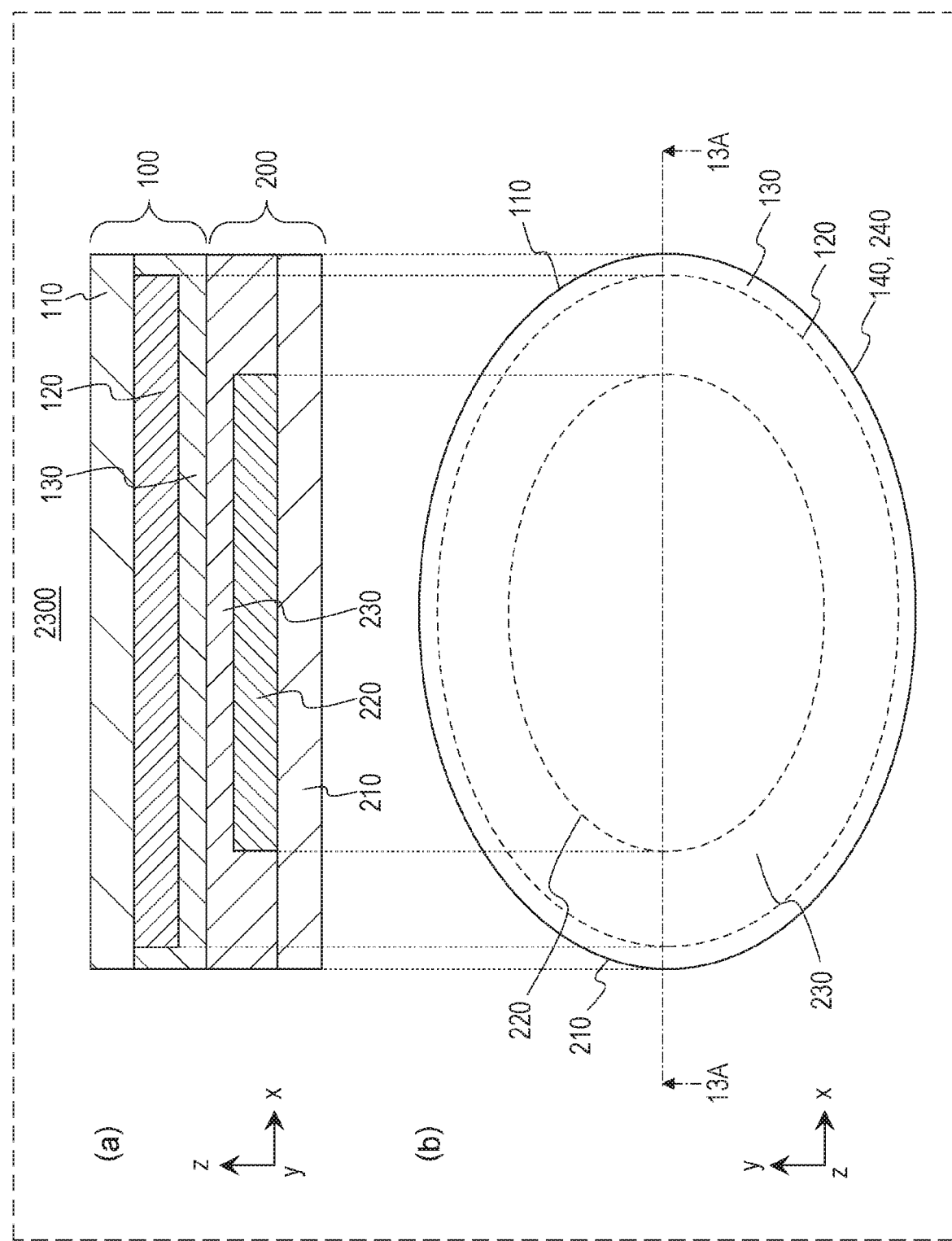
FIG. 13 illustrates the schematic configuration of a battery 2300 according to Embodiment 2.

FIG. 13 illustrates the schematic configuration of a battery 2300 according to Embodiment 2.

FIG. 13(a) is an x-z view (sectional view taken along line 13A-13A) illustrating the schematic configuration of the battery 2300 according to Embodiment 2.

FIG. 13(b) is an x-y view (top perspective view) illustrating the schematic configuration of the battery 2300 according to Embodiment 2.

The battery 2300 according to Embodiment 2 includes, in addition to the above-described features of the battery 2000 according to Embodiment 2, the following feature.

Specifically, in the battery 2300 according to Embodiment 2, the first electrode layer 100 has a circular shape (for example, an elliptic shape, a perfect circle shape, or a coin shape).

The second electrode layer 200 has a circular shape (for example, an elliptic shape, a perfect circle shape, or a coin shape).

Incidentally, in the present disclosure, as illustrated in FIG. 13, the phrase "the edge portion of the first electrode layer 100 and the edge portion of the second electrode layer 200 are located to coincide with each other" includes the meaning of, for example, "the curved edge portion (peripheral portion) forming the first rounded portion 140 of the first electrode layer 100 and the curved edge portion (peripheral portion) forming the second rounded portion 240 of the second electrode layer 200 are disposed to overlap such that no stepped structure is formed".

Incidentally, as illustrated in FIG. 13, in the battery 2300 according to Embodiment 2, one or both of the first active material layer 120 and the second active material layer 220 may have a circular shape (for example, an elliptic shape, a perfect circle shape, or a coin shape).

Such a configuration enables a further reduction in the probability of coming off of the active material. Specifically, over the whole peripheral portion of the first active material layer 120 and the second active material layer 220, a reduction in concentration of stress (for example, dispersion of an impact force) is achieved. This enables, over the whole peripheral portion, a reduction in the probability of separation of the first active material layer 120 from the first current collector 110 (or falling of the first active material layer 120 from the first current collector 110), and a reduction in the probability of separation of the second active material layer 220 from the second current collector 210 (or falling of the second active material layer 220 from the second current collector 210).

Embodiment 3

Hereinafter, Embodiment 3 will be described. Some descriptions overlapping those described in Embodiment 1 or 2 above will be appropriately omitted.

Figure 14:
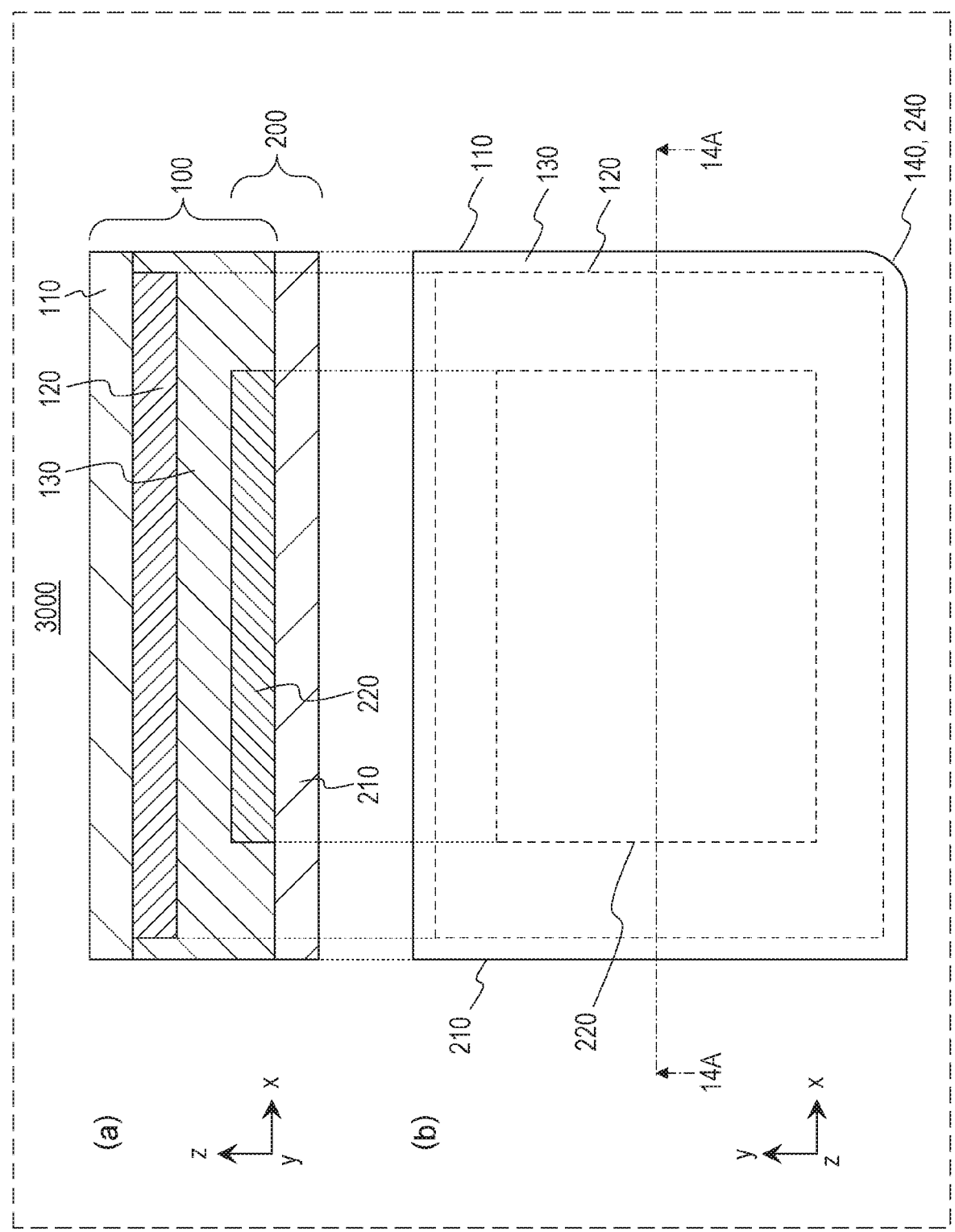
FIG. 14 illustrates the schematic configuration of a battery 3000 according to Embodiment 3.

FIG. 14 illustrates the schematic configuration of a battery 3000 according to Embodiment 3.

FIG. 14(a) is an x-z view (sectional view taken along line 14A-14A) illustrating the schematic configuration of the battery 3000 according to Embodiment 3.

FIG. 14(b) is an x-y view (top perspective view) illustrating the schematic configuration of the battery 3000 according to Embodiment 3.

The battery 3000 according to Embodiment 3 includes, in addition to the above-described features of the battery 1000 according to Embodiment 1, the following feature.

Specifically, in the battery 3000 according to Embodiment 3, the second electrode layer 200 includes a second current collector 210 and a second active material layer 220.

The second active material layer 220 is disposed to be in contact with the second current collector 210, and to occupy a smaller area than the second current collector 210.

The first solid electrolyte layer 130 is disposed to be in contact with the second current collector 210 and the second active material layer 220, and to occupy the same area as the second current collector 210.

The second active material layer 220 faces the first active material layer 120 with the first solid electrolyte layer 130 therebetween.

The peripheral portion of the second current collector 210 is formed to include the second rounded portion 240.

The first rounded portion 140 and the second rounded portion 240 have the same shape.

The first electrode layer 100 and the second electrode layer 200 are disposed on each other, and the edge portion of the first rounded portion 140 and the edge portion of the second rounded portion 240 are located to coincide with each other.

Such a configuration enables stronger bonding between the first solid electrolyte layer 130 and the second current collector 210. Specifically, the first electrode layer 100 and the second electrode layer 200 are disposed on each other, and the edge portion of the first rounded portion 140 and the edge portion of the second rounded portion 240 are located to coincide with each other. In this case, no stepped structure is formed in the position of the edge portion of the first rounded portion 140 and the edge portion of the second rounded portion 240.

This enables, in the position of the edge portion of the first rounded portion 140 and the edge portion of the second rounded portion 240, a reduction in the probability of separation of the second current collector 210 from the first solid electrolyte layer 130. This enables further suppression of coming off of a battery member (for example, coming off of the active material) due to separation of the second current collector 210 from the first solid electrolyte layer 130.

Figure 15:
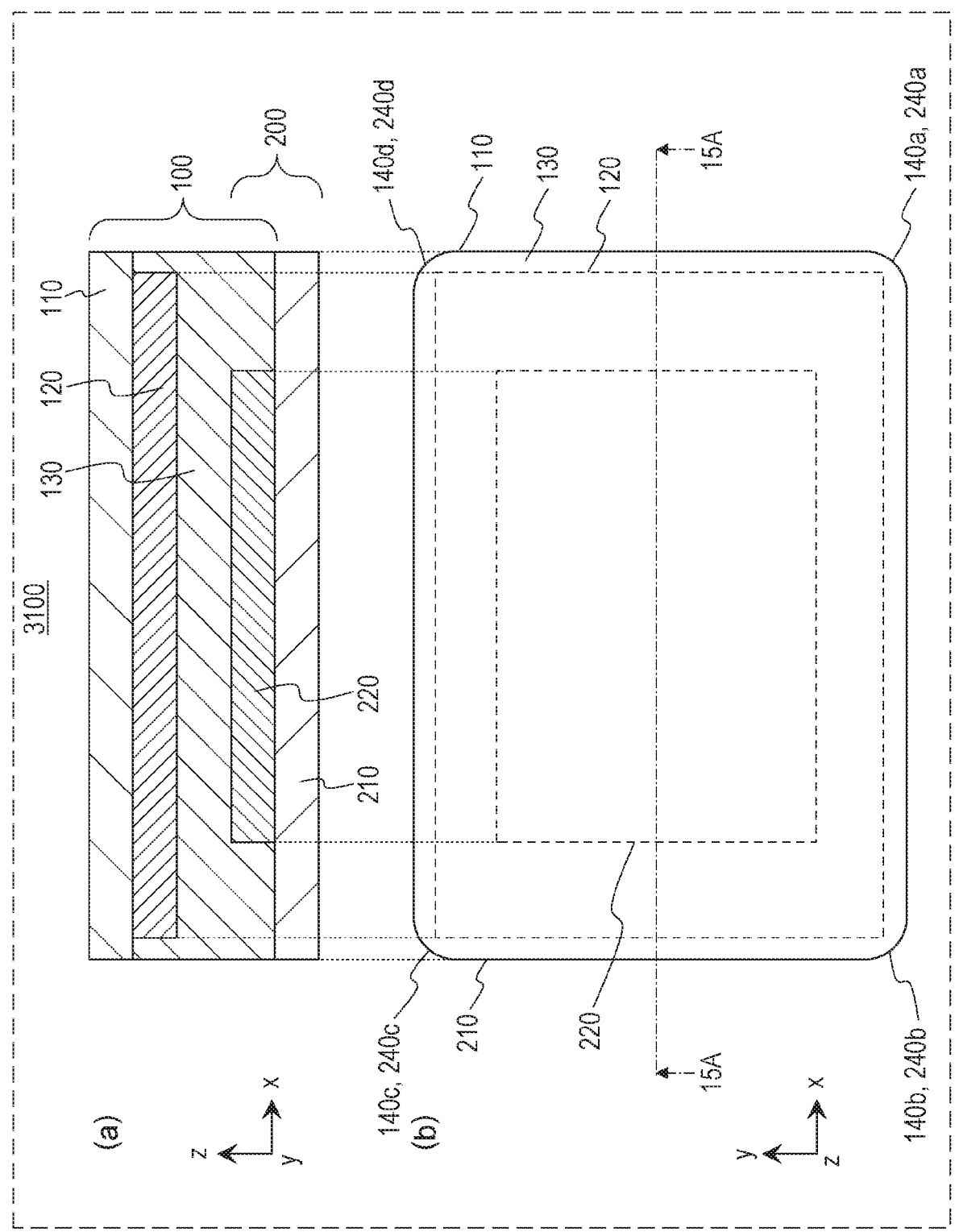
FIG. 15 illustrates the schematic configuration of a battery 3100 according to Embodiment 3.

FIG. 15 illustrates the schematic configuration of a battery 3100 according to Embodiment 3.

FIG. 15(*a*) is an x-z view (sectional view taken along line 15A-15A) illustrating the schematic configuration of the battery 3100 according to Embodiment 3.

FIG. 15(*b*) is an x-y view (top perspective view) illustrating the schematic configuration of the battery 3100 according to Embodiment 3.

The battery 3100 according to Embodiment 3 includes, in addition to the above-described features of the battery 3000 according to Embodiment 3, the following feature.

Specifically, in the battery 3100 according to Embodiment 3, the first electrode layer 100 and the second electrode layer 200 have the same shape.

The first electrode layer 100 and the second electrode layer 200 are disposed on each other, and the edge portion of the first electrode layer 100 and the edge portion of the second electrode layer 200 are located to coincide with each other.

Such a configuration enables stronger bonding between the first solid electrolyte layer 130 and the second current collector 210. Specifically, the first electrode layer 100 and the second electrode layer 200 are disposed on each other, and the edge portion of the first electrode layer 100 and the edge portion of the second electrode layer 200 are located to coincide with each other. In this case, no stepped structure is formed in the position of the edge portion of the first electrode layer 100 and the edge portion of the second electrode layer 200. This enables, in the position of the edge portion of the first electrode layer 100 and the edge portion of the second electrode layer 200, a reduction in the probability of separation of the second current collector 210 from the first solid electrolyte layer 130. This enables further suppression of coming off of a battery member (for example, coming off of the active material) due to separation of the second current collector 210 from the first solid electrolyte layer 130.

Figure 16:
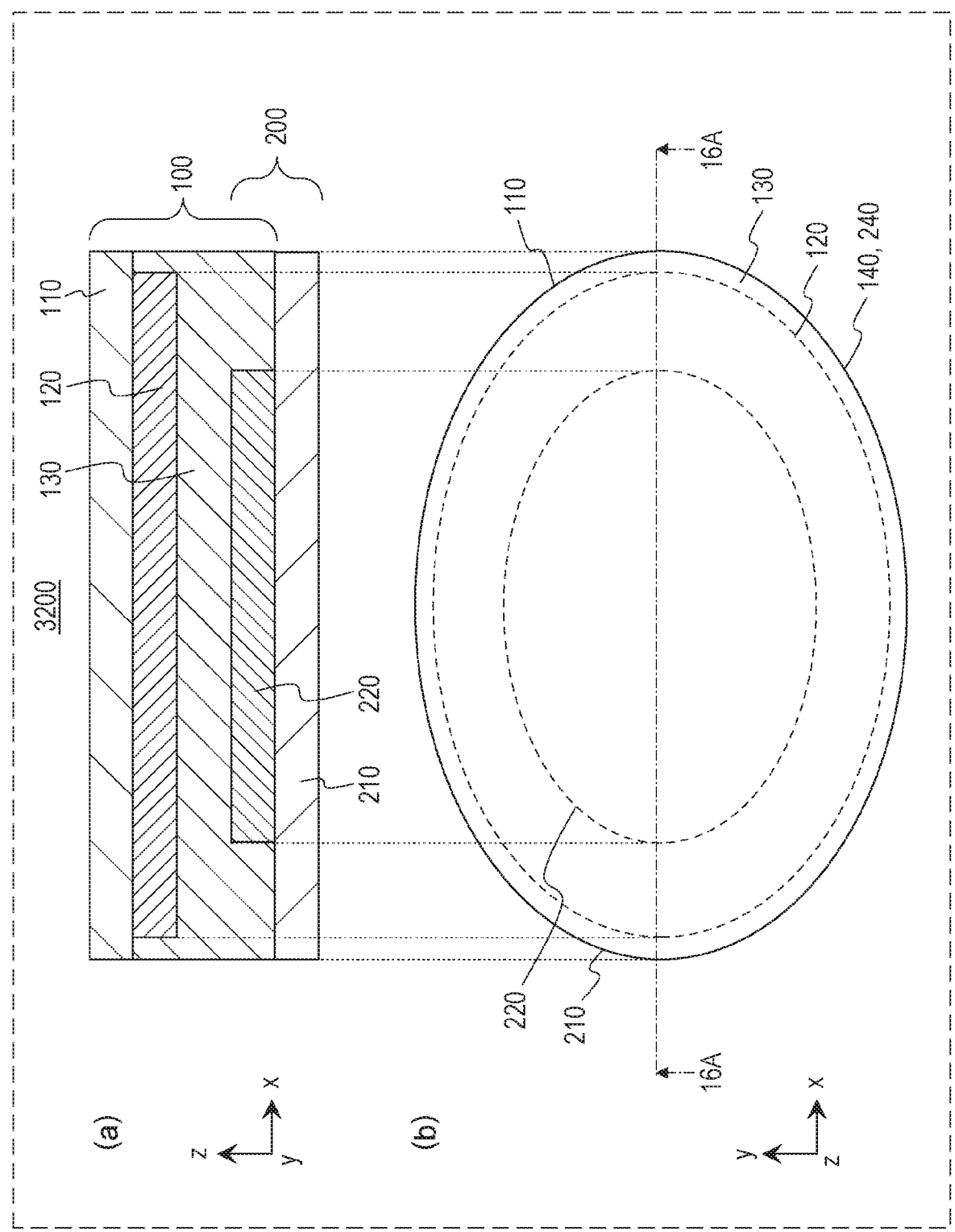
FIG. 16 illustrates the schematic configuration of a battery 3200 according to Embodiment 3.

FIG. 16 illustrates the schematic configuration of a battery 3200 according to Embodiment 3.

FIG. 16(*a*) is an x-z view (sectional view taken along line 16A-16A) illustrating the schematic configuration of the battery 3200 according to Embodiment 3.

FIG. 16(*b*) is an x-y view (top perspective view) illustrating the schematic configuration of the battery 3200 according to Embodiment 3.

The battery 3200 according to Embodiment 3 includes, in addition to the above-described features of the battery 3100 according to Embodiment 3, the following feature.

Specifically, in the battery 3200 according to Embodiment 3, the first electrode layer 100 and the second electrode layer 200 have a circular shape.

Such a configuration enables stronger bonding between the first solid electrolyte layer 130 and the second current collector 210. Specifically, the first electrode layer 100 and the second electrode layer 200 are disposed on each other, and the edge portion of the circular first electrode layer 100 and the edge portion of the circular second electrode layer 200 are located to coincide with each other. In this case, in the position over the whole peripheral portion of the first electrode layer 100 and the second electrode layer 200, no stepped structure is formed. This enables, in the position over the whole peripheral portion of the first electrode layer 100 and the second electrode layer 200, a reduction in the probability of separation of the second current collector 210 from the first solid electrolyte layer 130. This enables further suppression of coming off of a battery member (for example, coming off of the active material) due to separation of the second current collector 210 from the first solid electrolyte layer 130.

Incidentally, as illustrated in FIG. 16, in the battery 3200 according to Embodiment 3, one or both of the first active material layer 120 and the second active material layer 220 may have a circular shape (for example, an elliptic shape, a perfect circle shape, or a coin shape).

Such a configuration enables a further reduction in the probability of coming off of the active material. Specifically, over the whole peripheral portion of the first active material layer 120 and the second active material layer 220, a reduction in concentration of stress (for example, dispersion of an impact force) is achieved. This enables, over the whole peripheral portion, a reduction in the probability of separation of the first active material layer 120 from the first current collector 110 (or falling of the first active material layer 120 from the first current collector 110), and a reduction in the probability of separation of the second active material layer 220 from the second current collector 210 (or falling of the second active material layer 220 from the second current collector 210).

Embodiment 4

Hereinafter, Embodiment 4 will be described. Some descriptions overlapping any of those described in Embodiments 1 to 3 above will be appropriately omitted.

Figure 17:
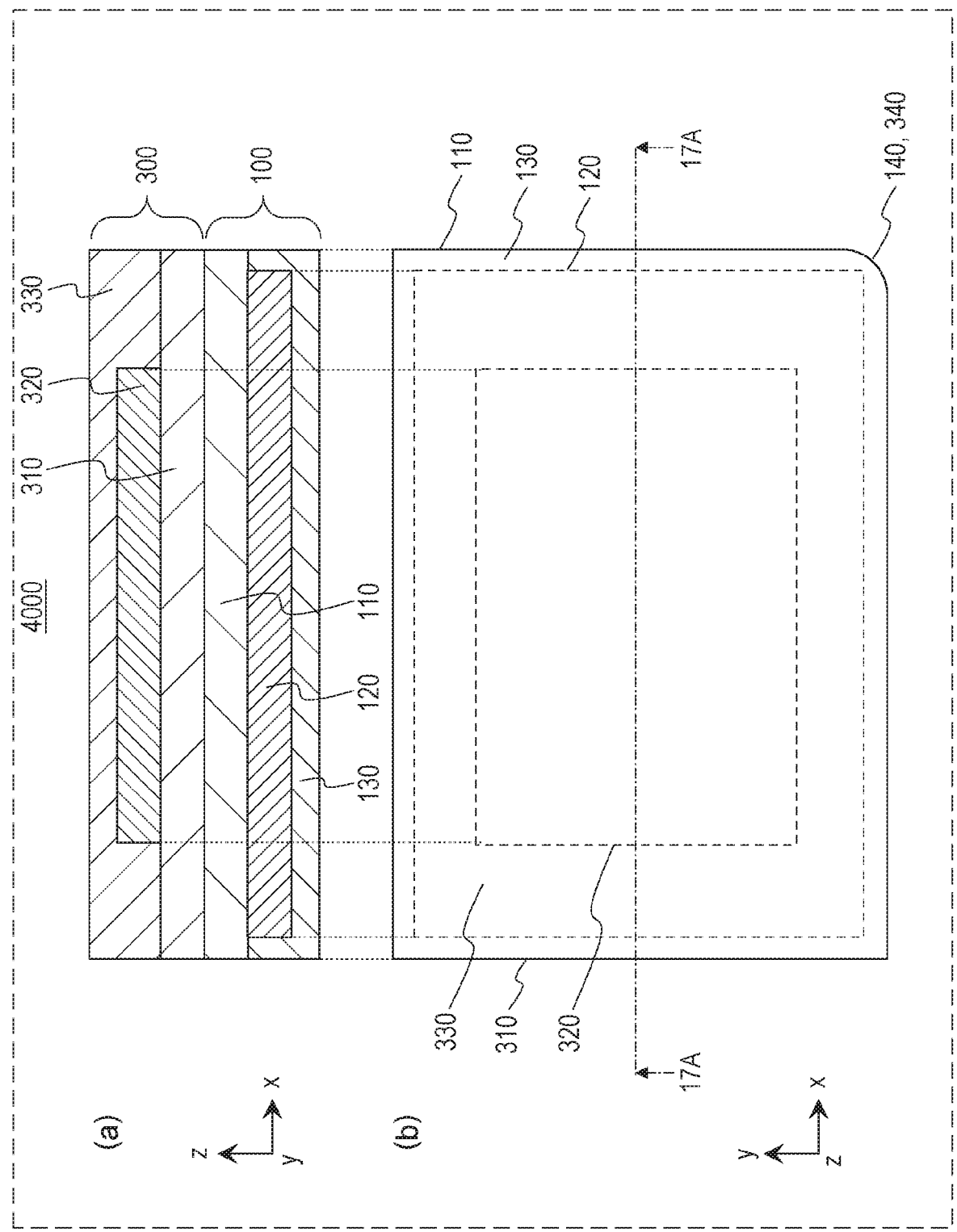
FIG. 17 illustrates the schematic configuration of a battery 4000 according to Embodiment 4.

FIG. 17 illustrates the schematic configuration of a battery 4000 according to Embodiment 4.

FIG. 17(*a*) is an x-z view (sectional view taken along line 17A-17A) illustrating the schematic configuration of the battery 4000 according to Embodiment 4.

FIG. 17(*b*) is an x-y view (top perspective view) illustrating the schematic configuration of the battery 4000 according to Embodiment 4.

The battery 4000 according to Embodiment 4 includes, in addition to the above-described features of the battery 1000 according to Embodiment 1, the following feature.

Specifically, the battery 4000 according to Embodiment 4 further includes a third electrode layer 300.

The third electrode layer 300 is disposed on the first electrode layer 100. The third electrode layer 300 serves as the counter electrode for the first electrode layer 100.

The third electrode layer 300 includes a third current collector 310, a third active material layer 320, and a third solid electrolyte layer 330.

The first current collector 110 and the third current collector 310 are electrically connected to each other.

The third active material layer 320 is disposed to be in contact with the third current collector 310, and to occupy a smaller area than the third current collector 310.

The third solid electrolyte layer 330 is disposed to be in contact with the third current collector 310 and the third active material layer 320, and to occupy the same area as the third current collector 310.

The peripheral portion of the third electrode layer 300 is formed to include a third rounded portion 340.

The first rounded portion 140 and the third rounded portion 340 have the same shape.

The first electrode layer 100 and the third electrode layer 300 are disposed on each other, and the edge portion of the first rounded portion 140 and the edge portion of the third rounded portion 340 are located to coincide with each other.

Such a configuration enables a further reduction in the probability of coming off of the active material. Specifically, use of the third electrode layer 300 including a peripheral portion including the third rounded portion 340 enables a reduction in concentration of stress (for example, dispersion of an impact force) in the peripheral portion including the third rounded portion 340 in the multilayer body including the third current collector 310 and the third solid electrolyte layer 330. This enables, in the peripheral portion including the third rounded portion 340, a reduction in the probability of separation of the third solid electrolyte layer 330 from the third current collector 310 (or falling of the solid electrolyte from the third current collector 310). Thus, the third solid electrolyte layer 330, which is less likely to separate from the third current collector 310, is disposed to cover the third active material layer 320. As a result, for example, even when a corner of the battery being manufactured or used collides and impacts, the third solid electrolyte layer 330 enables a reduction in the damage caused on the third active material layer 320. In other words, the third solid electrolyte layer 330 enables a reduction in the probability of coming off of the active material from the third active material layer 320. This prevents short circuits within the battery that may be caused by movements of, within the battery, the active material coming off from the third active material layer 320. This enables further enhanced reliability of the battery.

In the above-described configuration, the third solid electrolyte layer 330, which is less likely to separate from the third current collector 310, is disposed to cover the third active material layer 320. In this case, even when the third active material layer 320 is disposed to extend close to the peripheral portion of the third current collector 310, the active material is prevented from coming off from the third active material layer 320. Thus, the third active material layer 320 can be disposed to occupy an area as large as possible, provided that the area is smaller than that of the third current collector 310. This enables a further increase in the energy density of the battery.

The above-described configuration enables stronger bonding between the first electrode layer 100 and the third electrode layer 300. Specifically, the first electrode layer 100 and the third electrode layer 300 are disposed on each other, and the edge portion of the first rounded portion 140 and the edge portion of the third rounded portion 340 are located to coincide with each other. In this case, no stepped structure is formed in the position of the edge portion of the first rounded portion 140 and the edge portion of the third rounded portion 340. This enables, in the position of the edge portion of the first rounded portion 140 and the edge portion of the third rounded portion 340, a reduction in the probability of separation of the third electrode layer 300 (for example, the third current collector 310) from the first electrode layer 100 (for example, the first current collector 110). This enables further suppression of coming off of a battery member (for example, coming off of the active material) due to separation of the third electrode layer 300 from the first electrode layer 100, and also enables suppression of, for example, concentration of current and an increase in the resistance due to partial separation of the third electrode layer 300 from the first electrode layer 100.

The third active material layer 320 contains a counter electrode material (for example, an active material).

The third solid electrolyte layer 330 is a solid electrolyte layer containing a solid electrolyte.

Incidentally, the first active material layer 120 may be a negative electrode active material layer. In this case, the electrode material is a negative electrode active material. The first current collector 110 is a negative electrode current collector. The first solid electrolyte layer 130 is a negative-electrode-side solid electrolyte layer. The third active material layer 320 is a positive electrode active material layer. The counter electrode material is a positive electrode active material. The third current collector 310 is a positive electrode current collector. The third solid electrolyte layer 330 is a positive-electrode-side solid electrolyte layer.

Alternatively, the first active material layer 120 may be a positive electrode active material layer. In this case, the electrode material is a positive electrode active material. The first current collector 110 is a positive electrode current collector. The first solid electrolyte layer 130 is a positive-electrode-side solid electrolyte layer. The third active material layer 320 is a negative electrode active material layer. The counter electrode material is a negative electrode active material. The third current collector 310 is a negative electrode current collector. The third solid electrolyte layer 330 is a negative-electrode-side solid electrolyte layer.

Incidentally, as illustrated in FIG. 17, the third active material layer 320 and the third solid electrolyte layer 330 may be disposed on, of the main surfaces of the third current collector 310, a main surface side on which the first current collector 110 is not disposed.

As illustrated in FIG. 17, the third current collector 310 may be disposed on, of the main surfaces of the first current collector 110, a main surface side on which the first active material layer 120 is not disposed.

As illustrated in FIG. 17, a main surface of the first current collector 110 and a main surface of the third current collector 310 may be disposed in direct contact with each other. Alternatively, another member that is electrically conductive (for example, an adhesive layer containing an adhesive material) may be disposed between a main surface of the first current collector 110 and a main surface of the third current collector 310.

Incidentally, as illustrated in FIG. 17, the first electrode layer 100 and the third electrode layer 300 may have the same shape.

In this case, the first electrode layer 100 and the third electrode layer 300 are disposed on each other, and the edge portion of the first electrode layer 100 and the edge portion of the third electrode layer 300 may be located to coincide with each other.

Such a configuration enables stronger bonding between the first electrode layer 100 and the third electrode layer 300. Specifically, the first electrode layer 100 and the third electrode layer 300 are disposed on each other, and the edge portion of the first electrode layer 100 and the edge portion of the third electrode layer 300 are located to coincide with each other. In this case, no stepped structure is formed in the position of the edge portion of the first electrode layer 100 and the edge portion of the third electrode layer 300. This enables, in the position of the edge portion of the first electrode layer 100 and the edge portion of the third electrode layer 300, a reduction in the probability of separation of the third electrode layer 300 (for example, the third current collector 310) from the first electrode layer 100 (for example, the first current collector 110). This enables further suppression of coming off of a battery member (for example, coming off of the active material) due to separation of the third electrode layer 300 from the first electrode layer 100, and also enables further suppression of, for example, concentration of current and an increase in the resistance due to partial separation of the third electrode layer 300 from the first electrode layer 100.

Incidentally, the shape of the third rounded portion 340 may be selected from the above-described shapes for the first rounded portion 140.

The shape of the third electrode layer 300 may be selected from the above-described shapes for the first electrode layer 100.

Other examples of the shapes of the third current collector 310 and the third active material layer 320 include the shapes illustrated in FIGS. 5A to 5E as other examples of the shapes of the first current collector 110 and the first active material layer 120.

Figure 18:
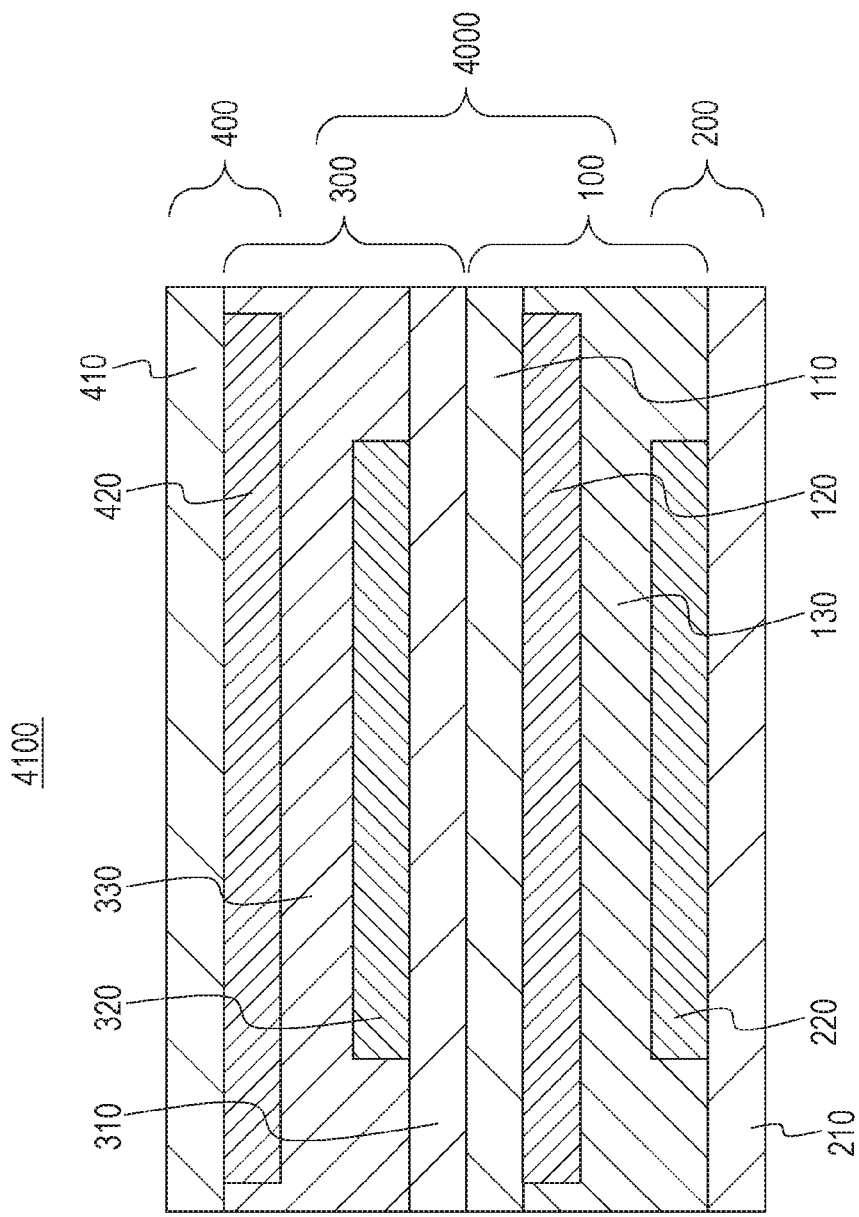
FIG. 18 is an x-z view (sectional view) illustrating the schematic configuration of a battery 4100 according to Embodiment 4.

FIG. 18 is an x-z view (sectional view) illustrating the schematic configuration of a battery 4100 according to Embodiment 4.

The battery 4100 according to Embodiment 4 includes, in addition to the above-described features of the battery 4000 according to Embodiment 4, the following feature.

Specifically, the battery 4100 according to Embodiment 4 further includes a second electrode layer 200 and a fourth electrode layer 400.

The fourth electrode layer 400 is of a polarity the same as that of the first electrode layer 100. The fourth electrode layer 400 includes a fourth current collector 410 and a fourth active material layer 420. The fourth active material layer 420 contains an electrode material (for example, an active material).

Such a configuration enables a stack battery in which the probability of coming off of the active materials is reduced. More specifically, the configuration enables a stack battery in which a first power generation element (a power generation element constituted by the first electrode layer 100 and the second electrode layer 200) and a second power generation element (a power generation element constituted by the third electrode layer 300 and the fourth electrode layer 400) are connected together in series. This enables a reduction in the probability of coming off of active materials, and also enables a high battery voltage due to the serial connection of a plurality of power generation elements.

Figure 19:
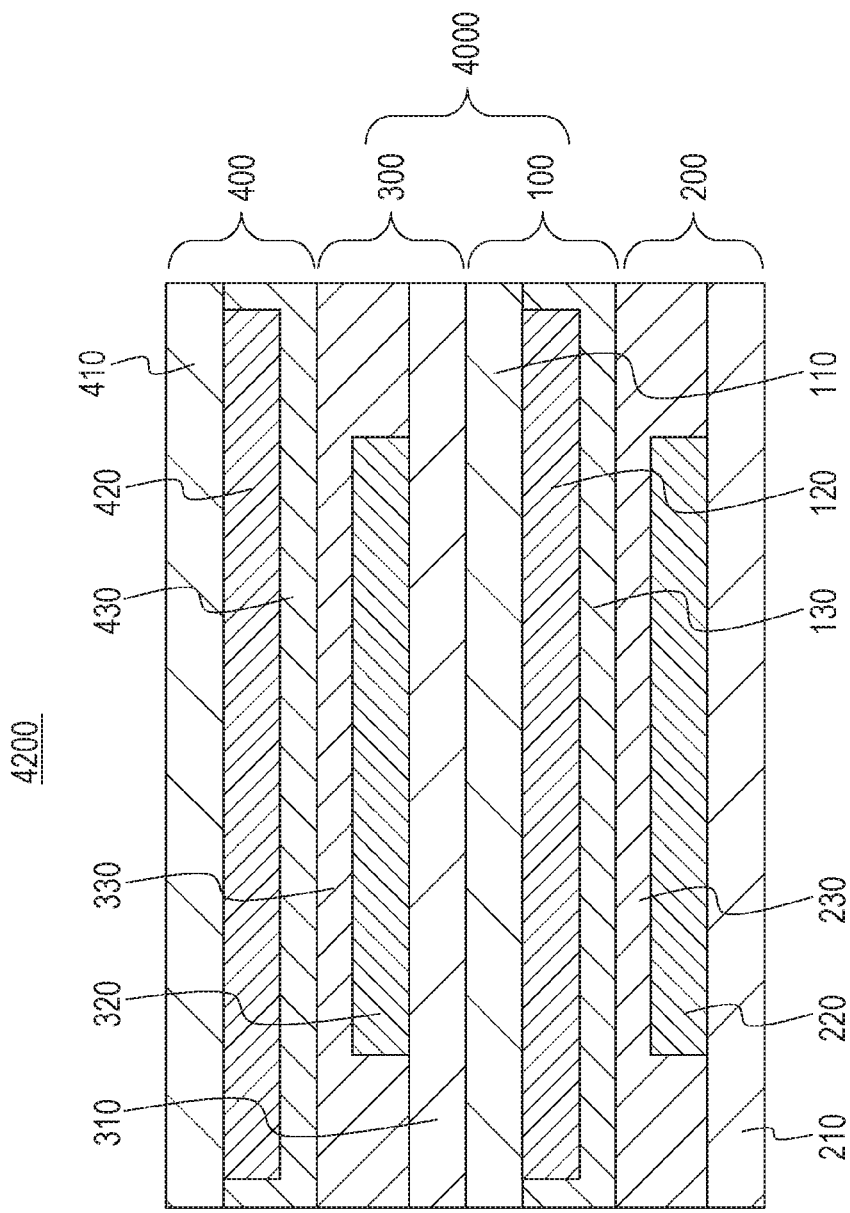
FIG. 19 is an x-z view (sectional view) illustrating the schematic configuration of a battery 4200 according to Embodiment 4.

FIG. 19 is an x-z view (sectional view) illustrating the schematic configuration of a battery 4200 according to Embodiment 4.

The battery 4200 according to Embodiment 4 includes, in addition to the above-described features of the battery 4100 according to Embodiment 4, the following feature.

Specifically, in the battery 4200 according to Embodiment 4, the second electrode layer 200 includes a second solid electrolyte layer 230. In this case, the first solid electrolyte layer 130 and the second solid electrolyte layer 230 are bonded together.

The fourth electrode layer 400 includes a fourth solid electrolyte layer 430. The fourth solid electrolyte layer 430 is a solid electrolyte layer containing a solid electrolyte.

In this case, the third solid electrolyte layer 330 and the fourth solid electrolyte layer 430 are bonded together.

Such a configuration enables a reduction in the probability of short circuits due to pinholes that may be generated in the solid electrolyte layers. This enables a reduction in the probability of coming off of active materials and a reduction in the probability of short circuits, and also enables a high battery voltage due to the serial connection of a plurality of power generation elements.

Incidentally, the first electrode layer 100, the second electrode layer 200, the third electrode layer 300, and the fourth electrode layer 400 may have the same shape.

Such a configuration enables a further reduction in the probability of coming off of active materials from the electrode layers, and a further reduction in the probability of separation between the electrode layers.

Embodiment 5

Hereinafter, Embodiment 5 will be described. Some descriptions overlapping any of those described in Embodiments 1 to 4 above will be appropriately omitted.

Figure 20:
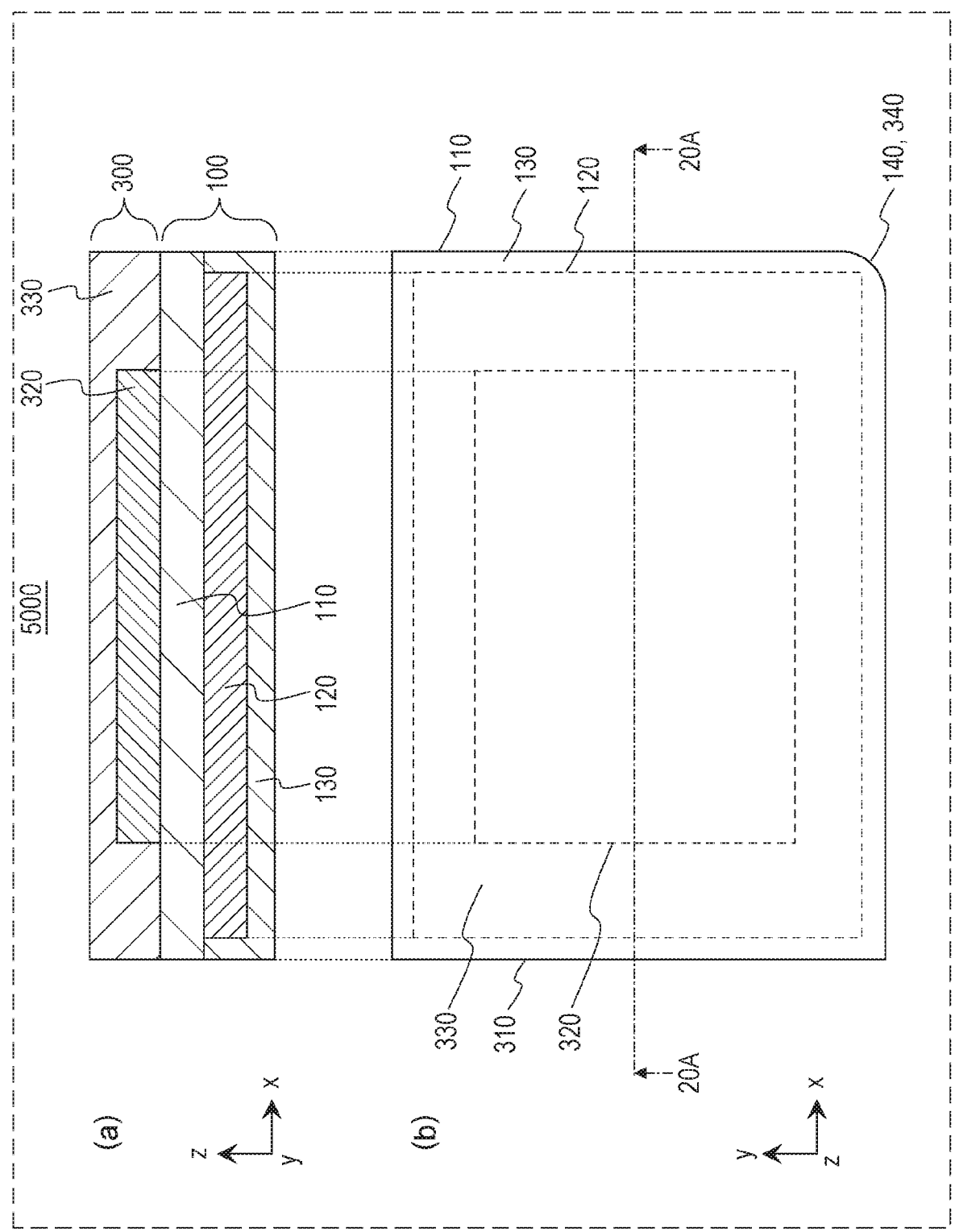
FIG. 20 illustrates the schematic configuration of a battery 5000 according to Embodiment 5.

FIG. 20 illustrates the schematic configuration of a battery 5000 according to Embodiment 5.

FIG. 20(*a*) is an x-z view (sectional view taken along line 20A-20A) illustrating the schematic configuration of the battery 5000 according to Embodiment 5.

FIG. 20(*b*) is an x-y view (top perspective view) illustrating the schematic configuration of the battery 5000 according to Embodiment 5.

The battery 5000 according to Embodiment 5 includes, in addition to the above-described features of the battery 1000 according to Embodiment 1, the following feature.

Specifically, the battery 5000 according to Embodiment 5 further includes a third electrode layer 300.

The third electrode layer 300 is disposed on the first electrode layer 100. The third electrode layer 300 serves as the counter electrode for the first electrode layer 100.

The third electrode layer 300 includes a third active material layer 320 and a third solid electrolyte layer 330.

The third active material layer 320 is disposed to be in contact with the first current collector 110, and to occupy a smaller area than the first current collector 110.

The third solid electrolyte layer 330 is disposed to be in contact with the first current collector 110 and the third active material layer 320, and to occupy the same area as the first current collector 110.

The peripheral portion of the third electrode layer 300 is formed to include a third rounded portion 340.

The first rounded portion 140 and the third rounded portion 340 have the same shape.

The first electrode layer 100 and the third electrode layer 300 are disposed on each other, and the edge portion of the first rounded portion 140 and the edge portion of the third rounded portion 340 are located to coincide with each other.

Such a configuration enables a further reduction in the probability of coming off of the active material. Specifically, use of the third electrode layer 300 including the peripheral portion including the third rounded portion 340 enables a reduction in concentration of stress (for example, dispersion of an impact force) in the peripheral portion including the third rounded portion 340 in the multilayer body including the first current collector 110 and the third solid electrolyte layer 330. This enables, in the peripheral portion including the third rounded portion 340, a reduction in the probability of separation of the third solid electrolyte layer 330 from the first current collector 110 (or falling of the solid electrolyte from the first current collector 110). Thus, the third solid electrolyte layer 330, which is less likely to separate from the first current collector 110, is disposed to cover the third active material layer 320. As a result, for example, even when a corner of the battery being manufactured or used collides and impacts, the third solid electrolyte layer 330 enables a reduction in the damage caused on the third active material layer 320. In other words, the third solid electrolyte layer 330 enables a reduction in the probability of coming off of the active material from the third active material layer 320. This prevents short circuits within the battery that may be caused by movements of, within the battery, the active material coming off from the third active material layer 320. This enables further enhanced reliability of the battery.

In the above-described configuration, the third solid electrolyte layer 330, which is less likely to separate from the first current collector 110, is disposed to cover the third active material layer 320. In this case, even when the third active material layer 320 is disposed to extend close to the peripheral portion of the first current collector 110, the active material is prevented from coming off from the third active material layer 320. Thus, the third active material layer 320 can be disposed to occupy an area as large as possible, provided that the area is smaller than that of the first current collector 110. This enables a further increase in the energy density of the battery.

Incidentally, as illustrated in FIG. 20, the third active material layer 320 and the third solid electrolyte layer 330 may be disposed on, of the main surfaces of the first current collector 110, a main surface side on which the first active material layer 120 is not disposed. Thus, the first current collector 110 serves as a bipolar current collector. The first current collector 110, the first active material layer 120, and the third active material layer 320 constitute a bipolar electrode.

Figure 21:
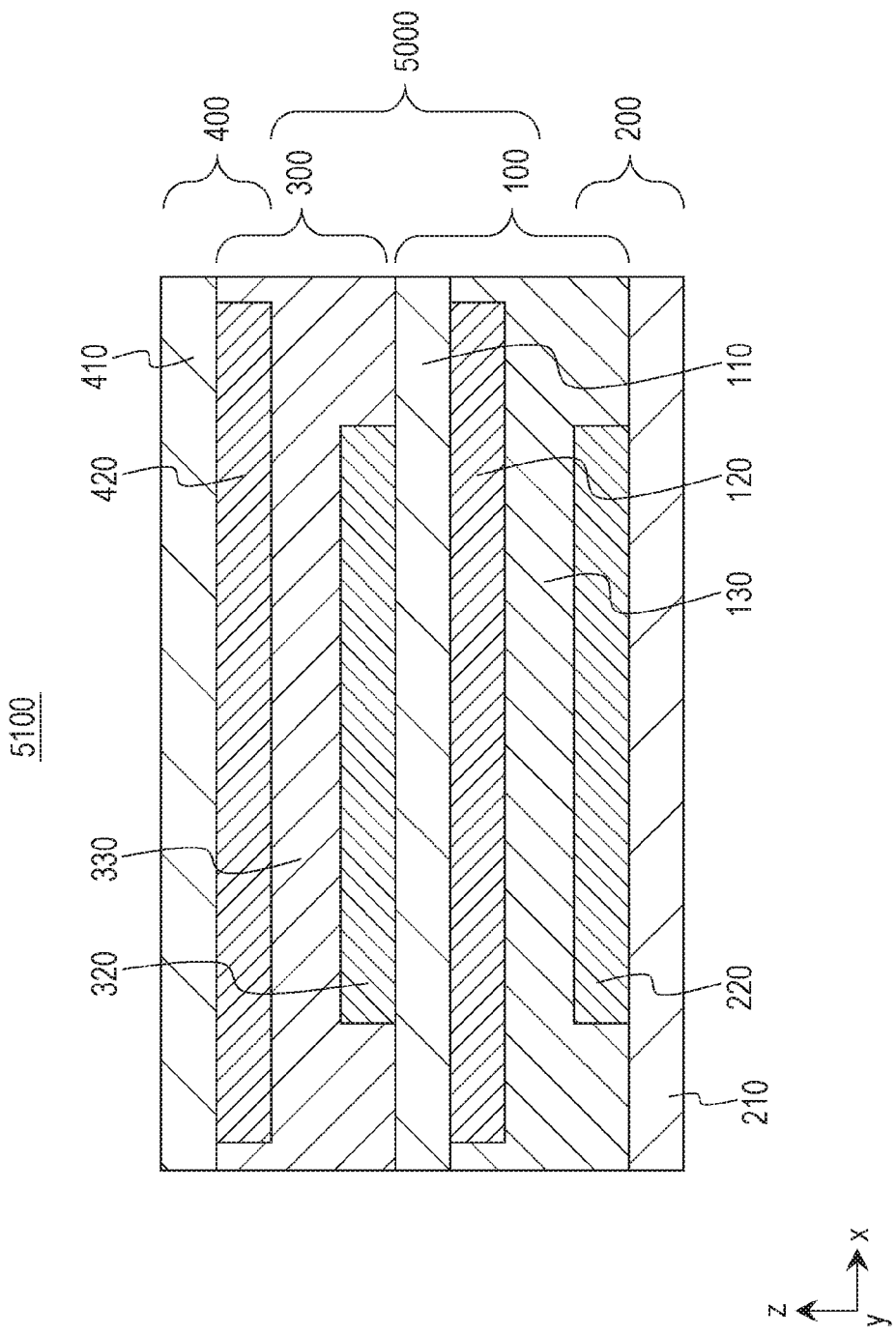
FIG. 21 is an x-z view (sectional view) illustrating the schematic configuration of a battery 5100 according to Embodiment 5.

FIG. 21 is an x-z view (sectional view) illustrating the schematic configuration of a battery 5100 according to Embodiment 5.

The battery 5100 according to Embodiment 5 includes, in addition to the above-described features of the battery 5000 according to Embodiment 5, the following feature.

Specifically, the battery 5100 according to Embodiment 5 further includes a second electrode layer 200 and a fourth electrode layer 400.

The fourth electrode layer 400 is of a polarity the same as that of the first electrode layer 100. The fourth electrode layer 400 includes a fourth current collector 410 and a fourth active material layer 420. The fourth active material layer 420 contains an electrode material (for example, an active material).

Such a configuration enables a stack battery in which the probability of coming off of the active materials is reduced. More specifically, the configuration enables a stack battery in which a first power generation element (a power generation element constituted by the first electrode layer 100 and the second electrode layer 200) and a second power generation element (a power generation element constituted by the third electrode layer 300 and the fourth electrode layer 400) are connected together in series. This enables a reduction in the probability of coming off of active materials, and also enables a high battery voltage due to the serial connection of a plurality of power generation elements.

The above-described configuration, in which the bipolar electrode constituted by the first current collector 110, the first active material layer 120, and the third active material layer 320 is used, enables strong bonding between the first power generation element and the second power generation element, compared with the case of the above-described configuration of the battery 4100 according to Embodiment 4 using the multilayer body including the first current collector 110 and the third current collector 310.

Figure 22:
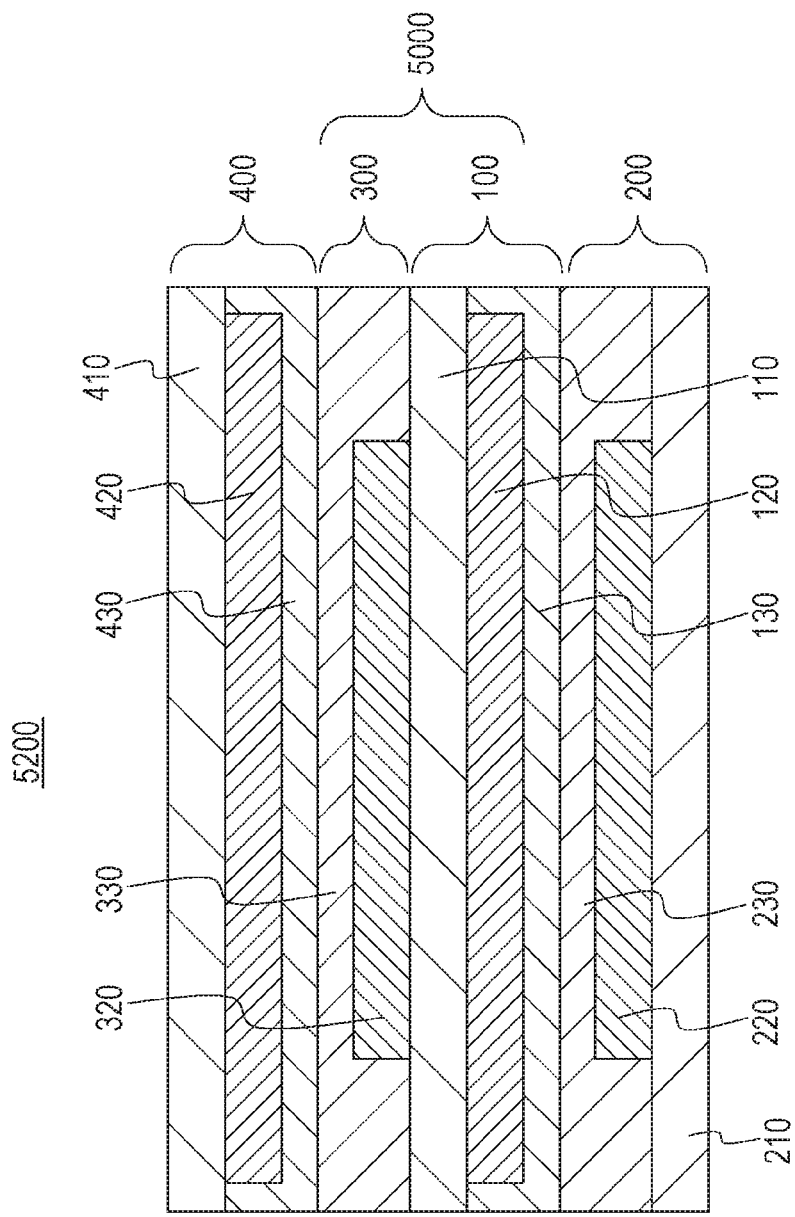
FIG. 22 is an x-z view (sectional view) illustrating the schematic configuration of a battery 5200 according to Embodiment 5.

FIG. 22 is an x-z view (sectional view) illustrating the schematic configuration of a battery 5200 according to Embodiment 5.

The battery 5200 according to Embodiment 5 includes, in addition to the above-described features of the battery 5100 according to Embodiment 5, the following feature.

Specifically, in the battery 5200 according to Embodiment 5, the second electrode layer 200 includes a second solid electrolyte layer 230. In this case, the first solid electrolyte layer 130 and the second solid electrolyte layer 230 are bonded together.

The fourth electrode layer 400 includes a fourth solid electrolyte layer 430. The fourth solid electrolyte layer 430 is a solid electrolyte layer containing a solid electrolyte.

In this case, the third solid electrolyte layer 330 and the fourth solid electrolyte layer 430 are bonded together.

Such a configuration enables a reduction in the probability of short circuits due to pinholes that may be generated in the solid electrolyte layers. Thus, the configuration enables a reduction in the probability of coming off of active materials and a reduction in the probability of short circuits, and also enables a high battery voltage due to the serial connection of a plurality of power generation elements.

Incidentally, the first electrode layer 100, the second electrode layer 200, the third electrode layer 300, and the fourth electrode layer 400 may have the same shape.

Such a configuration enables a further reduction in the probability of coming off of active materials from the electrode layers, and a further reduction in the probability of separation between the electrode layers.

Incidentally, the batteries according to Embodiments 1 to 5 may be, for example, all-solid-state batteries (for example, all-solid-state lithium secondary batteries). The batteries according to Embodiments 1 to 5 enable all-solid-state batteries in which short circuits between the positive and negative electrodes are suppressed in the batteries being manufactured and charged. Even when a high voltage (for example, a voltage equal to or higher than that of two battery cells) is required, such a stack all-solid-state battery including solid electrolytes is easily manufactured to generate such a high voltage by directly connecting together in series a plurality of power generation elements within each battery cell. Each of the batteries according to Embodiments 1 to 5 enables, even when a plurality of cells are stacked, a stack all-solid-state battery in which short circuits between the positive and negative electrodes do not occur.

Incidentally, methods for manufacturing the batteries according to Embodiments 1 to 5 will be described as Embodiments 6 and 7 below.

Embodiment 6

Hereinafter, Embodiment 6 will be described. Some descriptions overlapping any of those described in Embodiments 1 to 5 above will be appropriately omitted.

Figure 23:
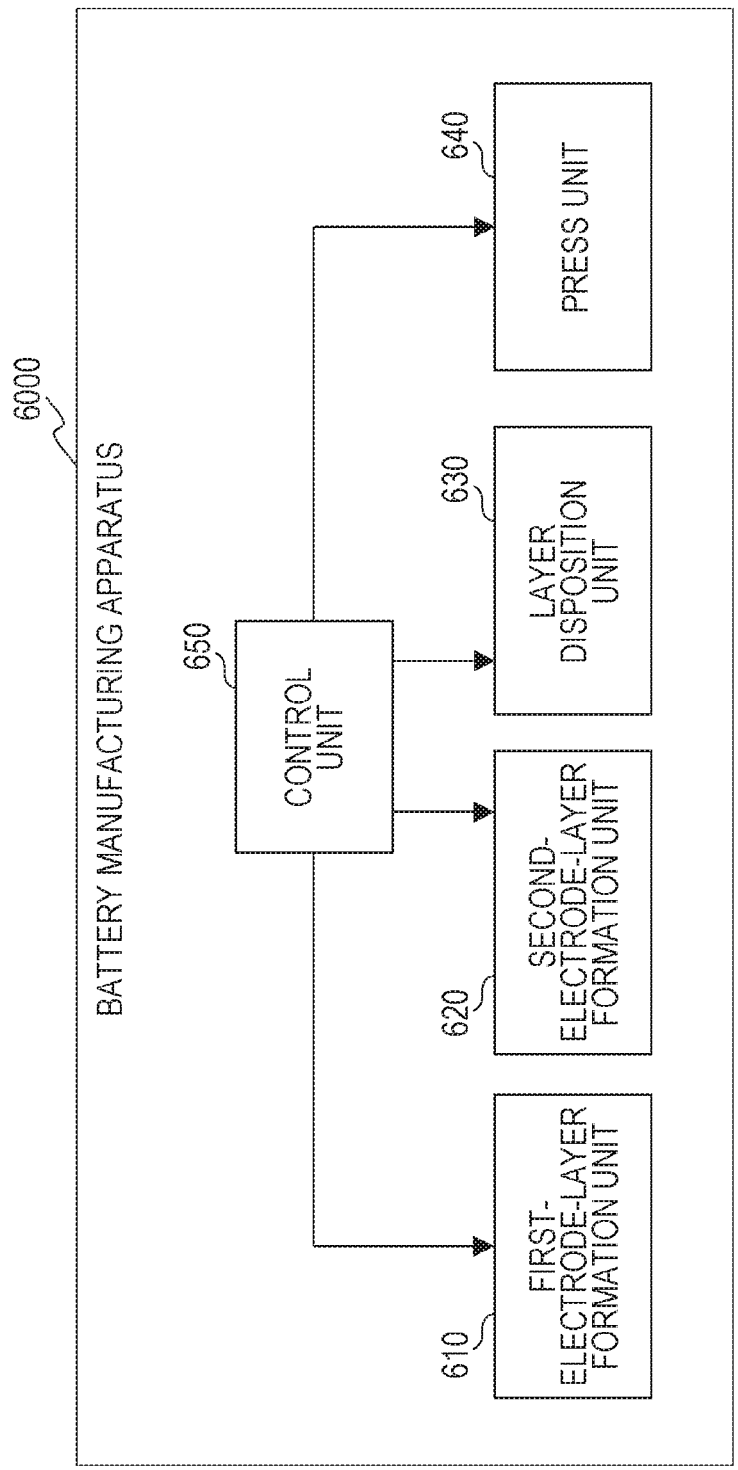
FIG. 23 illustrates the schematic configuration of a battery manufacturing apparatus 6000 according to Embodiment 6.

FIG. 23 illustrates the schematic configuration of a battery manufacturing apparatus 6000 according to Embodiment 6.

The battery manufacturing apparatus 6000 according to Embodiment 6 includes a first-electrode-layer formation unit 610, a second-electrode-layer formation unit 620, and a layer disposition unit 630.

The first-electrode-layer formation unit 610 is configured to form the first electrode layer 100.

The first-electrode-layer formation unit 610 is configured to form the first active material layer 120 to be in contact with the first current collector 110, and to occupy a smaller area than the first current collector 110.

The first-electrode-layer formation unit 610 is configured to form the first solid electrolyte layer 130 to be in contact with the first current collector 110 and the first active material layer 120, and to occupy the same area as the first current collector 110.

The second-electrode-layer formation unit 620 is configured to form the second electrode layer 200.

The second-electrode-layer formation unit 620 is configured to form the second active material layer 220 to be in contact with the second current collector 210, and to occupy a smaller area than the second current collector 210.

The second-electrode-layer formation unit 620 is configured to form the second solid electrolyte layer 230 to be in contact with the second current collector 210 and the second active material layer 220, and to occupy the same area as the second current collector 210.

The layer disposition unit 630 is configured to dispose the first electrode layer 100 and the second electrode layer 200 on each other. Thus, the layer disposition unit 630 is configured to dispose the first active material layer 120 to face the second active material layer 220 with the first solid electrolyte layer 130 and the second solid electrolyte layer 230 therebetween.

Figure 24:
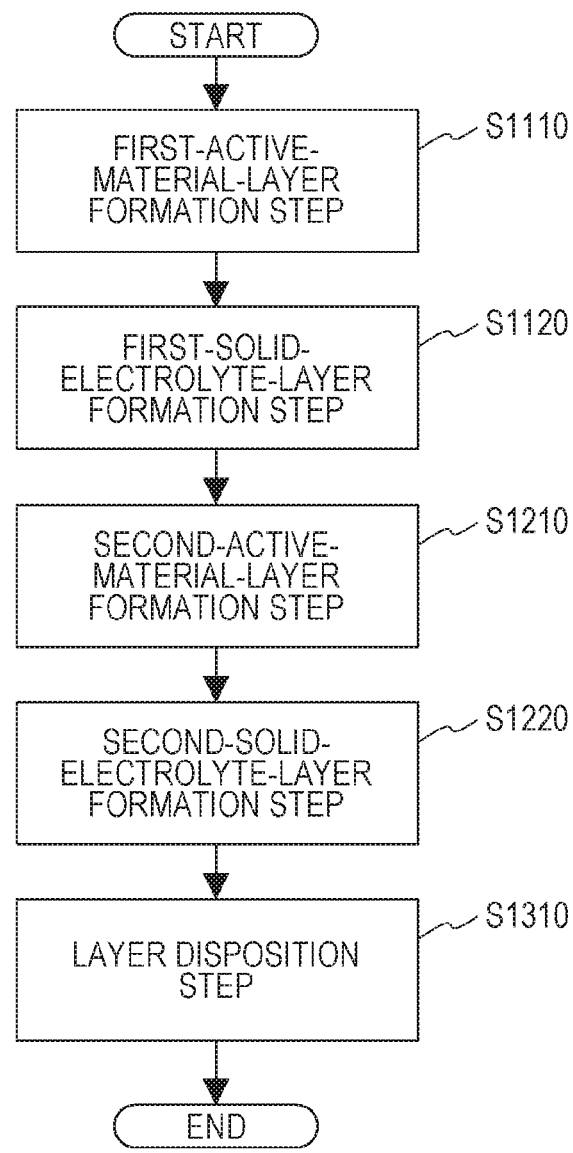
FIG. 24 is a flowchart illustrating a battery manufacturing method according to Embodiment 6.

FIG. 24 is a flowchart illustrating a battery manufacturing method according to Embodiment 6.

The battery manufacturing method according to Embodiment 6 is a battery manufacturing method using the battery manufacturing apparatus 6000 according to Embodiment 6. For example, the battery manufacturing method according to Embodiment 6 is a battery manufacturing method performed in the battery manufacturing apparatus 6000 according to Embodiment 6.

The battery manufacturing method according to Embodiment 6 includes a first-active-material-layer formation step S1110 (Step a1), a first-solid-electrolyte-layer formation step S1120 (Step a2), a second-active-material-layer formation step S1210 (Step b1), a second-solid-electrolyte-layer formation step S1220 (Step b2), and a layer disposition step S1310 (Step c).

The first-active-material-layer formation step S1110 is a step of forming, with the first-electrode-layer formation unit 610, the first active material layer 120 to be in contact with the first current collector 110, and to occupy a smaller area than the first current collector 110.

The first-solid-electrolyte-layer formation step S1120 is a step of forming, with the first-electrode-layer formation unit 610, the first solid electrolyte layer 130 to be in contact with the first current collector 110 and the first active material layer 120, and to occupy the same area as the first current collector 110. The first-solid-electrolyte-layer formation step S1120 is performed after the first-active-material-layer formation step S1110.

The second-active-material-layer formation step S1210 is a step of forming, with the second-electrode-layer formation unit 620, the second active material layer 220 to be in contact with the second current collector 210, and to occupy a smaller area than the second current collector 210.

The second-solid-electrolyte-layer formation step S1220 is a step of forming, with the second-electrode-layer formation unit 620, the second solid electrolyte layer 230 to be in contact with the second current collector 210 and the second active material layer 220, and to occupy the same area as the second current collector 210. The second-solid-electrolyte-layer formation step S1220 is performed after the second-active-material-layer formation step S1210.

The layer disposition step S1310 is a step of disposing, with the layer disposition unit 630, the first electrode layer 100 and the second electrode layer 200 on each other such that the first active material layer 120 faces the second active material layer 220 with the first solid electrolyte layer 130 and the second solid electrolyte layer 230 therebetween. The layer disposition step S1310 is performed after the first-solid-electrolyte-layer formation step S1120 and the second-solid-electrolyte-layer formation step S1220.

In the above-described manufacturing apparatus or manufacturing method, the first solid electrolyte layer 130 is formed to occupy the same area as the first current collector 110, the second solid electrolyte layer 230 is formed to occupy the same area as the second current collector 210, and then the first electrode layer 100 and the second electrode layer 200 are disposed on each other. This enables, even during manufacture of the battery, further enhancement of positional stability of the first current collector 110 and the second current collector 210, and a further reduction in the probability of contact between the first current collector 110 and the second current collector 210.

In addition, the above-described manufacturing apparatus or manufacturing method enables a further reduction in the probability of contact between the first current collector 110 and the second current collector 210. Specifically, a portion between the first current collector 110 and the second current collector 210, which face each other with the portion therebetween, is fixed with the first solid electrolyte layer 130 and the second solid electrolyte layer 230. For example, even when the first current collector 110 and the second current collector 210 are constituted by thin films, the presence of the first solid electrolyte layer 130 and the second solid electrolyte layer 230 enables the spacing between the first current collector 110 and the second current collector 210 to be maintained to have at least a predetermined distance (for example, equal to or longer than the total thickness of the first solid electrolyte layer 130 and the second solid electrolyte layer 230). This prevents the first current collector 110 and the second current collector 210 from coming into close proximity to each other. This prevents, for example, even when a plurality of battery cells are stacked, deformation of the first current collector 110 and the second current collector 210. Thus, for example, even when a plurality of battery cells are stacked, short circuits are prevented between the first current collector 110 and the second current collector 210. In addition, in another example that is an all-solid-state battery not having any separator between the first electrode layer 100 and the second electrode layer 200, the risk of short circuits caused by direct contact between the first current collector 110 and the second current collector 210 is reduced.

In addition, the above-described manufacturing apparatus or manufacturing method eliminates the necessity of an additional member for insulation between the first electrode layer 100 and the second electrode layer 200 (for example, an insulation spacer). This enables further simplification of and a reduction in the costs for battery manufacturing steps.

In addition, the above-described manufacturing apparatus or manufacturing method provides a solid electrolyte layer in which the first solid electrolyte layer 130 and the second solid electrolyte layer 230 are bonded together. This enables a reduction in the probability of short circuits due to pinholes that may be generated, for example, during manufacture, in the first solid electrolyte layer 130 and the second solid electrolyte layer 230.

Incidentally, in the above-described manufacturing method, the first current collector 110 may be a current collector including a peripheral portion including the first rounded portion 140. In this case, the shape of the first rounded portion 140 (or the shape of the first current collector 110) may be selected from the above-described shapes in Embodiments 1 to 5. In this case, the first solid electrolyte layer 130 is formed to occupy the same area as the first current collector 110, so that the first rounded portion 140 is formed in the peripheral portions of the first current collector 110 and the first solid electrolyte layer 130. Thus, the first electrode layer 100 including the first rounded portion 140 is formed.

In the above-described manufacturing method, the second current collector 210 may be a current collector including a peripheral portion including the second rounded portion 240. In this case, the shape of the second rounded portion 240 (or the shape of the second current collector 210) may be selected from the above-described shapes in Embodiments 1 to 5. In this case, the second solid electrolyte layer 230 is formed to occupy the same area as the second current collector 210, so that the second rounded portion 240 is formed in the peripheral portions of the second current collector 210 and the second solid electrolyte layer 230. Thus, the second electrode layer 200 including the second rounded portion 240 is formed.

The third electrode layer 300 including the third rounded portion 340, and the fourth electrode layer 400 including the fourth rounded portion 440 can also be formed by the same method as above.

The size of the main surfaces of current collectors prepared may be changed, which results in a change in the size of the main surfaces of the electrode layers. In this case, the electrode layers can be formed to have rounded portions that have the same shape, or the electrode layers can be formed to have the same shape.

In the layer disposition step, the positions of the electrode layers being disposed may be adjusted. This enables disposition of the electrode layers in which the edge portions of the rounded portions of the electrode layers are located to coincide with each other, or enables disposition of the electrode layers in which the edge portions of the electrode layers are located to coincide with each other.

In each of the active-material-layer formation steps, the area where the active material layer is formed may be adjusted. This enables formation of a rounded portion in the edge portion of the active material layer.

Incidentally, in the battery manufacturing apparatus 6000 according to Embodiment 6, the second-electrode-layer formation unit 620 may be configured to form the first active material layer 120 to occupy a larger area than the second active material layer 220. In this case, the layer disposition unit 630 may be used to dispose the second active material layer 220 to be within the area of the first active material layer 120.

In other words, in the battery manufacturing method according to Embodiment 6, in the second-active-material-layer formation step S1210, the second-electrode-layer formation unit 620 may be used to form the second active material layer 220 to occupy a smaller area than the first active material layer 120.

In this case, in the layer disposition step S1310, the layer disposition unit 630 may be used to dispose the first active material layer 120 so as to be outside of the area of the second active material layer 220.

The above-described manufacturing apparatus or manufacturing method enables suppression of precipitation of metal (for example, lithium) on the first active material layer 120. This prevents short circuits between the first electrode layer 100 and the second electrode layer 200 due to precipitation of metal.

Incidentally, in Embodiment 6, as illustrated in FIG. 24, the second-active-material-layer formation step S1210 and the second-solid-electrolyte-layer formation step S1220 may be performed after the first-active-material-layer formation step S1110 and the first-solid-electrolyte-layer formation step S1120.

Alternatively, the second-active-material-layer formation step S1210 and the second-solid-electrolyte-layer formation step S1220 may be performed before the first-active-material-layer formation step S1110 and the first-solid-electrolyte-layer formation step S1120.

Alternatively, the second-active-material-layer formation step S1210 and the second-solid-electrolyte-layer formation step S1220 may be performed concurrently with the first-active-material-layer formation step S1110 and the first-solid-electrolyte-layer formation step S1120.

Hereinafter, a specific example of the battery manufacturing method according to Embodiment 6 will be described.

Figure 25:
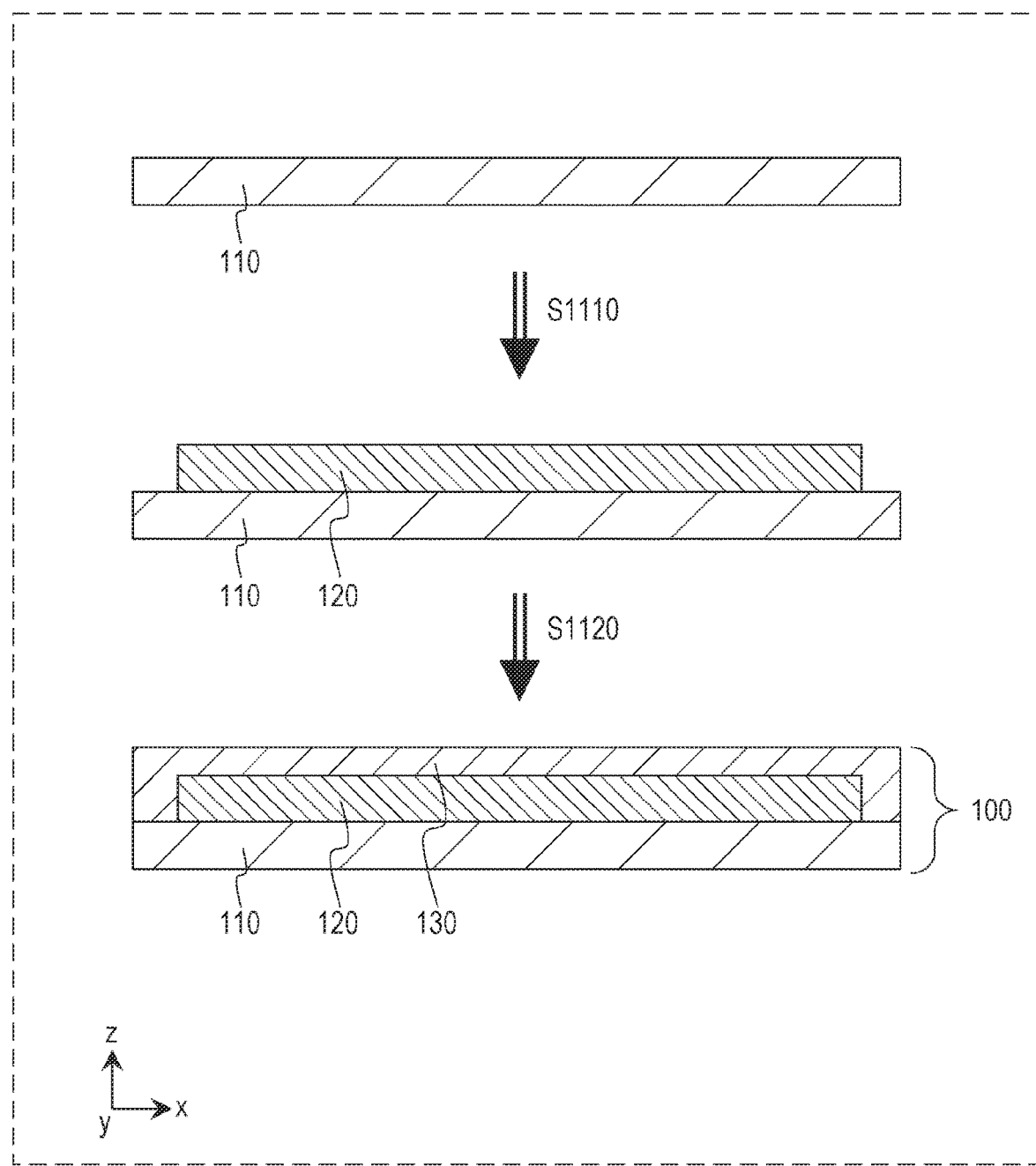
FIG. 25 illustrates an example of a first-active-material-layer formation step S1110 and a first-solid-electrolyte-layer formation step S1120.

FIG. 25 illustrates an example of the first-active-material-layer formation step S1110 and the first-solid-electrolyte-layer formation step S1120.

On the first current collector 110 prepared, the first active material layer 120 is formed. For example, a coating material paste provided by kneading an active material (and other materials) and a predetermined solvent is applied to the first current collector 110 with a coating apparatus, for example, (and may further be dried). At this time, the first active material layer 120 is formed to be in contact with the first current collector 110, and to occupy a smaller area than the first current collector 110 (first-active-material-layer formation step S1110). Thus, the first active material layer 120 is formed on the first current collector 110 such that the first current collector 110 is exposed around the first active material layer 120.

On the first current collector 110 having the first active material layer 120 thereon, the first solid electrolyte layer 130 is formed. For example, a coating material paste provided by kneading a solid electrolyte (and other materials) and a predetermined solvent is applied to the first active material layer 120 and the first current collector 110 with a coating apparatus, for example, (and may further be dried). At this time, the first solid electrolyte layer 130 is formed to occupy the same area as the first current collector 110 (first-solid-electrolyte-layer formation step S1120). Thus, the first solid electrolyte layer 130 is formed on the exposed first current collector 110 to cover the first active material layer 120. Thus, the first electrode layer 100 (for example, an electrode plate) is formed.

Figure 26:
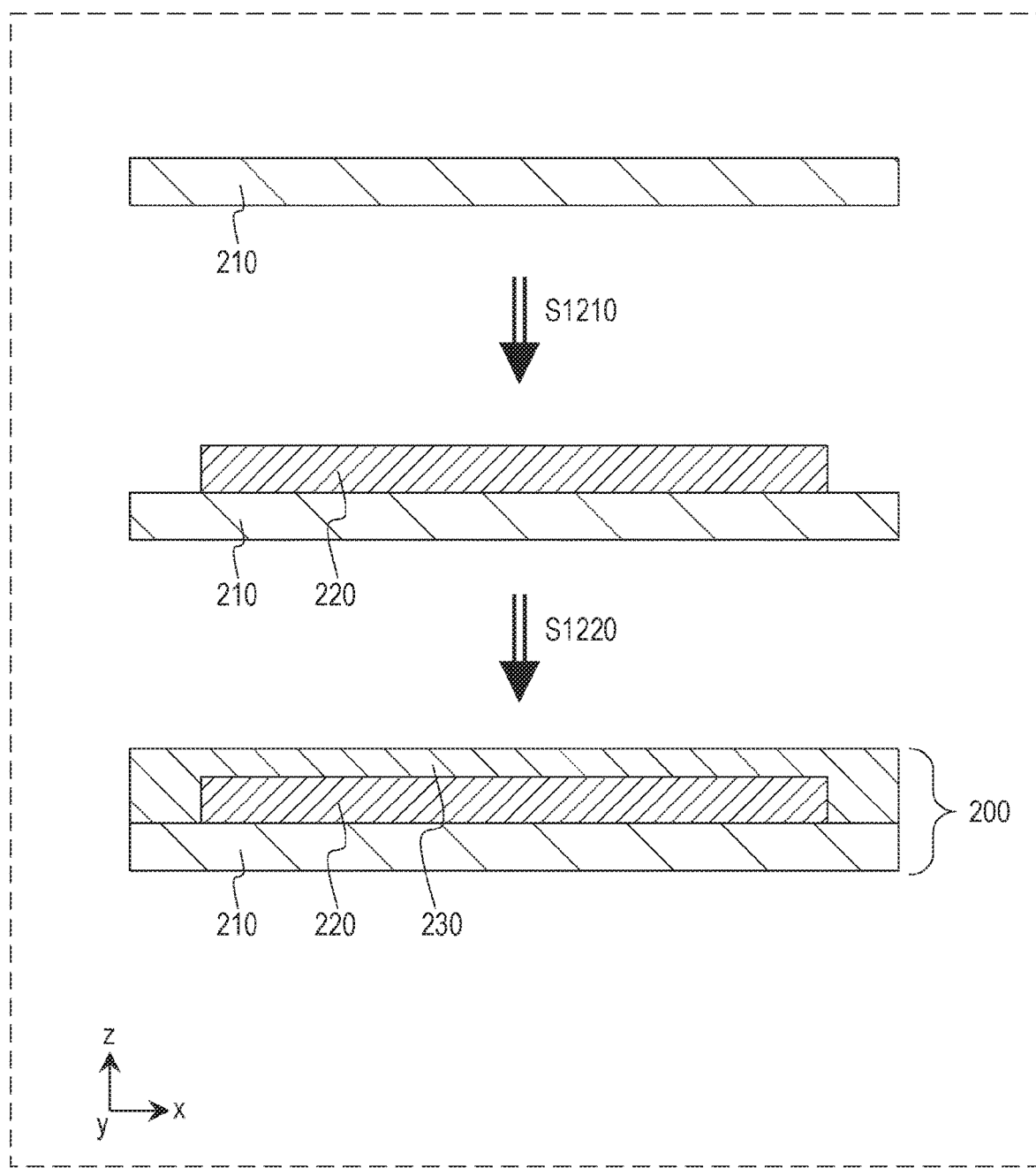
FIG. 26 illustrates an example of a second-active-material-layer formation step S1210 and a second-solid-electrolyte-layer formation step S1220.

FIG. 26 illustrates an example of the second-active-material-layer formation step S1210 and the second-solid-electrolyte-layer formation step S1220.

On the second current collector 210 prepared, the second active material layer 220 is formed. For example, a coating material paste provided by kneading an active material (and other materials) and a predetermined solvent is applied to the second current collector 210 with a coating apparatus, for example, (and may further be dried). At this time, the second active material layer 220 is formed to be in contact with the second current collector 210, and to occupy a smaller area than the second current collector 210 (second-active-material-layer formation step S1210). Thus, the second active material layer 220 is formed on the second current collector 210 such that the second current collector 210 is exposed around the second active material layer 220. Incidentally, in the example illustrated in FIG. 26, the second active material layer 220 is formed to occupy a larger area than the first active material layer 120 (in other words, to have a larger area than the first active material layer 120).

On the second current collector 210 having the second active material layer 220 thereon, the second solid electrolyte layer 230 is formed. For example, a coating material paste provided by kneading a solid electrolyte (and other materials) and a predetermined solvent is applied to the second active material layer 220 and the second current collector 210 with a coating apparatus, for example, (and may further be dried). At this time, the second solid electrolyte layer 230 is formed to occupy the same area as the second current collector 210 (second-solid-electrolyte-layer formation step S1220). Thus, the second solid electrolyte layer 230 is formed on the exposed second current collector 210 to cover the second active material layer 220. Thus, the second electrode layer 200 (for example, an electrode plate) is formed.

Figure 27:
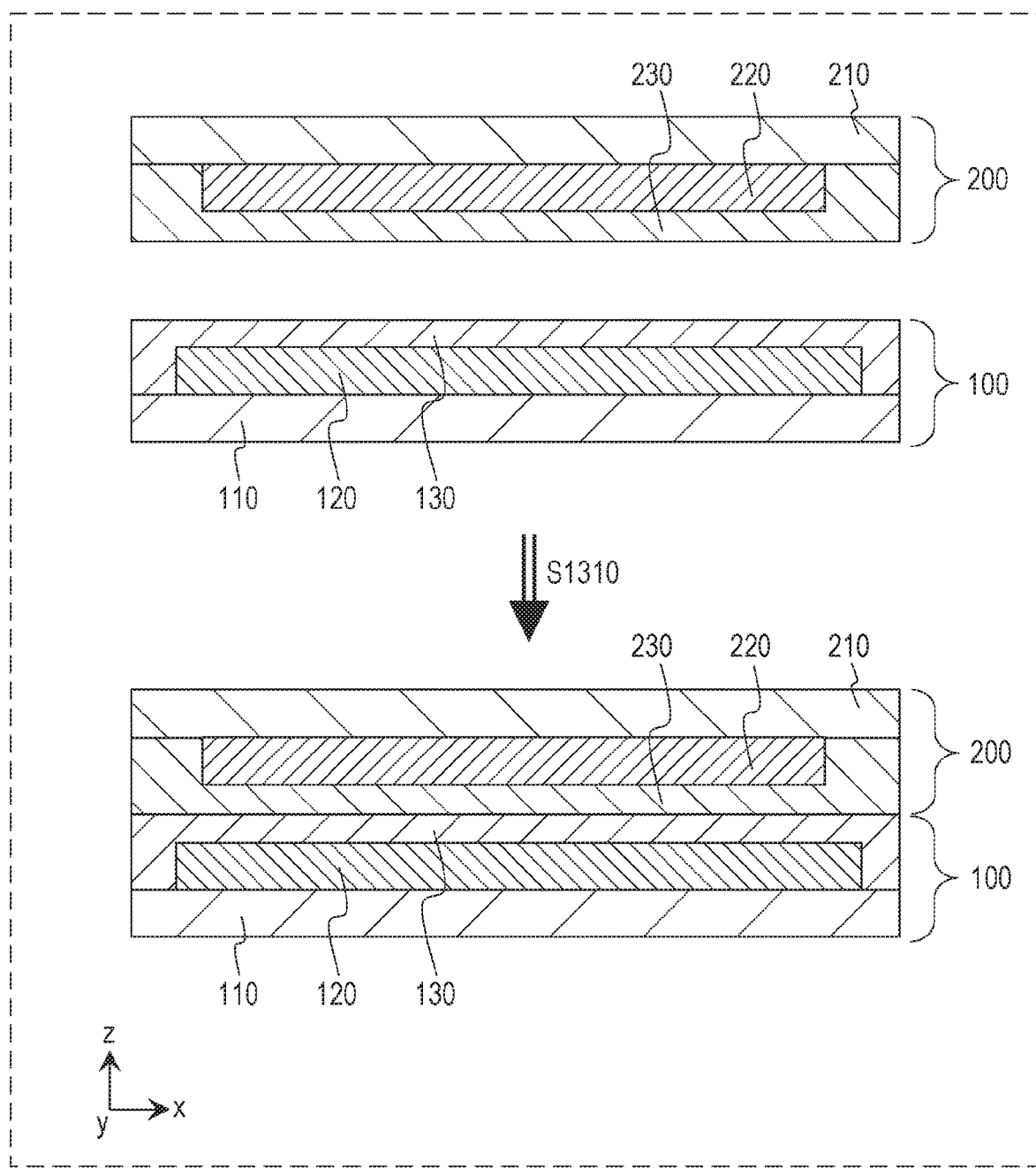
FIG. 27 illustrates an example of a layer disposition step S1310.

FIG. 27 illustrates an example of the layer disposition step S1310.

The first electrode layer 100 and the second electrode layer 200 separately formed are placed to face each other with a conveyance apparatus, for example. Subsequently, the first electrode layer 100 and the second electrode layer 200 are brought into contact with each other to thereby be disposed on each other. Thus, the first active material layer 120 faces the second active material layer 220 with the first solid electrolyte layer 130 and the second solid electrolyte layer 230 therebetween (layer disposition step S1310).

A portion of the first solid electrolyte layer 130 and a portion of the second solid electrolyte layer 230, the portions being in contact with each other, can be bonded together by a drying step or a press-bonding step, for example.

Incidentally, in the layer disposition step S1310, the whole region of a main surface of the first solid electrolyte layer 130 and the whole region of a main surface of the second solid electrolyte layer 230 may be brought into contact with each other (and then may be bonded together). Alternatively, a partial region of a main surface (for example, a half or larger region of the main surface) of the first solid electrolyte layer 130 and a partial region of a main surface (for example, a half or larger region of the main surface) of the second solid electrolyte layer 230 may be brought into contact with each other (and then may be bonded together).

Figure 28:
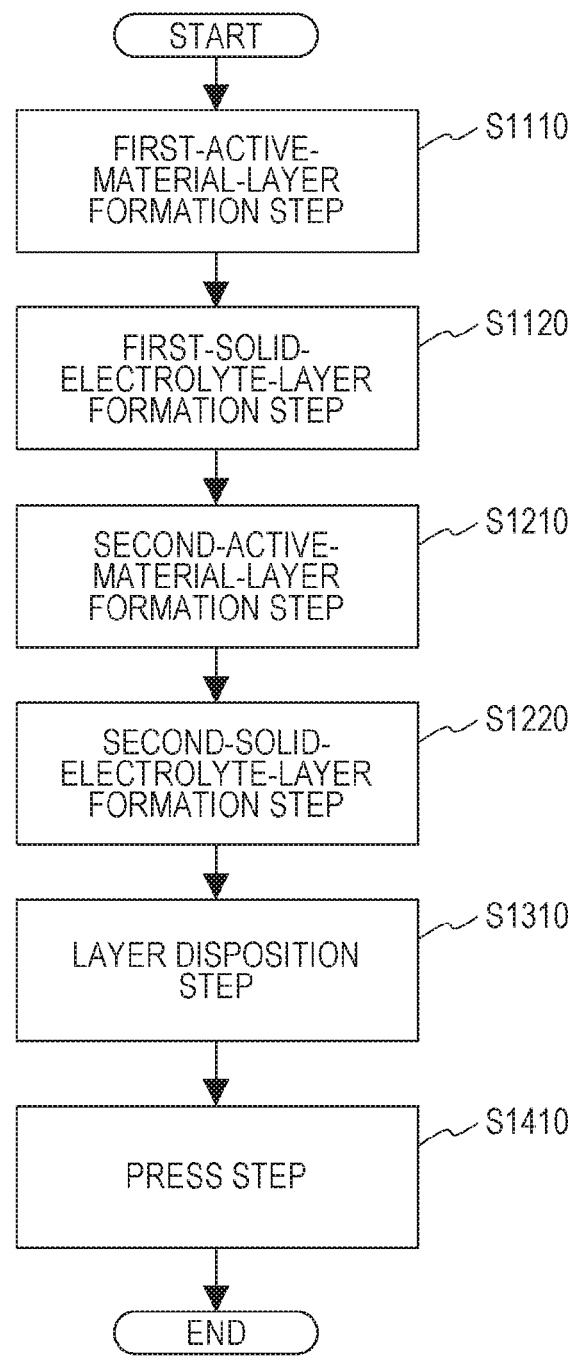
FIG. 28 is a flowchart illustrating a modification of a battery manufacturing method according to Embodiment 6.

FIG. 28 is a flowchart illustrating a modification of the battery manufacturing method according to Embodiment 6.

In Embodiment 6, as illustrated in FIG. 23, the battery manufacturing apparatus 6000 may further include a press unit 640.

The press unit 640 is configured to press the first electrode layer 100 and the second electrode layer 200 that are disposed on each other, to thereby bond together the first solid electrolyte layer 130 and the second solid electrolyte layer 230.

In other words, as illustrated in FIG. 28, the battery manufacturing method according to Embodiment 6 may further include a press step S1410 (Step d). Incidentally, the press step S1410 may be performed after the layer disposition step S1310.

The press step S1410 is a step of pressing, with the press unit 640, the first electrode layer 100 and the second electrode layer 200 that are disposed on each other, to thereby bond together (press-bond together) the first solid electrolyte layer 130 and the second solid electrolyte layer 230.

In the above-described manufacturing apparatus or manufacturing method, the first solid electrolyte layer 130 and the second solid electrolyte layer 230 are press-bonded together, to thereby achieve stronger bonding between the first solid electrolyte layer 130 and the second solid electrolyte layer 230. The above-described manufacturing apparatus or manufacturing method also enables a further reduction in the probability of short circuits due to pinholes that may be generated in the first solid electrolyte layer 130 and the second solid electrolyte layer 230.

Figure 29:
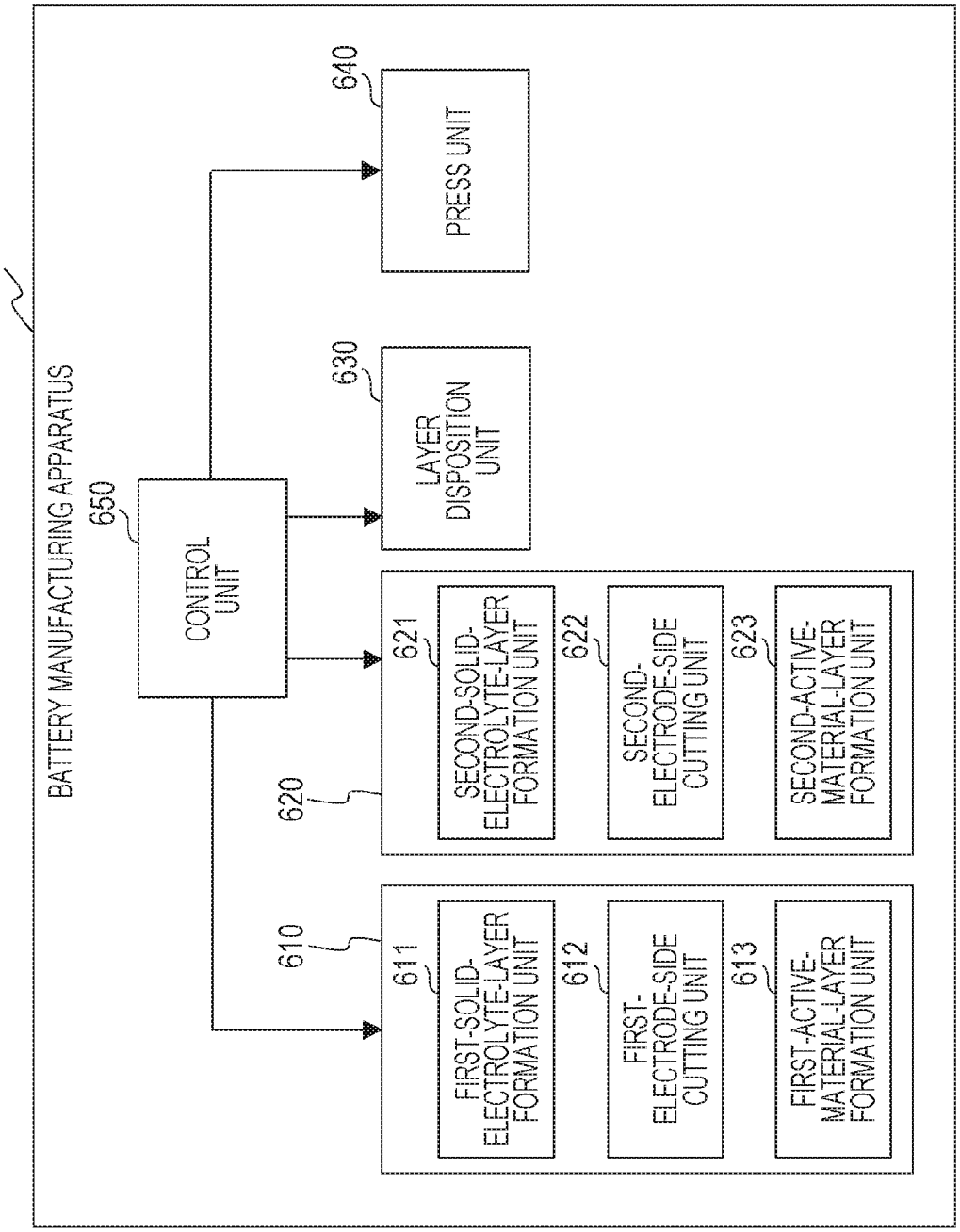
FIG. 29 illustrates the schematic configuration of a battery manufacturing apparatus 6100 according to Embodiment 6.

FIG. 29 illustrates the schematic configuration of a battery manufacturing apparatus 6100 according to Embodiment 6.

In the battery manufacturing apparatus 6100 according to Embodiment 6, the first-electrode-layer formation unit 610 includes a first-solid-electrolyte-layer formation unit 611, and a first-electrode-side cutting unit 612.

The first-solid-electrolyte-layer formation unit 611 is configured to form the first solid electrolyte layer 130 to be in contact with the first current collector 110 and the first active material layer 120.

The first-electrode-side cutting unit 612 is configured to cut the first solid electrolyte layer 130 and the first current collector 110 such that the first solid electrolyte layer 130 occupies the same area as the first current collector 110.

In the battery manufacturing apparatus 6100 according to Embodiment 6, the second-electrode-layer formation unit 620 includes a second-solid-electrolyte-layer formation unit 621, and a second-electrode-side cutting unit 622.

The second-solid-electrolyte-layer formation unit 621 is configured to form the second solid electrolyte layer 230 to be in contact with the second current collector 210 and the second active material layer 220.

The second-electrode-side cutting unit 622 is configured to cut the second solid electrolyte layer 230 and the second current collector 210 such that the second solid electrolyte layer 230 occupies the same area as the second current collector 210.

Figure 30:
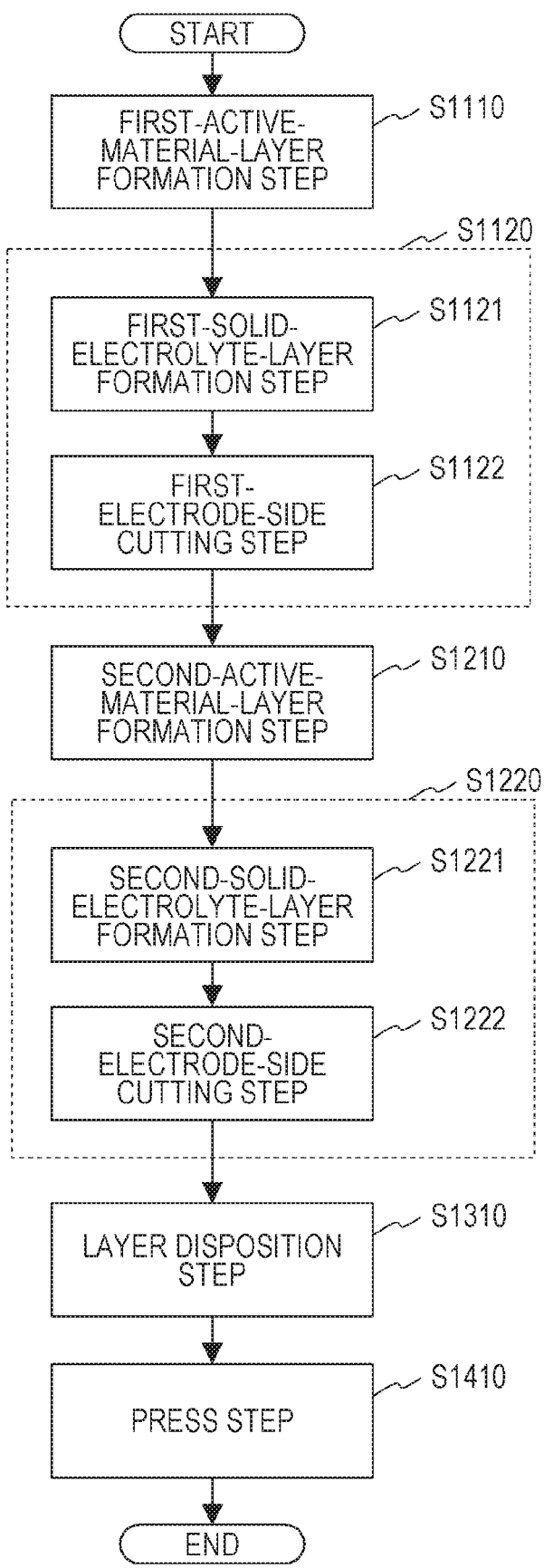
FIG. 30 is a flowchart illustrating a modification of a battery manufacturing method according to Embodiment 6.

FIG. 30 is a flowchart illustrating a modification of the battery manufacturing method according to Embodiment 6.

The battery manufacturing method illustrated in FIG. 30 is a battery manufacturing method using the battery manufacturing apparatus 6100 according to Embodiment 6. For example, the battery manufacturing method illustrated in FIG. 30 is a battery manufacturing method performed in the battery manufacturing apparatus 6100 according to Embodiment 6.

In the battery manufacturing method illustrated in FIG. 30, a first-solid-electrolyte-layer formation step S1120 (Step a2) includes a first-solid-electrolyte-layer formation step S1121 (Step a21) and a first-electrode-side cutting step S1122 (Step a22).

The first-solid-electrolyte-layer formation step S1121 is a step of forming the first solid electrolyte layer 130, with the first-solid-electrolyte-layer formation unit 611, so as to be in contact with the first current collector 110 and the first active material layer 120.

The first-electrode-side cutting step S1122 is a step of cutting the first solid electrolyte layer 130 and the first current collector 110, with the first-electrode-side cutting unit 612, such that the first solid electrolyte layer 130 occupies the same area as the first current collector 110. The first-electrode-side cutting step S1122 is performed after the first-solid-electrolyte-layer formation step S1121.

In the above-described manufacturing apparatus or manufacturing method, the simple cutting step is performed, so that the first solid electrolyte layer 130 and the first current collector 110 occupy the same area. This enables further simplification of and a reduction in the costs for battery manufacturing steps.

Incidentally, in the battery manufacturing apparatus 6100 according to Embodiment 6, the first-electrode-layer formation unit 610 may include a first-active-material-layer formation unit 613. The first-active-material-layer formation unit 613 is configured to form the first active material layer 120. Thus, in the first-active-material-layer formation step S1110, the first-active-material-layer formation unit 613 may be used to form the first active material layer 120.

In the battery manufacturing apparatus 6100 according to Embodiment 6, the second-electrode-layer formation unit 620 may include a second-active-material-layer formation unit 623. The second-active-material-layer formation unit 623 is configured to form the second active material layer 220. Thus, in the second-active-material-layer formation step S1210, the second-active-material-layer formation unit 623 may be used to form the second active material layer 220.

Figure 31:
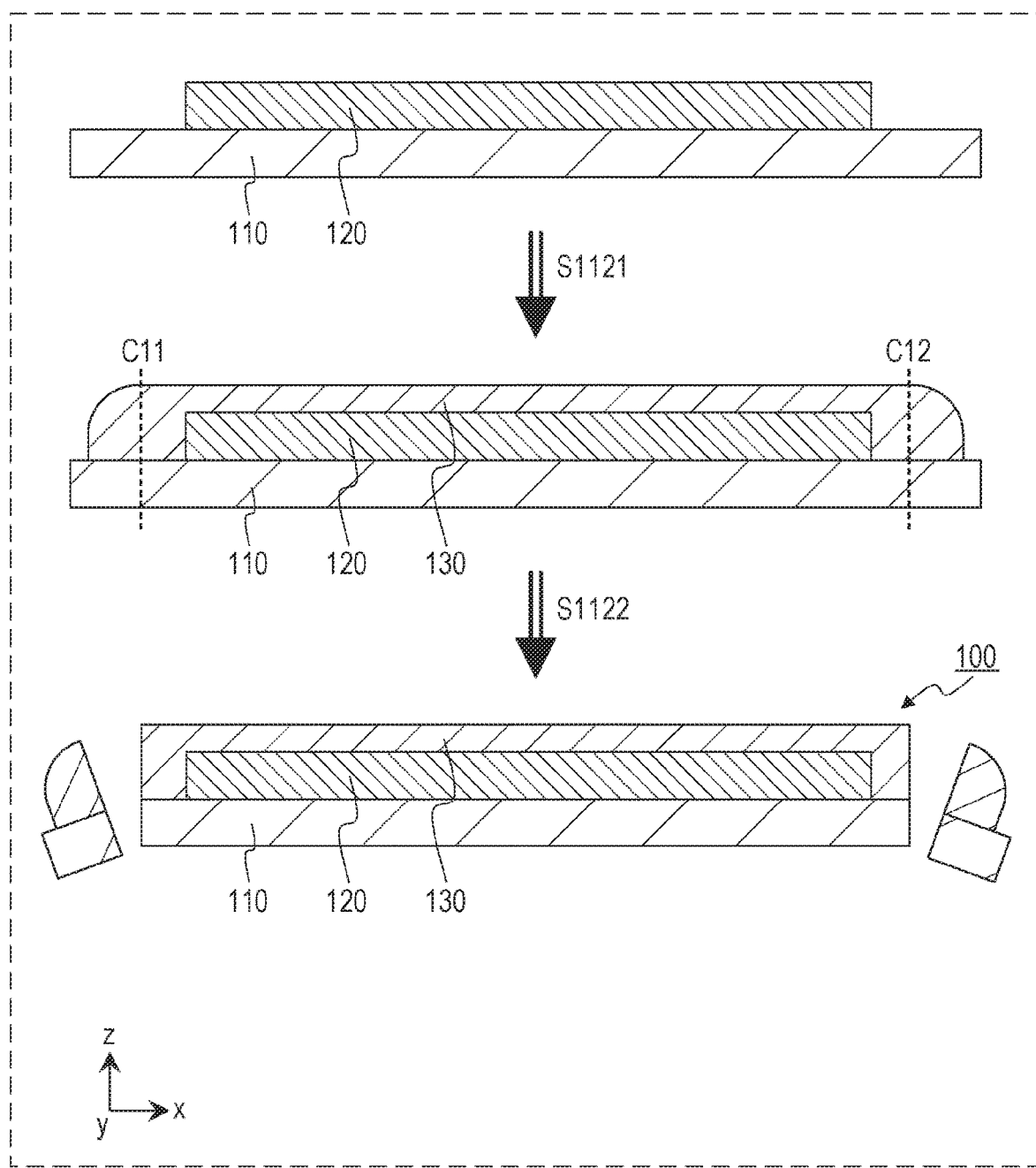
FIG. 31 illustrates an example of a first-solid-electrolyte-layer formation step S1121 and a first-electrode-side cutting step S1122.

FIG. 31 illustrates an example of the first-solid-electrolyte-layer formation step S1121 and the first-electrode-side cutting step S1122.

On the first current collector 110 having the first active material layer 120 thereon, the first solid electrolyte layer 130 is formed. For example, a coating material paste provided by kneading a solid electrolyte (and other materials) and a predetermined solvent is applied to the first active material layer 120 and the first current collector 110 with a coating apparatus, for example, (and may further be dried). At this time, the first solid electrolyte layer 130 is formed to occupy a smaller area than the first current collector 110 (first-solid-electrolyte-layer formation step S1121).

The first current collector 110 having the first solid electrolyte layer 130 thereon is cut with a cutting apparatus, for example. The first solid electrolyte layer 130 and the first current collector 110 are cut (for example, cut at positions C11 and C12). As a result, the first solid electrolyte layer 130 occupies the same area as the first current collector 110 (first-electrode-side cutting step S1122). Thus, the first electrode layer 100 (for example, an electrode plate) is formed.

Incidentally, in the first-electrode-side cutting step S1122, the first current collector 110 and the first solid electrolyte layer 130 may be simultaneously punched out to achieve the cutting. In this case, the four side edges of the first current collector 110 and the first solid electrolyte layer 130 may be simultaneously cut off.

Incidentally, in the first-electrode-side cutting step S1122, cutting may be performed such that the first electrode layer 100 has a main surface having an area and a shape that are the same as the area and the shape of a main surface of the second electrode layer 200.

In the battery manufacturing method illustrated in FIG. 30, a second-solid-electrolyte-layer formation step S1220 (Step b2) includes a second-solid-electrolyte-layer formation step S1221 (Step b21) and a second-electrode-side cutting step S1222 (Step b22).

The second-solid-electrolyte-layer formation step S1221 is a step of forming the second solid electrolyte layer 230, with the second-solid-electrolyte-layer formation unit 621, so as to be in contact with the second current collector 210 and the second active material layer 220.

The second-electrode-side cutting step S1222 is a step of cutting the second solid electrolyte layer 230 and the second current collector 210, with the second-electrode-side cutting unit 622, such that the second solid electrolyte layer 230 occupies the same area as the second current collector 210. The second-electrode-side cutting step S1222 is performed after the second-solid-electrolyte-layer formation step S1221.

In such a configuration, the simple cutting step is performed, so that the second solid electrolyte layer 230 and the second current collector 210 occupy the same area. This enables further simplification of and a reduction in the costs for battery manufacturing steps.

Figure 32:
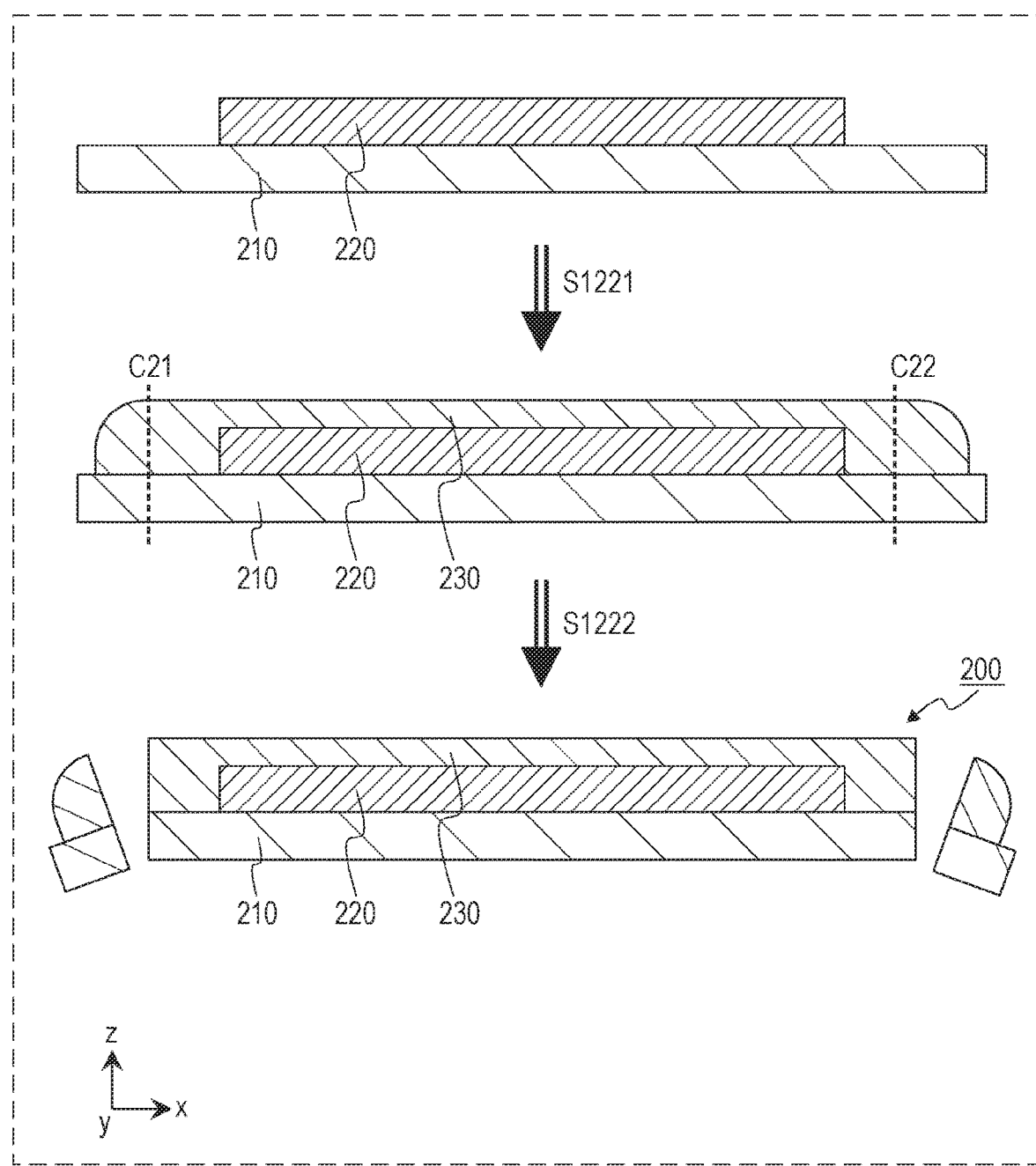
FIG. 32 illustrates an example of a second-solid-electrolyte-layer formation step S1221 and a second-electrode-side cutting step S1222.

FIG. 32 illustrates an example of the second-solid-electrolyte-layer formation step S1221 and the second-electrode-side cutting step S1222.

On the second current collector 210 having the second active material layer 220 thereon, the second solid electrolyte layer 230 is formed. For example, a coating material paste provided by kneading a solid electrolyte (and other materials) and a predetermined solvent is applied to the second active material layer 220 and the second current collector 210 with a coating apparatus, for example, (and may further be dried). At this time, the second solid electrolyte layer 230 is formed to occupy a smaller area than the second current collector 210 (second-solid-electrolyte-layer formation step S1221).

The second current collector 210 having the second solid electrolyte layer 230 thereon is cut with a cutting apparatus, for example. The second solid electrolyte layer 230 and the second current collector 210 are cut (for example, cut at positions C21 and C22). As a result, the second solid electrolyte layer 230 occupies the same area as the second current collector 210 (second-electrode-side cutting step S1222). Thus, the second electrode layer 200 (for example, an electrode plate) is formed.

Incidentally, in the second-electrode-side cutting step S1222, the second current collector 210 and the second solid electrolyte layer 230 may be simultaneously punched out to achieve the cutting. In this case, the four side edges of the second current collector 210 and the second solid electrolyte layer 230 may be simultaneously cut off.

Incidentally, in the second-electrode-side cutting step S1222, cutting may be performed such that the second electrode layer 200 has a main surface having an area and a shape that are the same as the area and the shape of a main surface of the first electrode layer 100.

Incidentally, in the above-described manufacturing method, in the first-electrode-side cutting step S1122, cutting may be performed such the first rounded portion 140 (or the first electrode layer 100) has the same shape as any one of the above-described shapes in Embodiments 1 to 5. Thus, the first electrode layer 100 including the first rounded portion 140 is formed.

In the above-described manufacturing method, in the second-electrode-side cutting step S1222, cutting may be performed such that the second rounded portion 240 (or the second electrode layer 200) has the same shape as any one of the above-described shapes in Embodiments 1 to 5. Thus, the second electrode layer 200 including the second rounded portion 240 is formed.

The third electrode layer 300 including the third rounded portion 340 and the fourth electrode layer 400 including the fourth rounded portion 440 can also be formed by the same cutting method as above.

A different region may be cut off from each electrode layer such that the electrode layer has a main surface of a different size. Thus, the rounded portions of the electrode layers can be formed to have the same shape. As a result, the electrode layers can be disposed on each other such that, for example, the edge portions of the rounded portions of the electrode layers are located to coincide with each other. Alternatively, the electrode layers can be formed to have the same shape. As a result, the electrode layers can be disposed on each other such that, for example, the edge portions of the electrode layers are located to coincide with each other.

Incidentally, in Embodiment 6, the first-electrode-layer formation unit 610 (for example, the first-solid-electrolyte-layer formation unit 611 and the first-active-material-layer formation unit 613) and the second-electrode-layer formation unit 620 (for example, the second-solid-electrolyte-layer formation unit 621 and the second-active-material-layer formation unit 623) may each include, for example, a discharge mechanism (for example, a discharge port) configured to discharge a coating material (for example, an active material or a solid electrolyte material), a supply mechanism (for example, a tank and a supply pipe) configured to supply the coating material to the discharge mechanism, a movement mechanism (for example, a roller) configured to move a coating target or the like, and a press mechanism (for example, a press platform and a cylinder) configured to perform compression. These mechanisms may be appropriately selected from publicly known apparatuses and members.

In Embodiment 6, the first-electrode-side cutting unit 612 and the second-electrode-side cutting unit 622 may each include, for example, a cutting mechanism (for example, a die punch apparatus) configured to cut a cutting target, and a movement mechanism (for example, a roller) configured to move a cutting target or the like. These mechanisms may be appropriately selected from publicly known apparatuses and members.

In Embodiment 6, the layer disposition unit 630 may include, for example, a conveyance mechanism (for example, a roller) configured to convey the first electrode layer 100 and the second electrode layer 200 to be disposed on each other. The mechanism may be appropriately selected from publicly known apparatuses and members.

In Embodiment 6, the press unit 640 may include, for example, a press mechanism (for example, a press platform and a cylinder) configured to compress the multilayer body including the first electrode layer 100 and the second electrode layer 200, and a movement mechanism (for example, a roller) configured to move the first electrode layer 100 and the second electrode layer 200 to be pressed. These mechanisms may be appropriately selected from publicly known apparatuses and members.

The battery manufacturing apparatus according to Embodiment 6 may further include a control unit 650. The control unit 650 is configured to control operations of the first-electrode-layer formation unit 610 (for example, the first-solid-electrolyte-layer formation unit 611 and the first-electrode-side cutting unit 612), the second-electrode-layer formation unit 620 (for example, the second-solid-electrolyte-layer formation unit 621 and the second-electrode-side cutting unit 622), the layer disposition unit 630, and the press unit 640.

The control unit 650 may be constituted by, for example, a processor and a memory. The processor may be, for example, a CPU (Central Processing Unit) or an MPU (Micro-Processing Unit). In this case, the processor may be configured to read out and execute a program stored in the memory, to thereby perform a control method (battery manufacturing method) according to the present disclosure.

Embodiment 7

Hereinafter, Embodiment 7 will be described. Some descriptions overlapping any of those described in Embodiments 1 to 6 above will be appropriately omitted.

Figure 33:
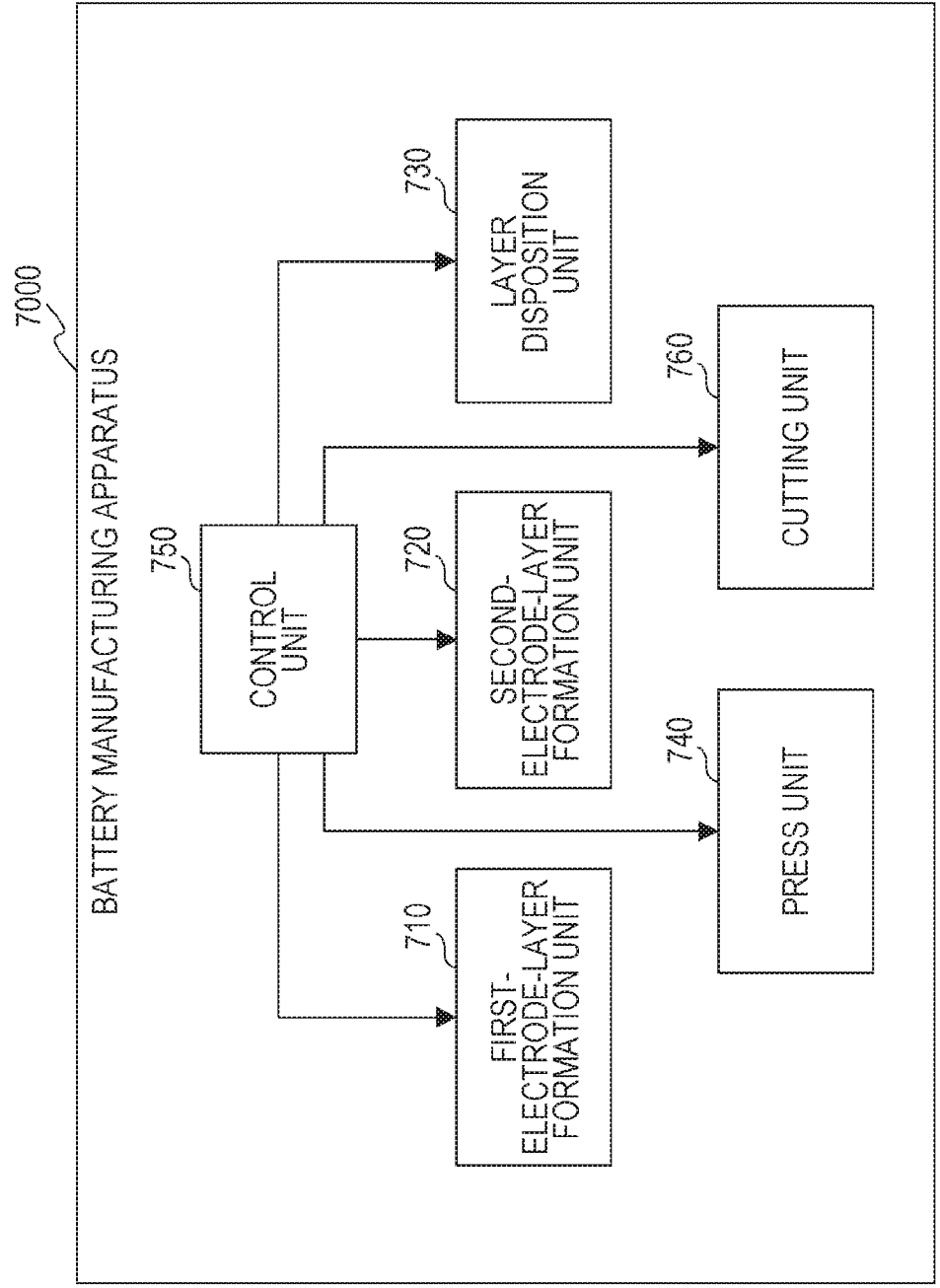
FIG. 33 illustrates the schematic configuration of a battery manufacturing apparatus 7000 according to Embodiment 7.

FIG. 33 illustrates the schematic configuration of a battery manufacturing apparatus 7000 according to Embodiment 7.

The battery manufacturing apparatus 7000 according to Embodiment 7 includes a first-electrode-layer formation unit 710, a second-electrode-layer formation unit 720, a layer disposition unit 730, and a cutting unit 760.

The first-electrode-layer formation unit 710 is configured to form the first electrode layer 100.

The first-electrode-layer formation unit 710 is configured to form the first active material layer 120 to be in contact with the first current collector 110 and to occupy a smaller area than the first current collector 110.

The first-electrode-layer formation unit 710 is configured to form the first solid electrolyte layer 130 to be in contact with the first current collector 110 and the first active material layer 120.

The second-electrode-layer formation unit 720 is configured to form the second electrode layer 200.

The second-electrode-layer formation unit 720 is configured to form the second active material layer 220 to be in contact with the second current collector 210, and to occupy a smaller area than the second current collector 210.

The second-electrode-layer formation unit 720 is configured to form the second solid electrolyte layer 230 to be in contact with the second current collector 210 and the second active material layer 220.

The layer disposition unit 730 is configured to dispose the first electrode layer 100 and the second electrode layer 200 on each other. Thus, the layer disposition unit 730 is configured to dispose the first active material layer 120 to face the second active material layer 220 with the first solid electrolyte layer 130 and the second solid electrolyte layer 230 therebetween.

The cutting unit 760 is configured to cut the first solid electrolyte layer 130 and the second solid electrolyte layer 230, and the first current collector 110 and the second current collector 210. Thus, the cutting unit 760 provides the first solid electrolyte layer 130 occupying the same area as the first current collector 110, and provides the second solid electrolyte layer 230 occupying the same area as the second current collector 210.

Figure 34:
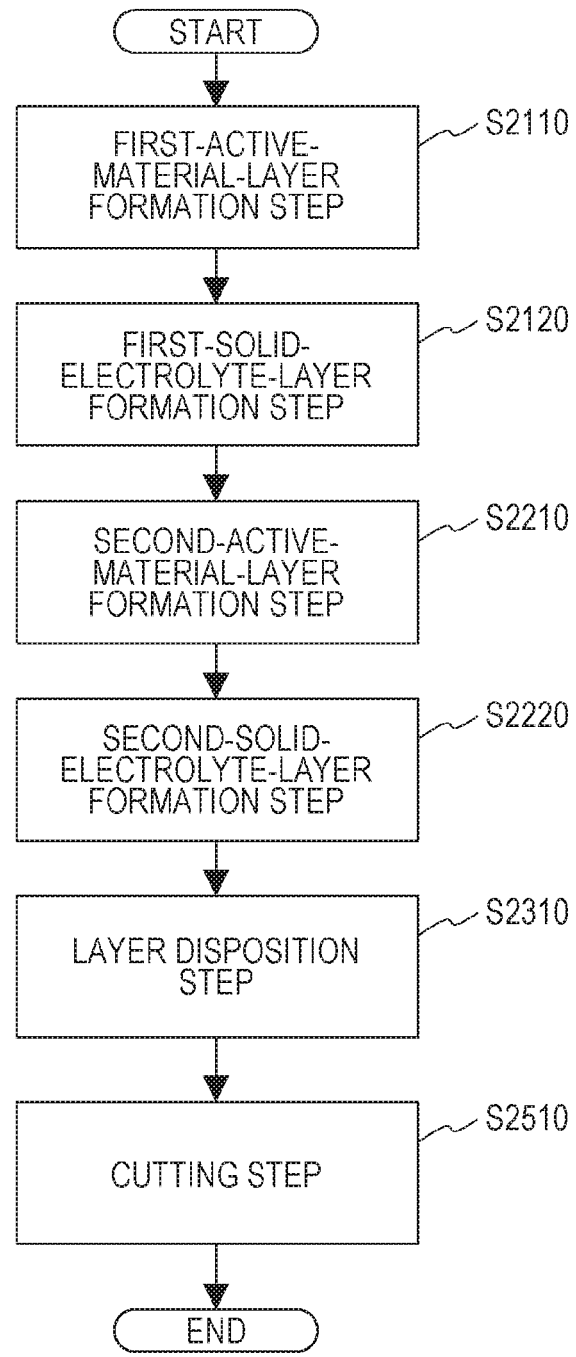
FIG. 34 is a flowchart illustrating a battery manufacturing method according to Embodiment 7.

FIG. 34 is a flowchart illustrating a battery manufacturing method according to Embodiment 7.

The battery manufacturing method according to Embodiment 7 is a battery manufacturing method using the battery manufacturing apparatus 7000 according to Embodiment 7. For example, the battery manufacturing method according to Embodiment 7 is a battery manufacturing method performed in the battery manufacturing apparatus 7000 according to Embodiment 7.

The battery manufacturing method according to Embodiment 7 includes a first-active-material-layer formation step S2110 (Step e1), a first-solid-electrolyte-layer formation step S2120 (Step e2), a second-active-material-layer formation step S2210 (Step f1), a second-solid-electrolyte-layer formation step S2220 (Step f2), a layer disposition step S2310 (Step g), and a cutting step S2510 (Step h).

The first-active-material-layer formation step S2110 is a step of forming, with the first-electrode-layer formation unit 710, the first active material layer 120 to be in contact with the first current collector 110 and to occupy a smaller area than the first current collector 110.

The first-solid-electrolyte-layer formation step S2120 is a step of forming, with the first-electrode-layer formation unit 710, the first solid electrolyte layer 130 to be in contact with the first current collector 110 and the first active material layer 120. The first-solid-electrolyte-layer formation step S2120 is performed after the first-active-material-layer formation step S2110.

The second-active-material-layer formation step S2210 is a step of forming, with the second-electrode-layer formation unit 720, the second active material layer 220 to be in contact with the second current collector 210 and to occupy a smaller area than the second current collector 210.

The second-solid-electrolyte-layer formation step S2220 is a step of forming, with the second-electrode-layer formation unit 720, the second solid electrolyte layer 230 to be in contact with the second current collector 210 and the second active material layer 220. The second-solid-electrolyte-layer formation step S2220 is performed after the second-active-material-layer formation step S2210.

The layer disposition step S2310 is a step of disposing, with the layer disposition unit 730, the first electrode layer 100 and the second electrode layer 200 on each other such that the first active material layer 120 faces the second active material layer 220 with the first solid electrolyte layer 130 and the second solid electrolyte layer 230 therebetween. The layer disposition step S2310 is performed after the first-solid-electrolyte-layer formation step S2120 and the second-solid-electrolyte-layer formation step 32220.

The cutting step S2510 is a step of cutting, with the cutting unit 760, the first solid electrolyte layer 130 and the second solid electrolyte layer 230, and the first current collector 110 and the second current collector 210, such that the first solid electrolyte layer 130 occupies the same area as the first current collector 110, and the second solid electrolyte layer 230 occupies the same area as the second current collector 210. The cutting step S2510 is performed after the layer disposition step S2310.

In the above-described manufacturing apparatus or manufacturing method, the first electrode layer 100 and the second electrode layer 200 are disposed on each other and then subjected to cutting. This facilitates alignment between the first electrode layer 100 and the second electrode layer 200. In addition, for example, the first current collector 110, the first solid electrolyte layer 130, the second current collector 210, and the second solid electrolyte layer 230 can be simultaneously cut. As a result, the first current collector 110, the first solid electrolyte layer 130, the second current collector 210, and the second solid electrolyte layer 230 are provided to occupy the same area. This enables further enhancement of positional stability of the first current collector 110 and the second current collector 210, and a further reduction in the probability of contact between the first current collector 110 and the second current collector 210.

In addition, the above-described manufacturing apparatus or manufacturing method enables a further reduction in the probability of contact between the first current collector 110 and the second current collector 210. Specifically, a portion between the first current collector 110 and the second current collector 210, which face each other with the portion therebetween, is fixed with the first solid electrolyte layer 130 and the second solid electrolyte layer 230. For example, even when the first current collector 110 and the second current collector 210 are constituted by thin films, the presence of the first solid electrolyte layer 130 and the second solid electrolyte layer 230 enables the spacing between the first current collector 110 and the second current collector 210 to be maintained to have at least a predetermined distance (for example, equal to or longer than the total thickness of the first solid electrolyte layer 130 and the second solid electrolyte layer 230). This prevents the first current collector 110 and the second current collector 210 from coming into close proximity to each other. This prevents, for example, even when a plurality of battery cells are stacked, deformation of the first current collector 110 and the second current collector 210. Thus, for example, even when a plurality of battery cells are stacked, short circuits are prevented between the first current collector 110 and the second current collector 210. In addition, in another example that is an all-solid-state battery not having any separator between the first electrode layer 100 and the second electrode layer 200, the risk of short circuits caused by direct contact between the first current collector 110 and the second current collector 210 is reduced.

In addition, the above-described manufacturing apparatus or manufacturing method eliminates the necessity of an additional member for insulation between the first electrode layer 100 and the second electrode layer 200 (for example, an insulation spacer). This enables further simplification of and a reduction in the costs for battery manufacturing steps.

In addition, the above-described manufacturing apparatus or manufacturing method provides a solid electrolyte layer in which the first solid electrolyte layer 130 and the second solid electrolyte layer 230 are bonded together. This enables a reduction in the probability of short circuits due to pinholes that may be generated, for example, during manufacture, in the first solid electrolyte layer 130 and the second solid electrolyte layer 230.

In addition, in the above-described manufacturing apparatus or manufacturing method, the simple cutting step is performed, so that the first current collector 110, the first solid electrolyte layer 130, the second current collector 210, and the second solid electrolyte layer 230 occupy the same area. This enables further simplification of and a reduction in the costs for battery manufacturing steps.

Incidentally, in the above-described manufacturing method, in the cutting step S2510, cutting may be performed such that rounded portions of the electrode layers (or the electrode layers) have any one of the above-described shapes in Embodiments 1 to 5. This enables manufacture of a stack battery in which the electrode layers including the rounded portions are disposed on each other.

The third electrode layer 300 including the third rounded portion 340 and the fourth electrode layer 400 including the fourth rounded portion 440 can also be formed by the same cutting method as above.

In the cutting step S2510, the rounded portions of the electrode layers can be formed to have the same shape. As a result, the electrode layers can be disposed on each other such that, for example, the edge portions of the rounded portions of the electrode layers are located to coincide with each other. Alternatively, the cutting step S2510 can provide the electrode layers to have the same shape. As a result, the electrode layers can be disposed on each other such that, for example, the edge portions of the electrode layers are located to coincide with each other.

Incidentally, in the battery manufacturing apparatus 7000 according to Embodiment 7, the second-electrode-layer formation unit 720 may be used to form the first active material layer 120 to occupy a larger area than the second active material layer 220. In this case, the layer disposition unit 730 may be configured to dispose the second active material layer 220 to be within the area of the first active material layer 120.

In other words, in the battery manufacturing method according to Embodiment 7, in the second-active-material-layer formation step S2210, the second-electrode-layer formation unit 720 may be used to form the second active material layer 220 to occupy a smaller area than the first active material layer 120.

In this case, in the layer disposition step S2310, the layer disposition unit 730 may be used to dispose the first active material layer 120 so as to be outside of the area of the second active material layer 220.

Such a configuration enables suppression of precipitation of metal (for example, lithium) on the first active material layer 120. This prevents short circuits between the first electrode layer 100 and the second electrode layer 200 due to precipitation of metal.

Incidentally, as illustrated in FIG. 34, in Embodiment 7, the second-active-material-layer formation step S2210 and the second-solid-electrolyte-layer formation step S2220 may be performed after the first-active-material-layer formation step S2110 and the first-solid-electrolyte-layer formation step S2120.

Alternatively, the second-active-material-layer formation step S2210 and the second-solid-electrolyte-layer formation step S2220 may be performed before the first-active-material-layer formation step S2110 and the first-solid-electrolyte-layer formation step S2120.

Alternatively, the second-active-material-layer formation step S2210 and the second-solid-electrolyte-layer formation step S2220 may be performed concurrently with the first-active-material-layer formation step S2110 and the first-solid-electrolyte-layer formation step S2120.

Hereinafter, a specific example of the battery manufacturing method according to Embodiment 7 will be described.

Figure 35:
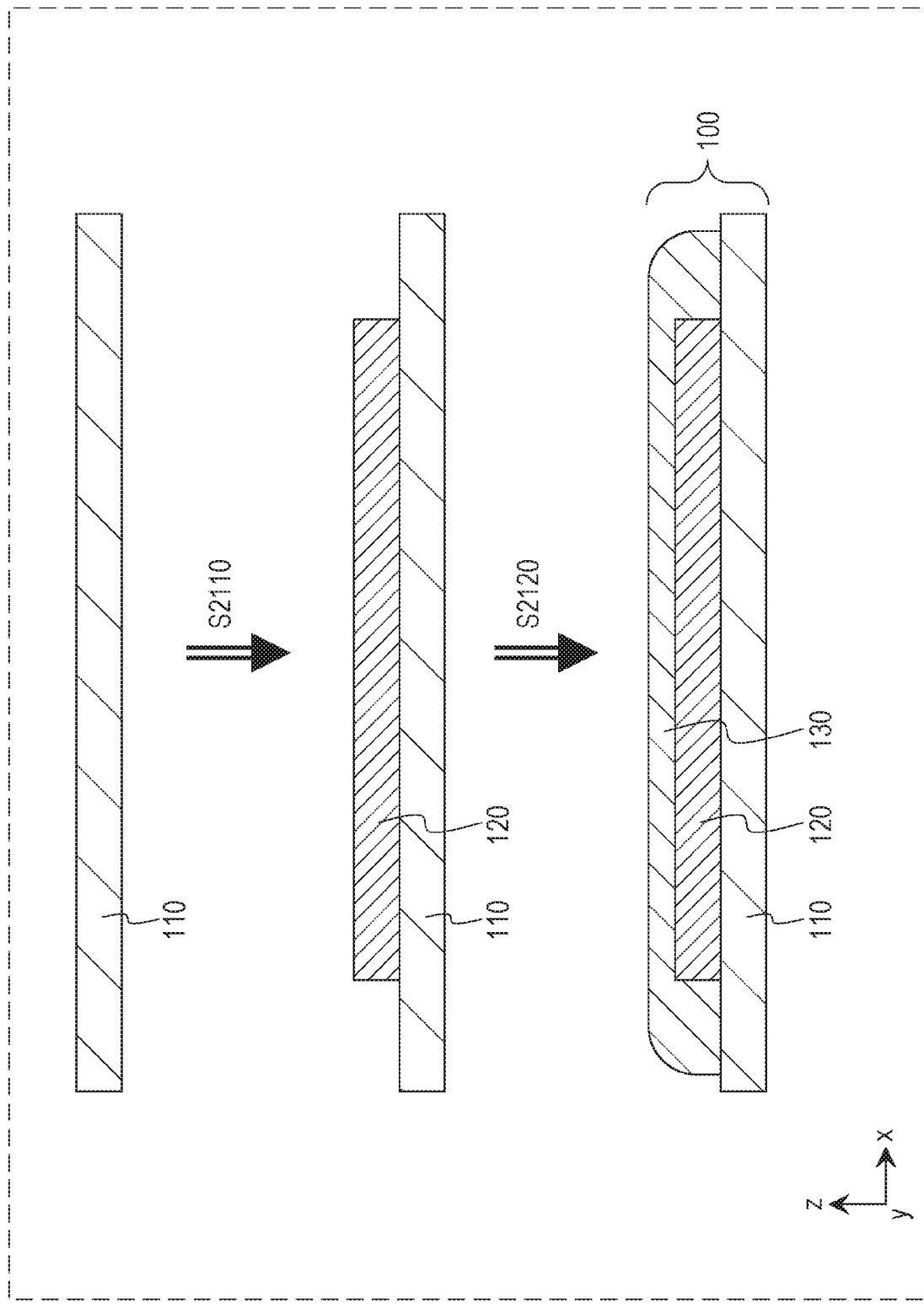
FIG. 35 illustrates an example of a first-active-material-layer formation step S2110 and a first-solid-electrolyte-layer formation step S2120.

FIG. 35 illustrates an example of the first-active-material-layer formation step S2110 and the first-solid-electrolyte-layer formation step S2120.

On the first current collector 110 prepared, the first active material layer 120 is formed. For example, a coating material paste provided by kneading an active material (and other materials) and a predetermined solvent is applied to the first current collector 110 with a coating apparatus, for example, (and may further be dried). At this time, the first active material layer 120 is formed to be in contact with the first current collector 110, and to occupy a smaller area than the first current collector 110 (first-active-material-layer formation step S2110). Thus, the first active material layer 120 is formed on the first current collector 110 such that the first current collector 110 is exposed around the first active material layer 120.

On the first current collector 110 having the first active material layer 120 thereon, the first solid electrolyte layer 130 is formed. For example, a coating material paste provided by kneading a solid electrolyte (and other materials) and a predetermined solvent is applied to the first active material layer 120 and the first current collector 110 with a coating apparatus, for example, (and may further be dried). At this time, the first solid electrolyte layer 130 is formed to occupy a smaller area than the first current collector 110 (first-solid-electrolyte-layer formation step S2120). Thus, on the exposed first current collector 110, the first solid electrolyte layer 130 is formed to cover the first active material layer 120. Thus, the first electrode layer 100 (for example, an electrode plate) is formed.

Figure 36:
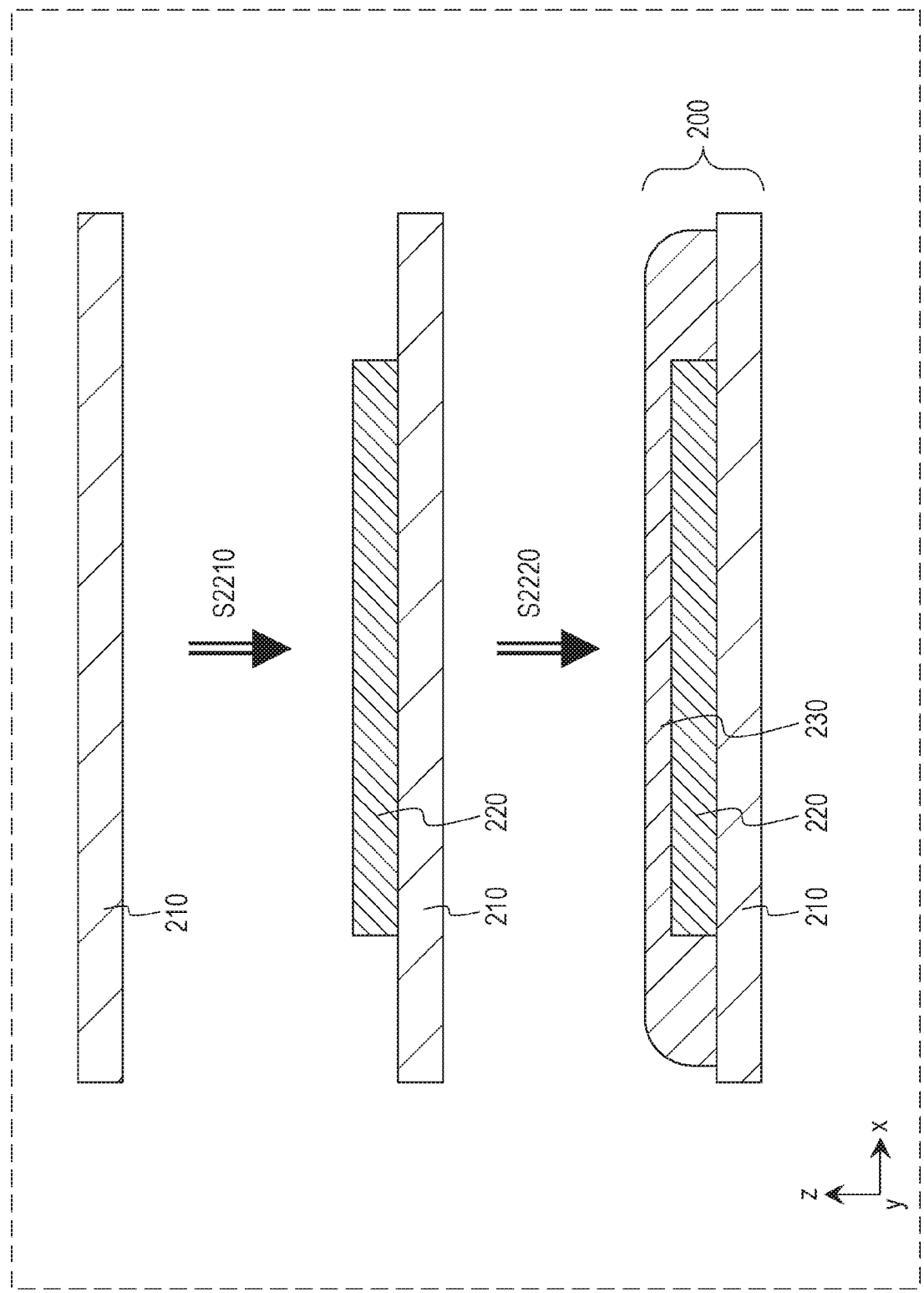
FIG. 36 illustrates an example of a second-active-material-layer formation step S2210 and a second-solid-electrolyte-layer formation step S2220.

FIG. 36 illustrates an example of the second-active-material-layer formation step S2210 and the second-solid-electrolyte-layer formation step S2220.

On the second current collector 210 prepared, the second active material layer 220 is formed. For example, a coating material paste provided by kneading an active material (and other materials) and a predetermined solvent is applied to the second current collector 210 with a coating apparatus, for example, (and may further be dried). At this time, the second active material layer 220 is formed to be in contact with the second current collector 210, and to occupy a smaller area than the second current collector 210 (second-active-material-layer formation step S2210). Thus, the second active material layer 220 is formed on the second current collector 210 such that the second current collector 210 is exposed around the second active material layer 220. Incidentally, in the example illustrated in FIG. 36, the second active material layer 220 is formed to occupy a larger area than the first active material layer 120 (in other words, to have a larger area than the first active material layer 120).

On the second current collector 210 having the second active material layer 220 thereon, the second solid electrolyte layer 230 is formed. For example, a coating material paste provided by kneading a solid electrolyte (and other materials) and a predetermined solvent is applied to the second active material layer 220 and the second current collector 210 with a coating apparatus, for example, (and may further be dried). At this time, the second solid electrolyte layer 230 is formed to occupy a smaller area than the second current collector 210 (second-solid-electrolyte-layer formation step S2220). Thus, on the exposed second current collector 210, the second solid electrolyte layer 230 is formed to cover the second active material layer 220. Thus, the second electrode layer 200 (for example, an electrode plate) is formed.

Figure 37:
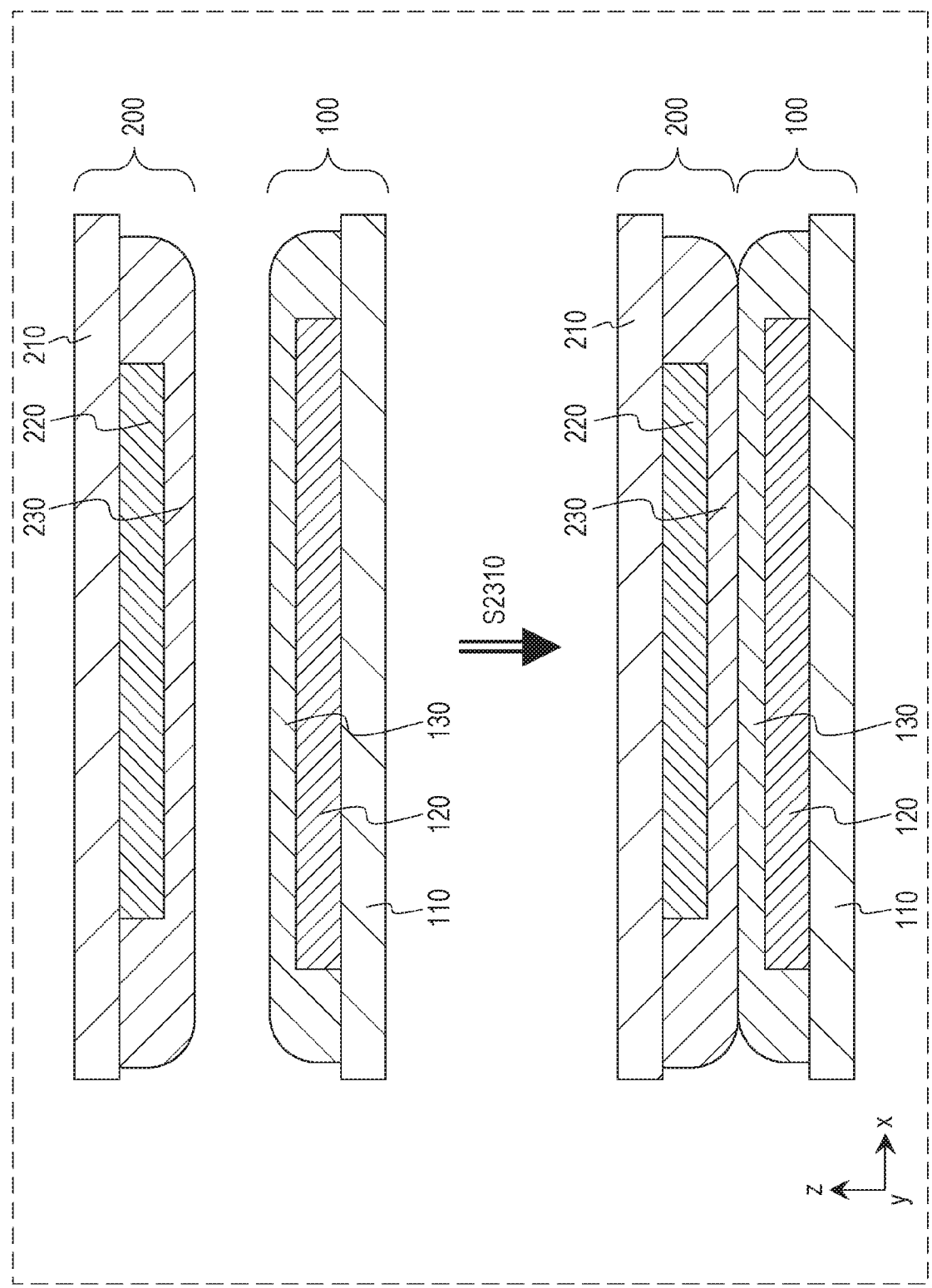
FIG. 37 illustrates an example of a layer disposition step S2310.

FIG. 37 illustrates an example of the layer disposition step S2310.

The first electrode layer 100 and the second electrode layer 200 separately formed are placed to face each other with a conveyance apparatus, for example. Subsequently, the first electrode layer 100 and the second electrode layer 200 are brought into contact with each other to thereby be disposed on each other. Thus, the first active material layer 120 is disposed to face the second active material layer 220 with the first solid electrolyte layer 130 and the second solid electrolyte layer 230 therebetween (layer disposition step S2310).

Figure 38:
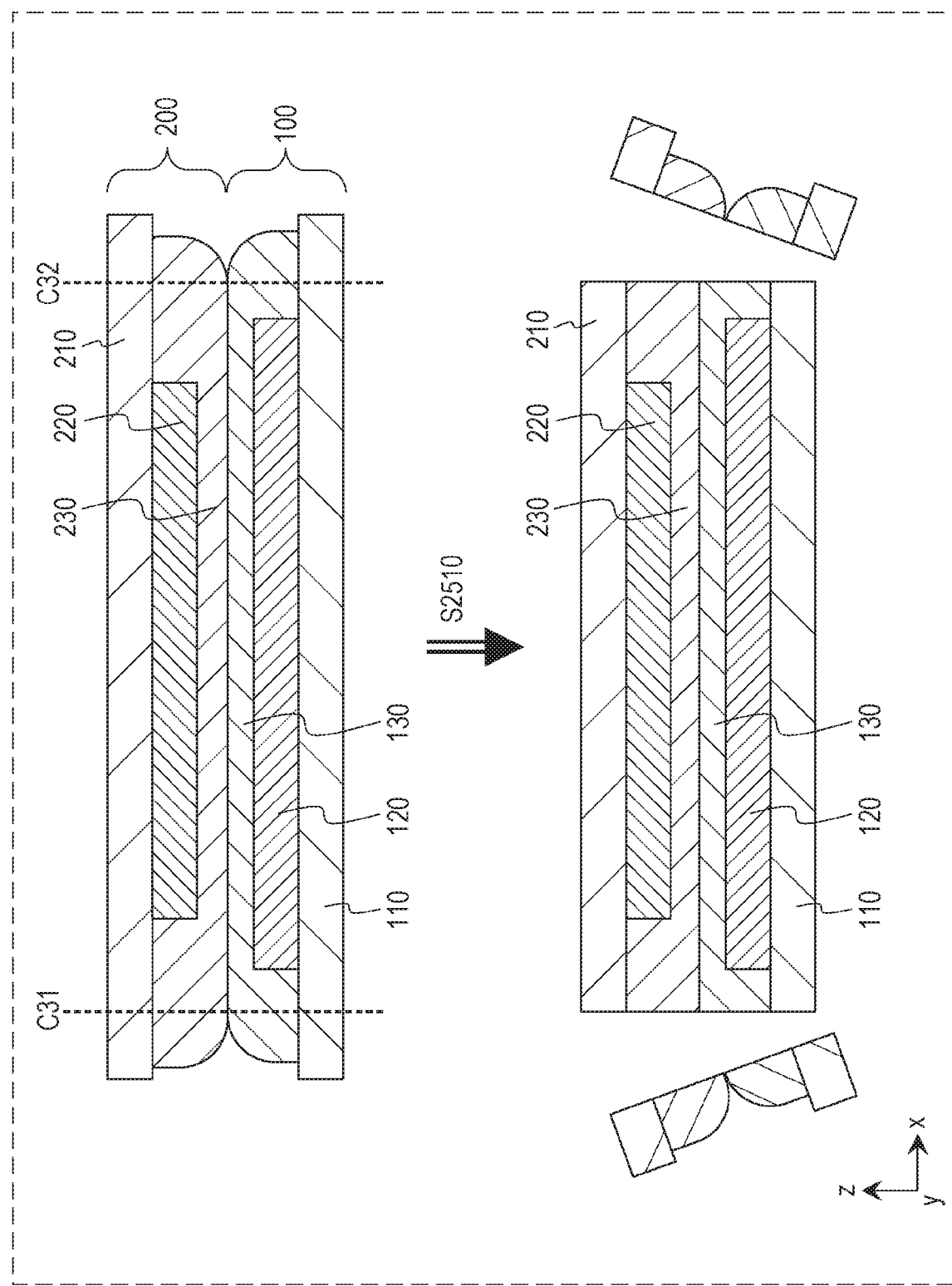
FIG. 38 illustrates an example of a cutting step S2510.

FIG. 38 illustrates an example of the cutting step S2510.

The multilayer body including the first electrode layer 100 and the second electrode layer 200 is cut with a cutting apparatus, for example. The first solid electrolyte layer 130 and the second solid electrolyte layer 230, and the first current collector 110 and the second current collector 210 are cut (for example, cut at positions C31 and C32). As a result, the first solid electrolyte layer 130 occupies the same area as the first current collector 110, and the second solid electrolyte layer 230 occupies the same area as the second current collector 210 (cutting step 32510).

A portion of the first solid electrolyte layer 130 and a portion of the second solid electrolyte layer 230, the portions being in contact with each other, can be bonded together by a drying step or a press-bonding step, for example.

Incidentally, in the cutting step S2510, the first current collector 110, the first solid electrolyte layer 130, the second current collector 210, and the second solid electrolyte layer 230 may be simultaneously punched out to achieve the cutting. In this case, the four side edges of the first current collector 110, the first solid electrolyte layer 130, the second current collector 210, and the second solid electrolyte layer 230 may be simultaneously cut off.

Incidentally, in the layer disposition step S2310, the whole region of a main surface of the first solid electrolyte layer 130 and the whole region of a main surface of the second solid electrolyte layer 230 may be brought into contact with each other (and then may be bonded together). Alternatively, a partial region of a main surface (for example, a half or larger region of the main surface) of the first solid electrolyte layer 130, and a partial region of a main surface (for example, a half or larger region of the main surface) of the second solid electrolyte layer 230 may be brought into contact with each other (and then may be bonded together).

Figure 39:
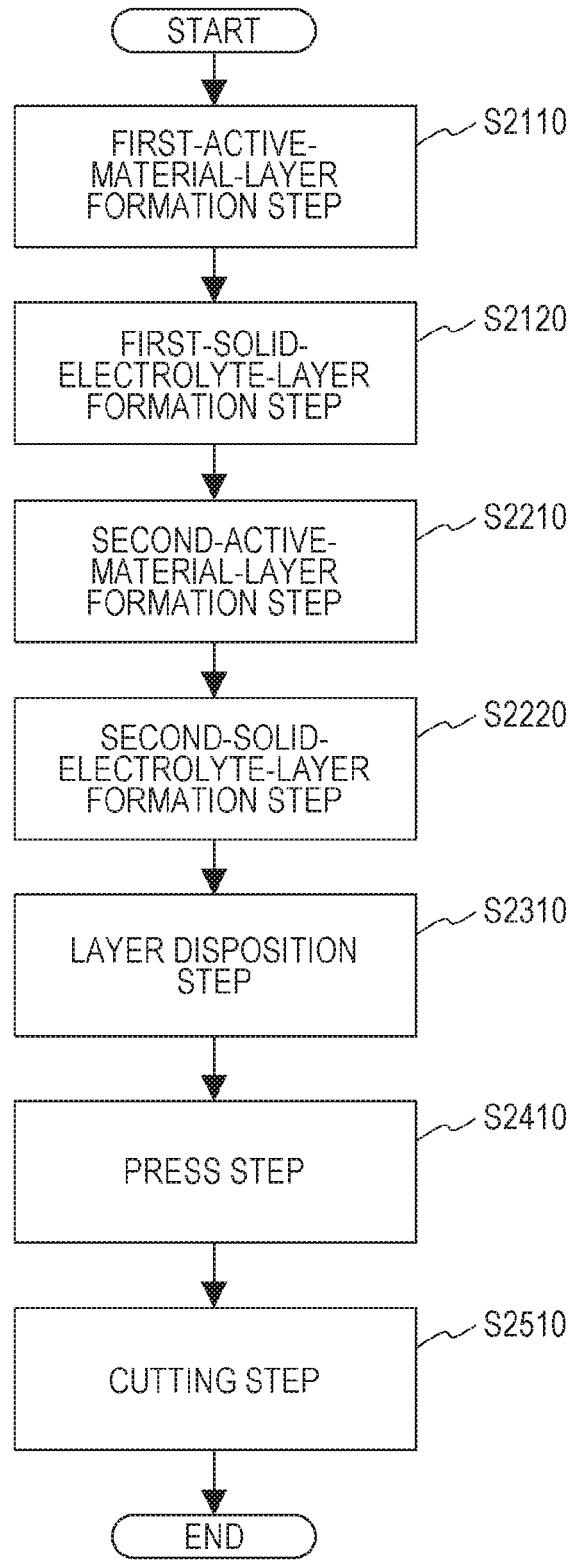
FIG. 39 is a flowchart illustrating a modification of a battery manufacturing method according to Embodiment 7.

FIG. 39 is a flowchart illustrating a modification of the battery manufacturing method according to Embodiment 7.

In Embodiment 7, as illustrated in FIG. 33, the battery manufacturing apparatus 7000 may further include a press unit 740.

The press unit 740 is configured to press the first electrode layer 100 and the second electrode layer 200 that are disposed on each other, to thereby bond together the first solid electrolyte layer 130 and the second solid electrolyte layer 230.

In other words, as illustrated in FIG. 39, the battery manufacturing method according to Embodiment 7 may further include a press step S2410 (Step p).

The press step S2410 is a step of pressing, with the press unit 740, the first electrode layer 100 and the second electrode layer 200 that are disposed on each other, to thereby bond together (press-bond together) the first solid electrolyte layer 130 and the second solid electrolyte layer 230.

In the above-described manufacturing apparatus or manufacturing method, the first solid electrolyte layer 130 and the second solid electrolyte layer 230 are press-bonded together, to thereby achieve stronger bonding between the first solid electrolyte layer 130 and the second solid electrolyte layer 230. The above-described manufacturing apparatus or manufacturing method also enables a further reduction in the probability of short circuits due to pinholes that may be generated in the first solid electrolyte layer 130 and the second solid electrolyte layer 230.

Incidentally, as illustrated in FIG. 39, in the battery manufacturing method according to Embodiment 7, the cutting step S2510 may be performed after the press step S2410.

In such a configuration, even when the press step causes expansion of the first solid electrolyte layer 130 and the second solid electrolyte layer 230, the cutting step subsequently performed enables removal of the expanded portions (excess portions) of the first solid electrolyte layer 130 and the second solid electrolyte layer 230. As a result, the first current collector 110, the first solid electrolyte layer 130, the second current collector 210, and the second solid electrolyte layer 230 are provided to occupy the same area. This enables further enhancement of positional stability of the first current collector 110 and the second current collector 210, and a further reduction in the probability of contact between the first current collector 110 and the second current collector 210.

Incidentally, in Embodiment 7, the first-electrode-layer formation unit 710 and the second-electrode-layer formation unit 720 may each include, for example, a discharge mechanism (for example, a discharge port) configured to discharge a coating material (for example, an active material or a solid electrolyte material), a supply mechanism (for example, a tank and a supply pipe) configured to supply the coating material to the discharge mechanism, a movement mechanism (for example, a roller) configured to move a coating target or the like, and a press mechanism (for example, a press platform and a cylinder) configured to perform compression. These mechanisms may be appropriately selected from publicly known apparatuses and members.

In Embodiment 7, the layer disposition unit 730 may include, for example, a conveyance mechanism (for example, a roller) configured to convey the first electrode layer 100 and the second electrode layer 200 to be disposed on each other. The mechanism may be appropriately selected from publicly known apparatuses and members.

In Embodiment 7, the press unit 740 may include, for example, a press mechanism (for example, a press platform and a cylinder) configured to compress the multilayer body including the first electrode layer 100 and the second electrode layer 200, and a movement mechanism (for example, a roller) configured to move the first electrode layer 100 and the second electrode layer 200 to be pressed. These mechanisms may be appropriately selected from publicly known apparatuses and members.

In Embodiment 7, the cutting unit 760 may include, for example, a cutting mechanism (for example, a die punch apparatus) configured to cut a cutting target, and a movement mechanism (for example, a roller) configured to move a cutting target or the like. These mechanisms may be appropriately selected from publicly known apparatuses and members.

The battery manufacturing apparatus 7000 according to Embodiment 7 may further include a control unit 750.

The control unit 750 is configured to control operations of the first-electrode-layer formation unit 710, the second-electrode-layer formation unit 720, the layer disposition unit 730, the press unit 740, and the cutting unit 760.

The control unit 750 may be constituted by, for example, a processor and a memory. The processor may be, for example, a CPU (Central Processing Unit) or an MPU (Micro-Processing Unit). In this case, the processor may be configured to read out and execute a program stored in the memory, to thereby perform a control method (battery manufacturing method) according to the present disclosure.

Incidentally, in Embodiments 6 and 7, the step of forming the first electrode layer 100 or the second electrode layer 200 may include a step of dissolving an active material in a solvent (or mixing an active material with a dispersed binder) to prepare slurry. The slurry may contain a solid electrolyte or a conductive additive. In this case, the step of forming the first electrode layer 100 or the second electrode layer 200 may be performed by a known coating method such as doctor blade coating, roll coater coating, bar coater coating, calendar printing, or screen printing.

In Embodiments 6 and 7, the step of forming a solid electrolyte layer may include a step of dissolving a solid electrolyte in a solvent (or mixing a solid electrolyte with a dispersed binder) to prepare slurry. In this case, the step of forming the solid electrolyte layer may be performed by a known coating method such as doctor blade coating, roll coater coating, bar coater coating, calendar printing, or screen printing.

In Embodiments 6 and 7, the cutting step may be performed by a known cutting method, such as a punching method (for example, die punching).

In Embodiments 6 and 7, the press step (for example, a press-bonding step) may be performed by a known pressing method, such as uniaxial pressing, roll pressing, cold isostatic pressing (CIP), or hot isostatic pressing. Incidentally, when uniaxial pressing or roll pressing is employed, a heating step may be performed.

In Embodiments 6 and 7, the phrase "the solid electrolyte layer is formed to occupy the same area as the current collector" means "the solid electrolyte layer is formed to occupy substantially the same area as the current collector except for the error unavoidably occurring during the manufacture" (for example, the solid electrolyte layer is formed to have substantially the same shape as the current collector except for the error unavoidably occurring during the manufacture).

In Embodiments 6 and 7, the solid electrolyte layer of one of the electrode layers to be disposed may not be formed. In this case, the battery according to Embodiment 3 is manufactured.

In Embodiments 6 and 7, in the layer disposition step, surfaces (to be disposed on each other) of the electrode layers to be disposed may be changed. For example, the electrode layers may be disposed on each other such that the current collectors are in contact with each other, to thereby manufacture the battery 4000 according to Embodiment 4. In this case, additional electrode layers may be disposed on both sides of the battery to thereby manufacture the stack battery according to Embodiment 4.

In Embodiments 6 and 7, on one of the main surfaces of a current collector, an active material layer and a solid electrolyte layer may be formed; and, on the other main surface, an electrode layer serving as the counter electrode may be formed. Thus, the battery 5000 according to Embodiment 5 is manufactured. In this case, additional electrode layers may be disposed on both sides of the battery to thereby manufacture the stack battery according to Embodiment 5.

Incidentally, in the present disclosure, the first rounded portion 140 may be "a portion formed to have a smaller radius than a corner portion of the first active material layer 120, the corner portion being the nearest to the first rounded portion 140" (in other words, a portion formed to have a larger curvature than a corner portion of the first active material layer 120, the corner portion being the nearest to the first rounded portion 140).

Specifically, for example, as illustrated in the example of FIG. 1, a corner portion of the first active material layer 120 (for example, an active material layer formed to have a polygon shape), the corner portion being the nearest to the first rounded portion 140, may be a portion having an angle of 90° or less (for example, a right angle portion or an acute angle portion). In this case, the first rounded portion 140 may be a portion formed by being cut to have a curve.

For example, as illustrated in the example of FIG. 3, the corner portions of the first active material layer 120 (for example, an active material layer formed to have a polygon shape), the corner portions being the nearest to the corresponding one of the first rounded portions (140a, 140b, 140c, and 140d), may be a portion having an angle of 90° or less (for example, a right angle portion or an acute angle portion). In this case, each of the first rounded portions (140a, 140b, 140c, and 140d) may be a portion formed by being cut to have a curve.

Incidentally, in the present disclosure, the first rounded portion 140 may be "a portion having an angle larger than the angle of a corner portion of the first active material layer 120, the corner portion being the nearest to the first rounded portion 140".

Specifically, for example, as illustrated in the example of FIG. 2, a corner portion of the first active material layer 120 (for example, an active material layer formed to have a polygon shape), the corner portion being the nearest to the first rounded portion 140, may be a portion having an angle of 90° or less (for example, a right angle portion or an acute angle portion). In this case, the first rounded portion 140 may be a portion formed by being cut straight to have an angle of more than 90° only (for example, an obtuse angle).

For example, as illustrated in the example of FIG. 5C, the corner portions of the first active material layer 120 (for example, an active material layer formed to have a polygon shape), the corner portions being the nearest to the corresponding one of the first rounded portions (140a, 140b, 140c, and 140d), may be portions having an angle of 90° or less (for example, right angle portions or acute angle portions). In this case, each of the first rounded portions (140a, 140b, 140c, and 140d) may be a portion formed by being cut straight to have an angle of more than 90° only (for example, an obtuse angle).

In such a case where the first rounded portion 140 is "a portion formed to have a smaller radius than a corner portion of the first active material layer 120, the corner portion being the nearest to the first rounded portion 140" or "a portion having an angle larger than the angle of a corner portion of the first active material layer 120, the corner portion being the nearest to the first rounded portion 140", the first active material layer 120 can be disposed to occupy an area (for example, a polygon area) as large as possible, provided that the area is smaller than that of the first current collector 110. This enables a further increase in the energy density of the battery.

Incidentally, in the present disclosure, the second rounded portion 240 may be "a portion formed to have a smaller radius than a corner portion of the second active material layer 220, the corner portion being the nearest to the second rounded portion 240" (in other words, a portion formed to have a larger curvature than a corner portion of the second active material layer 220, the corner portion being the nearest to the second rounded portion 240).

Specifically, for example, as illustrated in the example of FIG. 6, a corner portion of the second active material layer 220 (for example, an active material layer formed to have a polygon shape), the corner portion being the nearest to the second rounded portion 240, may be a portion having an angle of 90° or less (for example, a right angle portion or an acute angle portion). In this case, the second rounded portion 240 may be a portion formed by being cut to have a curve.

For example, as illustrated in the example of FIG. 7, the corner portions of the second active material layer 220 (for example, an active material layer formed to have a polygon shape), the corner portions being the nearest to the corresponding one of the second rounded portions (240a, 240b, 240c, and 240d), may be portions having an angle of 90° or less (for example, right angle portions or acute angle portions). In this case, each of the second rounded portions (240a, 240b, 240c, and 240d) may be a portion formed by being cut to have a curve.

Incidentally, in the present disclosure, the second rounded portion 240 may be "a portion having an angle larger than the angle of a corner portion of the second active material layer 220, the corner portion being the nearest to the second rounded portion 240".

Specifically, for example, a corner portion of the second active material layer 220 (for example, an active material layer formed to have a polygon shape), the corner portion being the nearest to the second rounded portion 240, may be a portion having an angle of 90° or less (for example, a right angle portion or an acute angle portion). In this case, the second rounded portion 240 may be a portion formed by being cut straight to have an angle of more than 90° only (for example, an obtuse angle).

For example, the corner portions of the second active material layer 220 (for example, an active material layer formed to have a polygon shape), the corner portions being the nearest to the corresponding one of the second rounded portions (240a, 240b, 240c, and 240d), may be portions having an angle of 90° or less (for example, right angle portions or acute angle portions). In this case, each of the second rounded portions (240a, 240b, 240c, and 240d) may be a portion formed by being cut straight to have an angle more than 90° only (for example, an obtuse angle).

In such a case where the second rounded portion 240 is "a portion formed to have a smaller radius than a corner portion of the second active material layer 220, the corner portion being the nearest to the second rounded portion 240" or "a portion having a larger angle than a corner portion of the second active material layer 220, the corner portion being the nearest to the second rounded portion 240", the second active material layer 220 can be disposed to occupy an area (for example, a polygon area) as large as possible, provided that the area is smaller than that of the second current collector 210. This enables a further increase in the energy density of the battery.

Batteries according to the present disclosure are applicable to, for example, all-solid-state lithium secondary batteries.

What is claimed is:

1. A battery, comprising:
   a first electrode layer; and
   a second electrode layer disposed on the first electrode layer and serving as a counter electrode for the first electrode layer,
   wherein the first electrode layer includes a first current collector, a first active material layer, and a first solid electrolyte layer,
   the first active material layer is disposed to be in contact with the first current collector and to occupy a smaller area than that of the first current collector with respect to a plan view,
   the first solid electrolyte layer is disposed to be in contact with the first current collector and the first active material layer, wherein the first solid electrolyte layer and the first current collector occupy a same coextensive area with respect to the plan view,
   the first active material layer faces the second electrode layer with the first solid electrolyte layer therebetween,
   the first electrode layer includes a peripheral portion including a first rounded portion,
   the second electrode layer includes a second current collector and a second active material layer,
   the second active material layer is disposed to be in contact with the second current collector and to occupy a smaller area than that of the second current collector with respect to the plan view,
   the first solid electrolyte layer is disposed to be in contact with the second current collector and the second active material layer, wherein the first solid electrolyte layer and the second current collector occupy the same coextensive area with respect to the plan view,
   the second active material layer faces the first active material layer with the first solid electrolyte layer therebetween,
   the second current collector includes a peripheral portion including a second rounded portion,
   the first rounded portion and the second rounded portion have an identical shape, and
   the first electrode layer and the second electrode layer are disposed on each other, and an edge portion of the first rounded portion and an edge portion of the second rounded portion are located to coincide with each other.

2. The battery according to claim 1,
   wherein the first electrode layer and the second electrode layer have an identical shape, and
   the first electrode layer and the second electrode layer are disposed on each other, and an edge portion of the first electrode layer and an edge portion of the second electrode layer are located to coincide with each other.

3. The battery according to claim 2,
   wherein the first electrode layer and the second electrode layer have a circular shape.

4. The battery according to claim 2,
   wherein the first electrode layer has a shape including a corner portion,
   the corner portion of the first electrode layer includes the first rounded portion,
   the second electrode layer has a shape including a corner portion, and
   the corner portion of the second electrode layer includes the second rounded portion.

5. The battery according to claim 4,
   wherein the first electrode layer has a polygon shape including a plurality of corner portions,
   the plurality of corner portions of the first electrode layer each include the first rounded portion,
   the second electrode layer has a polygon shape including a plurality of corner portions, and
   the plurality of corner portions of the second electrode layer each include the second rounded portion.

6. The battery according to claim 1,
   wherein the first active material layer is disposed to occupy a larger area than the second active material layer, and
   the second active material layer is disposed within the area of the first active material layer.

7. The battery according to claim 1, further comprising:
   a third electrode layer disposed on the first electrode layer and serving as a counter electrode for the first electrode layer,
   wherein the third electrode layer includes a third current collector, a third active material layer, and a third solid electrolyte layer,
   the first current collector and the third current collector are electrically connected to each other,
   the third active material layer is disposed to be in contact with the third current collector and to occupy a smaller area than that of the third current collector with respect to the plan view,
   the third solid electrolyte layer is disposed to be in contact with the third current collector and the third active material layer, wherein the third solid electrolyte layer and the third current collector occupy the same coextensive area with respect to the plan view,
   the third electrode layer includes a peripheral portion including a third rounded portion,
   the first rounded portion and the third rounded portion have an identical shape, and
   the first electrode layer and the third electrode layer are disposed on each other, and an edge portion of the first rounded portion and an edge portion of the third rounded portion are located to coincide with each other.

8. The battery according to claim 7,
   wherein the first electrode layer and the third electrode layer have an identical shape, and
   the first electrode layer and the third electrode layer are disposed on each other, and an edge portion of the first electrode layer and an edge portion of the third electrode layer are located to coincide with each other.

9. The battery according to claim 1, further comprising:
a third electrode layer disposed on the first electrode layer and serving as a counter electrode for the first electrode layer,
wherein the third electrode layer includes a third active material layer and a third solid electrolyte layer,
the third active material layer is disposed to be in contact with the first current collector and to occupy a smaller area than that of the first current collector,
the third solid electrolyte layer is disposed to be in contact with the first current collector and the third active material layer, wherein the third solid electrolyte layer and the first current collector occupy the same coextensive area with respect to the plan view,
the third electrode layer includes a peripheral portion including a third rounded portion,
the first rounded portion and the third rounded portion have an identical shape, and
the first electrode layer and the third electrode layer are disposed on each other, and an edge portion of the first rounded portion and an edge portion of the third rounded portion are located to coincide with each other.

* * * * *